United States Patent [19]
Nozawa et al.

[11] Patent Number: 6,062,201
[45] Date of Patent: May 16, 2000

[54] FUEL INJECTION CONTROL FOR INTERNAL COMBUSTION ENGINE

[75] Inventors: Masaei Nozawa, Okazaki; Sigenori Isomura, Kariya; Yukio Sawada, Anjo; Daiji Isobe, Toyohashi, all of Japan

[73] Assignee: Denso Corporation, Kariya-city, Japan

[21] Appl. No.: 09/071,498

[22] Filed: May 4, 1998

[30]     Foreign Application Priority Data

| May 13, 1997 | [JP] | Japan | 9-122231 |
| May 13, 1997 | [JP] | Japan | 9-122232 |
| Jun. 25, 1997 | [JP] | Japan | 9-168890 |
| Mar. 6, 1998 | [JP] | Japan | 10-055150 |

[51] Int. Cl.$^7$ .................................................. F02D 41/00
[52] U.S. Cl. ...................... 123/478; 123/480; 123/90.16
[58] Field of Search .................................. 123/478, 480, 123/486, 90.15, 90.16

[56]                References Cited

U.S. PATENT DOCUMENTS

| 4,785,786 | 11/1988 | Nagao et al. | 123/488 |
| 5,117,795 | 6/1992 | Ohsuga et al. | 123/478 |
| 5,427,069 | 6/1995 | Tomisawa et al. | 123/478 |
| 5,685,276 | 11/1997 | Tanaka et al. | 123/478 |
| 5,735,248 | 4/1998 | Matsuura et al. | 123/527 |
| 5,832,901 | 11/1998 | Yoshida et al. | 123/478 |

FOREIGN PATENT DOCUMENTS

| 1-134741 U | of 0000 | Japan . |
| 1-208540 | of 0000 | Japan . |
| 2-188646 | of 0000 | Japan . |
| 4-86351 | of 0000 | Japan . |
| 4303141 | of 0000 | Japan . |
| 60-11652 | of 0000 | Japan . |
| 60-184921 | of 0000 | Japan . |
| 60-98145 | of 0000 | Japan . |
| 64-11367 | of 0000 | Japan . |
| 62-82241 | 4/1987 | Japan . |

*Primary Examiner*—Henry C. Yuen
*Assistant Examiner*—Hieu T. Vo
*Attorney, Agent, or Firm*—Nixon & Vanderhye P.C.

[57]             ABSTRACT

A fuel injection control system for an engine enhances efficiency for charging suctioned air into a cylinder stabilizes a fuel combustion state. An engine intake pipe is provided with an air-assisted injector. Fuel injected by the injector flows into a combustion chamber within the cylinder via an intake valve. An ECU controls the injector drive so that injected fuel flows into the cylinder about ⅓ of the time at the beginning of the valve opening period. This arrangement allows a large amount of fuel supplied into the cylinder to be vaporized quickly and completely before the intake value is closed. At this time, because temperature of air drops due to heat of vaporization of the fuel, weight (density) of air suctioned into the cylinder per unit volume increases, thus enhancing the charging efficiency of suctioned air.

25 Claims, 29 Drawing Sheets

FUEL INJECTION CONTROL FOR INTERNAL COMBUSTION ENGINE

CROSS REFERENCE TO RELATED APPLICATION

This application relates to and incorporates herein by reference Japanese Patent Applications No. 9-122231, 9-122232, 9-168890 and 10-55150 filed on May 13, 1997, May 13, 1997, Jun. 25, 1997 and Mar. 6, 1998, respectively.

BACKGROUND OF THE INVENTION

1. Field of the Invention

The present invention relates to a fuel injection control system and method for an internal combustion engine.

2. Description of Related Art

There is disclosed in Japanese Patent Application Laid-Open No. 4-303141 a control system for an internal combustion engine. In this system fuel injection end timing is determined before starting an intake stroke or during the intake stroke in response to timing for completely closing an intake valve. Specifically, injection is ended before the start of the intake stroke when the timing for completely closing the intake valve is earlier than a predetermined discriminating timing and is ended during the intake stroke when the valve closing timing is later than the predetermined discriminating timing. Such system allows fuel injection timing to be adequately controlled in response to changes in operating states of the intake valve which occur due to changes in engine load, thus stabilizing the combustion state and improving charging efficiency.

However, because the injected fuel continuously flows into a cylinder until the later period of the intake stroke (until the intake valve closes) in such system, there remains non-vaporized fuel even when the intake valve is closed. Due to that, there is a possibility that the combustion state within the cylinder is worsened and the non-vaporized fuel is exhausted as unburnt HC also increasing wetness of the fuel. Further, because the fuel is not fully vaporized, the heat of vaporization has not been used effectively and efficiency for charging suctioned air or air-fuel ratio mixture is low.

Further, in another system disclosed in Japanese Patent Application Laid-Open No. 3-950, fuel injection amount is increased/decreased in proportion to an increase/decrease of an air amount suctioned to the cylinder so that the air-fuel mixing ratio (air-fuel ratio) of the mixture suctioned into the cylinder is always fixed with respect to crank angle within the intake stroke. This arrangement allows the distribution of the mixture within the cylinder to be homogenized, thus stabilizing combustion.

However, because the mixture is suctioned into the cylinder during the whole period of the intake stroke during which the intake valve is opened in this system, the mixture is suctioned into the cylinder even during a period in which intake flow speed is very low. In such a case, the mixture is not fully homogenized and favorable combustion cannot be realized. As a result, the control of the fuel injection in a lean air-fuel ratio range aiming at the reduction of fuel consumption and of NOx, i.e., the lean-burn control, has not been able to be realized effectively.

Still more, in another system disclosed in Japanese Patent Application Laid-Open NOS. 60-11652 and 60-122239, stratified fuel combustion is carried out by putting timing for injecting fuel by the injector (fuel injection valve) almost at the later half of an intake stroke. Further, in order to suitably realize stratified fuel combustion, the more air amount suctioned to the engine, the higher the pressure of the fuel (fuel pressure) fed to the injector is increased and such that the crankshaft angular position for ending injection is changed corresponding to engine operating states.

However, although this system has allowed stratified fuel combustion to be realized by injecting fuel almost in the later half of the intake stroke, actually the wetness of the port has increased due to the particle size of the fuel injected and supplied from the injector. That is, combustion is incomplete and no adequate stratified mixture is realized because the average fuel particle size is about 150 to 200 $\mu$m in general, causing the port to be wet and cylinder to be wet and hardly allowing homogeneous mixture to be provided.

SUMMARY OF THE INVENTION

It is a primary object of the present invention to provide a fuel injection control system of an internal combustion engine which enhances efficiency for charging suctioned air into a cylinder and stabilizes a fuel combustion state.

It is a second object of the present invention to provide a fuel injection control system of an internal combustion engine which allows the mixture suctioned into a cylinder to be homogenized and a range in which the fuel consumption and the air-fuel ratio can be controlled to be expanded.

It is a third object of the present invention to provide a fuel injection control system of an internal combustion engine which allows the lean limit of the mixture to be extended by stratifying the mixture supplied into the cylinder.

According to a first aspect of the invention, drive of an injector is controlled such that the fuel injected by the injector flows into the cylinder within a specific time based on intake valve opening timing. Because the inflow of fuel into the cylinder is finished before the specific timing of the intake stroke of the engine, much of the inflow fuel is vaporized quickly and mixing of the vaporized fuel with the suctioned air is accelerated within the valve opening period of the intake valve. That is, vaporization of the fuel supplied into the cylinder is completed before the intake valve is closed and intake is finished. At this time, because the heat of vaporization is taken from the ambient air and temperature of air within the cylinder drops when the fuel is vaporized, weight (density) of air suctioned into the cylinder per unit volume increases. As a result, charging efficiency of the suction air may be enhanced and the combustion state of the fuel may be stabilized. Further, it allows more air to be suctioned and output torque of the engine to be improved.

According to a second aspect of the invention, the drive of an injector is controlled such that fuel inflows into a cylinder within the period of an intake stroke during which a flow speed of the suctioned air exceeds a predetermined value by controlling the amount of fuel supplied into the cylinder per unit time pursuant to the flow speed of the air suctioned into the cylinder. The fuel is introduced to the cylinder by being carried on the air whose intake flow speed is relatively fast by controlling the amount of fuel supplied into the cylinder per unit time pursuant to the intake flow speed and by flowing the fuel injected by the injector into the cylinder in the intake stroke in which the intake flow speed exceeds the predetermined value. The mixture composed of the fuel and the air is mixed homogeneously within the cylinder. As a result, the homogenization of the mixture suctioned into the cylinder may be realized, the fuel may be burned stably and the range for controlling the fuel consumption and air-fuel ratio may be expanded. Further, the homogenization of the mixture allows the control of fuel injection in the lean air-fuel ratio range (lean burn control)

to be stably realized and NOx within emission gas to be reduced in the lean burn control.

According to a third aspect of the present invention, the particle size of fuel injected by the injector is atomized to 70 $\mu$m or less and the drive of the injector is controlled such that the later the intake stroke, the more an amount of fuel supplied into the cylinder per unit time is increased. The atomization of fuel is achieved by: controlling pressure of air fed to the injector by using an air-assisted injector; injecting the fuel sprayed by the injector toward the bevel portion of the high temperature intake valve; or using a multi-hole type (e.g., 12-hole type) injector.

According to this arrangement, the injector is driven corresponding to the period of the intake stroke which follows when the intake valve is opened and the fuel injected by the injector is suctioned into the cylinder (combustion chamber) after being injected to an intake port of the internal combustion engine. At this time, because the later the intake stroke, the more the amount of fuel inflow to the cylinder per unit time increases, a large amount of fuel is suctioned just before the intake valve is closed. Accordingly, stratified mixture may be formed within the cylinder and the combustion state may be stabilized even in the lean air-fuel ratio range. More concretely, an atmosphere having an air-fuel ratio enough for combustion is provided around an ignition plug and the stable combustion may be realized even if the atmosphere is lean as a whole. Further, because the fuel injected by the injector is atomized to about 70 $\mu$m or less, vaporization of the fuel within the cylinder is accelerated, thus suppressing the trouble which has happened in the prior art system such as incomplete burning caused by the cylinder wet.

Thus, the third aspect of the invention allows the stratification of the mixture supplied into the cylinder to be realized and in its turn, the lean limit of the mixture to be extended and the internal combustion engine to be operated in a low fuel consumption range. It is noted that the optimum range of the average particle size SMD of the injected fuel is 10 to 30 $\mu$m.

BRIEF DESCRIPTION OF THE DRAWINGS

The specific nature of the invention, as well as other objects, uses and advantages thereof, will clearly appear from the following description and from the accompanying drawings in which like numerals refer to like parts. In the drawings.

DETAILED DESCRIPTION OF PREFERRED EMBODIMENTS

First Embodiment

A system of the present embodiment controls a fuel injection amount of a gasoline injection type multi-cylinder internal combustion engine and each injector for injecting fuel to each cylinder is controlled by an electronic control unit (ECU) which is mainly composed of a microcomputer. The ECU controls and drives the injector disposed at an intake port such that fuel is supplied into the cylinder within a predetermined period.

Figure 1:
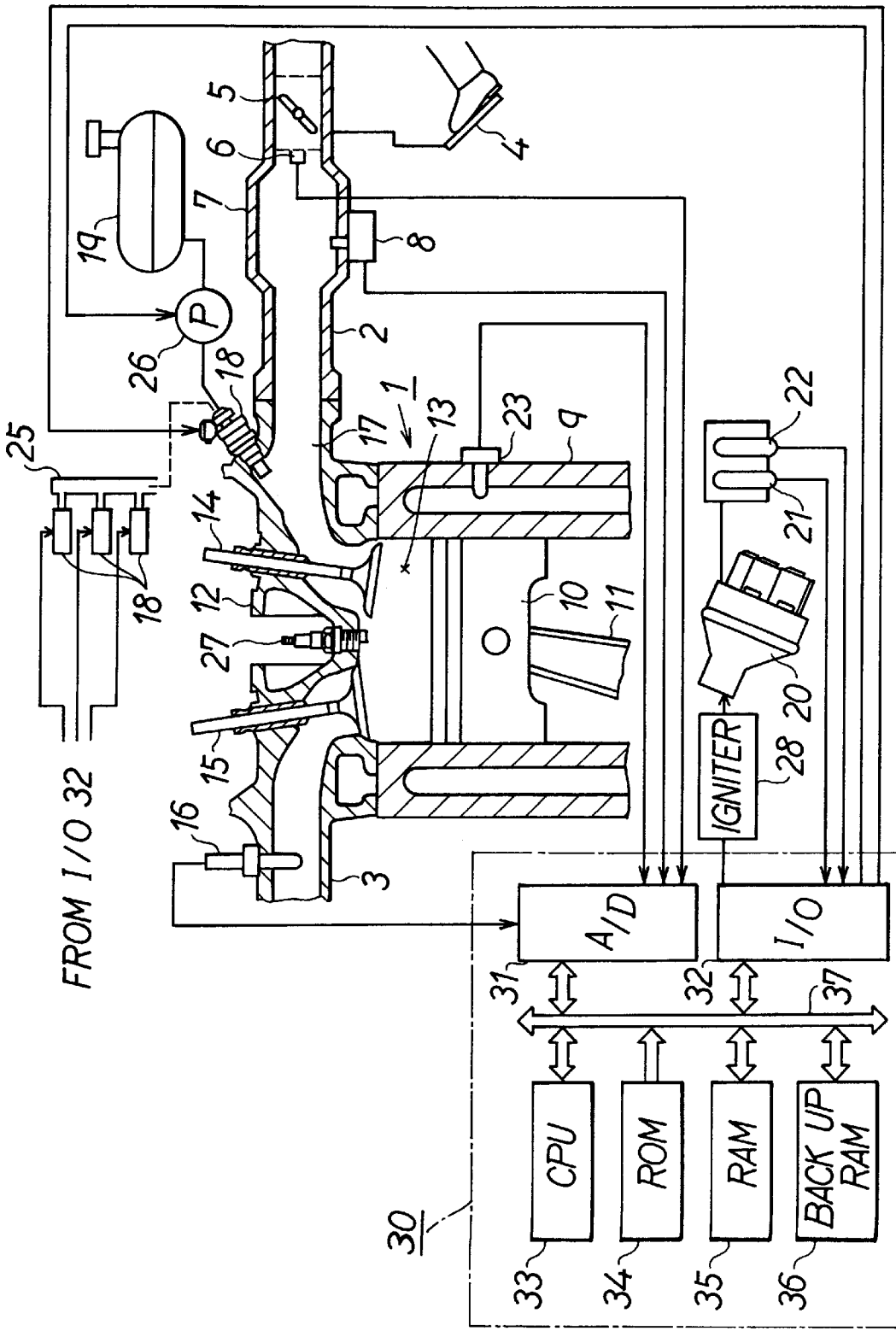
FIG. 1 is a schematic view showing a fuel injection control system of an engine according to a first embodiment of the present invention.

In FIG. 1, an intake pipe 2 and an exhaust pipe 3 are connected to an engine 1. The intake pipe 2 is provided with a throttle valve 5 which is interlocked with an accelerator pedal 4 so that its opening angle is detected by a throttle opening angle sensor 6. An intake pressure sensor 8 is disposed on a surge tank 7 of the intake pipe 2.

A piston 10 which reciprocates in a cylinder 9, i.e., the cylinder of the engine 1, and is connected to a crankshaft (not shown) via a connecting rod 11. A combustion chamber 13 which is defined by the cylinder 9 and a cylinder head 12 is provided the piston 10. The combustion chamber 13 communicates with the intake pipe 2 and the exhaust pipe 3 via an intake valve 14 and an exhaust valve 15, respectively. An A/F (air-fuel ratio) sensor 16 of a limiting current type which outputs a wide-ranged and linear air-fuel ratio signal in proportion to concentration of oxygen (or concentration of carbon monoxide which is unburnt gas) within exhaust gas is provided within the exhaust pipe 3. Further, a water temperature sensor 23 for detecting temperature of coolant water is provided on the cylinder 9 (water jacket).

An electromagnetically driven injector 18 is provided at an intake port 17 of the engine 1. Fuel (gasoline) is supplied from a fuel tank 19 to the injector 18. A multi-point injection (MPI) system having the injector 18 per each bifurcated pipe of an intake manifold are structured and the injectors 18 of each cylinder are connected to each other by a delivery pipe 25 in the present embodiment. It is noted that the four-hole air-assisted injector 18 is adopted in the present embodiment.

A fuel pump 26 for supplying fuel to the delivery pipe 25 while controlling pressure of the fuel (fuel pressure) is disposed between the fuel tank 19 and the injector 18. Then, fresh air supplied from the upstream of the intake pipe is mixed with the fuel to be injected by the injector 18 in the intake port 17 and the mixture is supplied into the combustion chamber 13 (within the cylinder 9) as the intake valve 14 opens.

An ignition plug 27 disposed at the cylinder head 12 ignites when igniting high voltage is supplied from an igniter 28. A distributor 20 for distributing the igniting high voltage to the ignition plug 27 of each cylinder is connected to the igniter 28. The distributor 20 is provided with a reference position sensor 21 for outputting a pulse signal per 720° CA in correspondence with states of rotation of the crankshaft and a rotation angle sensor 22 for outputting a pulse signal per finer crank angle, e.g., 30° CA.

The ECU 30 is mainly composed of a microcomputer system for example and comprises an A/D converter 31, an input/output interface (I/O) 32, a CPU 33, a ROM 34, a RAM 35, a backup RAM 36 and the like. Each detected signal of the throttle opening angle sensor 6, the intake pressure sensor 8, the A/F sensor 16 and the water temperature sensor 23 is input to the A/D converter 31 to be converted from analog to digital and is input to the CPU 33 via a bus 37. The respective pulse signals of the reference position sensor 21 and the rotation angle sensor 22 are input to the CPU 33 via the input/output interface 32 and the bus 37. The CPU 33 detects a throttle opening angle, an suctioned air pressure PM, an air-fuel ratio (A/F), temperature of coolant water Tw, reference crank position (G signal) and an engine speed Ne.

At this time, the CPU 33 discriminates a cylinder to which fuel is to be injected based on the G signal in controlling fuel injection. The CPU 33 also controls an amount of fuel to be injected by the injector 18 based on the—various detected signals indicative of operating states of the engine. Fuel is then injected within a predetermined period in which the stroke of the engine 1 shifts from an exhaust stroke to an intake stroke under the control of fuel injection achieved by the CPU 33 and is supplied into the cylinder (within the combustion chamber 13) as the intake valve 14 opens in the intake stroke.

Next, the structure of the injector 18 will be explained in detail with reference to FIG. 2. It is noted that the injector 18 of the present embodiment is constructed as an electromagnetic valve which is a normally-closed type.

Figure 2:
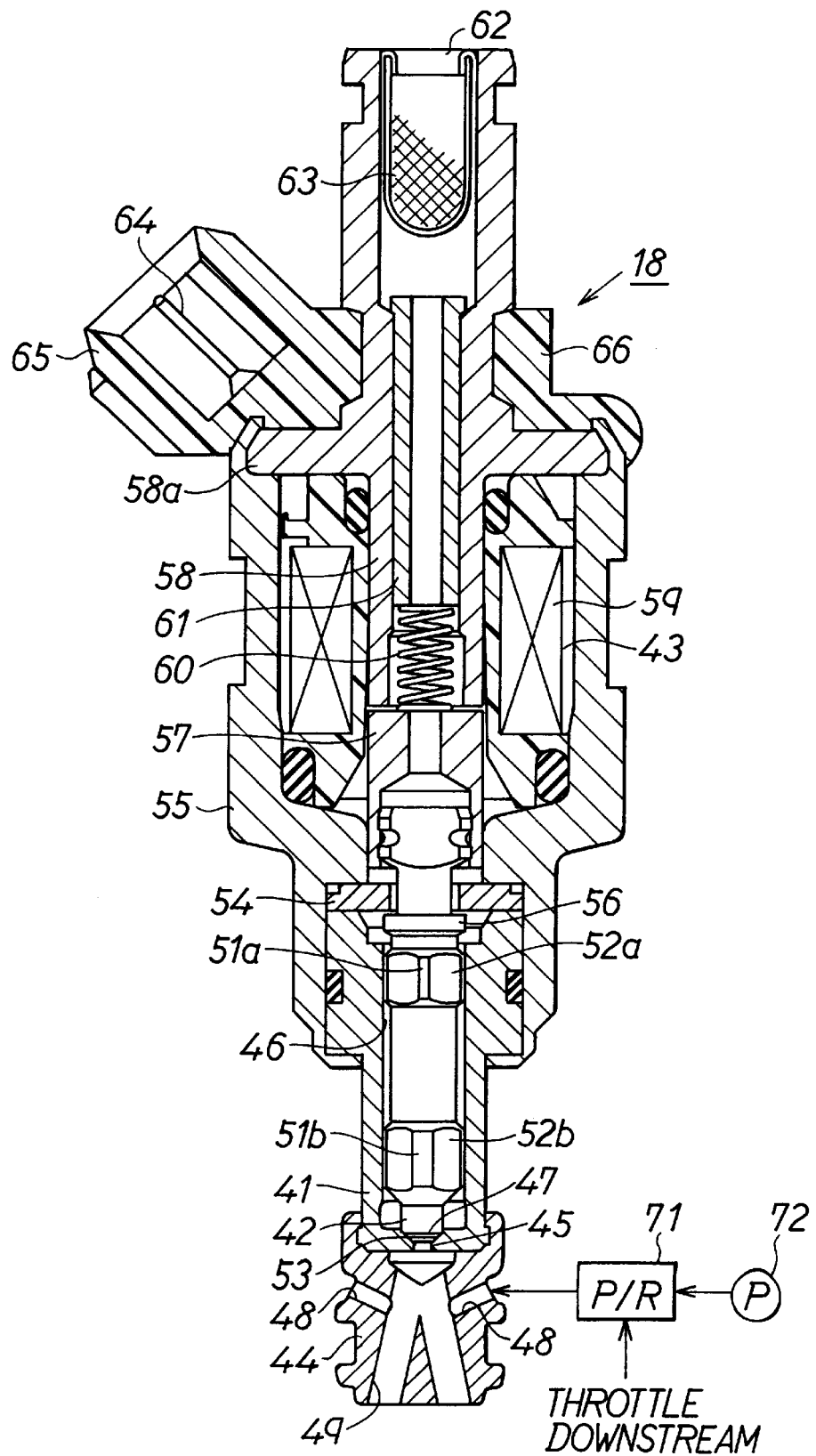
FIG. 2 is a section view showing an air-assisted injector in detail.

In FIG. 2, the main part of the injector 18 is divided into a valve body 41, a valve 42, an electromagnetic actuator 43 and an air-assisting adapter 44. Provided within the valve body 41 having almost a cylindrical shape are an injection port 45 for injecting fuel into the intake pipe 2 at one end thereof (lower end face in the figure) and a sliding hole 46 for slidably storing the valve 42. A valve seat 47 having a conical face is provided between the injection port 45 and the sliding hole 46 of the valve body 41.

The air-assisting adapter 44 is attached on the side of the injection port 45 of the valve body 41 (lower side in the figure) and guides the fuel injected from the injection port 45 into the intake pipe 2. The air-assisting adapter 44 is provided with a plurality of air inlet ports 48 for introducing supplementary air for accelerating atomization of fuel and ramified passages for ramifying and injecting the mixture of the fuel injected from the injection port 45 and the supplementary air introduced from the air inlet port 48 into a plurality of directions at predetermined angles. The ramified passages 49 are ramified into two directions so that they face to the center of the bevel portion of the two intake valves 14 provided in each cylinder. It is noted that because four injection ports are provided in the injector 18 of the present embodiment, it is called a "four-port type injector".

A pressure regulator 71 for controlling pressure of air supplied to the air inlet port 48 of the air-assisting adapter 44 is connected to the air inlet port 48 so as to control the pressure of air supply such that a certain difference of pressure is provided with respect to pressure at the downstream of the throttle valve of the intake pipe 2. An air supply pump 72 which is driven when an IG key is turned on is connected to the pressure regulator 71. Therefore, the atomization of the fuel injected from the injection port 45 is accelerated by introducing air having the predetermined difference of pressure with respect to the intake negative pressure at the downstream of the throttle valve from the air inlet port 48. The valve of the present embodiment is arranged such that pressurized air of around 300 kPa is continuously fed to the air inlet port 48 by the pressure regulator 71 and the air supply pump 72. It may be also arranged such that the pressurized air is supplied by pressurizing by the air supply pump 72 in synchronism with the fuel injection timing. In such a case, the pressurization is started just before starting the injection and is stopped as the injection finishes.

The needle-like valve 42 is provided with sliding contact portions 51a and 51b provided at two positions in the axial direction thereof. The valve 42 slides within the sliding hole 46 as the sliding contact portions 51a and 51b abut with the inner peripheral face of the sliding hole 46. Further, the valve 42 is provided with flat portions 52a and 52b provided at the regions adjacent to the sliding contact portions 51a and 51b in the peripheral direction. Fuel inflows through the gap provided between the flat portions 52a and 52b and the inner peripheral face of the sliding hole 46.

The valve 42 is provided also with an abutting portion 53 which abuts with the valve seat 47 of the valve body 41. The valve 42 is allowed to move between a valve closing position (the position shown in the figure) in which the abutting portion 53 abuts with the valve seat 47, thus closing the injection port 45, and a valve opening position in which the abutting portion 53 is separated from the valve seat 47 by a predetermined distance, thus opening the injection port 45.

A ring stopper 54 is disposed at the upper end face of the valve body 41. The valve 42 is inserted through the stopper 54, thus protruding to the side of a casing 55. Here, the valve 42 is provided with a flange 56 which is stretched out in the peripheral direction. When the valve 42 is pulled up when the electromagnetic actuator 43 is driven, the flange 56 hits the stopper 54, thus restricting the opening position of the valve 42.

The electromagnetic actuator 43 stored within the casing 55 comprises a core (armature) 57, a stator 58 and an electromagnetic coil 59. The core 57 is connected with the valve 42 so that it can move in a body therewith and is urged always to the side for closing the valve 42 (lower side in FIG. 2) by a return spring 60. The stator 58 made of a cylindrical magnetic substance is disposed coaxially with the core 57 and is fixed to the casing 55 by caulking a flange portion 58a thereof by the edge of the casing 55. A pipe-like cylinder 61 is disposed within the stator 58. An inlet port 62 for flowing in fuel is provided at the upstream portion of the cylinder 61 and is provided with a filter 63.

The electromagnetic coil 59 is connected to a terminal 64 for taking in control signals from the outside (ECU 30). This terminal 64 is supported within a connector 65 which is formed of mold resin 66 disposed at the end of the casing 55.

When fuel inflows in from the inlet port 62, it is guided to the sliding hole 46 via the filter 63, the cylinder 61, the core 57 and a gap between the stopper 54 and the valve 42 in the injector 18. Then, when the electromagnetic coil 59 is energized by the ECU 30, it generates magnetic force and pulls up the core 57 in the upper direction in FIG. 2 against the urging force of the return spring 60. Thereby, the gap between the valve seat 47 and the abutting portion 53 is opened and fuel is injected to the intake pipe 2 via the injection port 45 as well as the ramified passages 49 of the air-assisting adapter 44.

Next, operations of the fuel injection control system constructed as described will be explained. In the system of the present embodiment, the operations are summarized as:

(a) controlling timing for flowing fuel into the cylinder at specific timing in the initial period of the intake stroke (control of fuel inflow timing);

(b) partially injecting fuel corresponding to engine operating states (divided or partial injection of fuel); and (c) atomizing the fuel supplied into the cylinder (atomization of injected fuel).

At first, the operation (a) of "control of fuel inflow timing" will be explained with reference to FIGS. 3 through 5.

Figure 3:
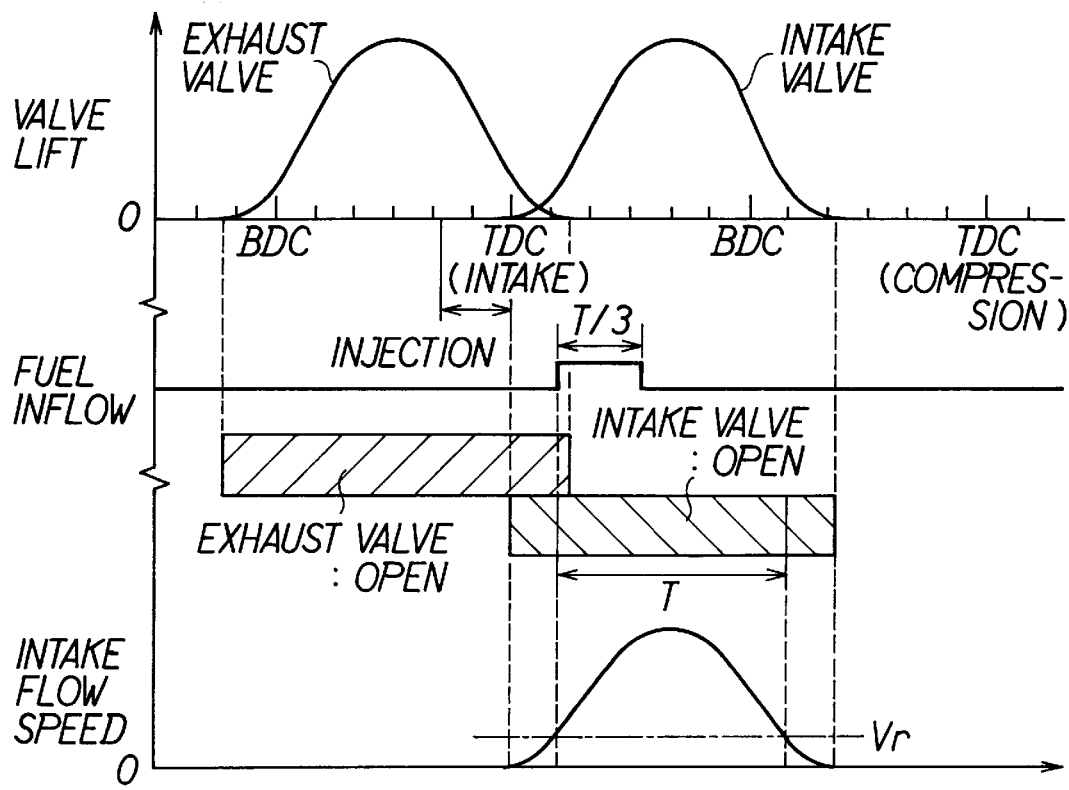
FIG. 3 is a time chart showing valve lifts of intake and exhaust valves when opened, fuel injection timing of the injector and a change of intake flow speed when the intake valve is opened.

FIG. 3 is a time chart showing valve lifts of the intake and exhaust valves 14 and 15 as opened, the fuel injection timing of the injector 18 and changes of intake flow speed when the intake valve 14 is opened, wherein TDC (top dead center) and BDC (bottom dead center) within one cycle of the piston 10 are indicated on the horizontal axis. It is noted that although the intake flow speed actually starts to increase slightly after the opening timing of the intake valve 14, those timings are shown in synchronism in the figure for brevity.

In FIG. 3, the exhaust valve 15 opens just before the BDC and closes right after the TDC (intake TDC). Further, the intake valve 14 opens just before the intake TDC and closes right after the BDC. At this time, a period during which the intake flow speed exceeds a predetermined threshold value Vr as the intake valve 14 is opened is denoted by "T" in the figure. This period "T" corresponds to a period during which the valve lift of the intake valve 14 is about 20% or more as compared with the full-open time (at the time of 100%).

Then, the fuel to be injected by the injector 18 is supplied into the cylinder within "a period of $1/3$" at the beginning of the period T described in the present embodiment. At this time, the sprayed fuel injected by the injector 18 flows into the cylinder by being carried on the suctioned air in the initial period when the intake valve is opened. It is noted that the fuel injection by means of the injector 18 is calculated reversely in correspondence with the case when the timing for flowing fuel into the cylinder is set at "T/3", in FIG. 3. Actually, the fuel injection timing is set at earlier timing by estimating a delay time until when the fuel injected to the intake port 17 reaches the intake valve 14.

The efficiency for charging suctioned air is enhanced and an output torque of the engine 1 improves by flowing the fuel into the cylinder within the period during which the valve lift is more than 20%, i.e., the period of "T/3" in the figure during which the intake flow speed exceeds the predetermined threshold value Vr. Further, the fuel supplying method allows the torque to be increased without increasing unburnt HC. The torque increase will be explained below with reference to FIGS. 4A through 4C.

Figures 4A, 4B, 4C:
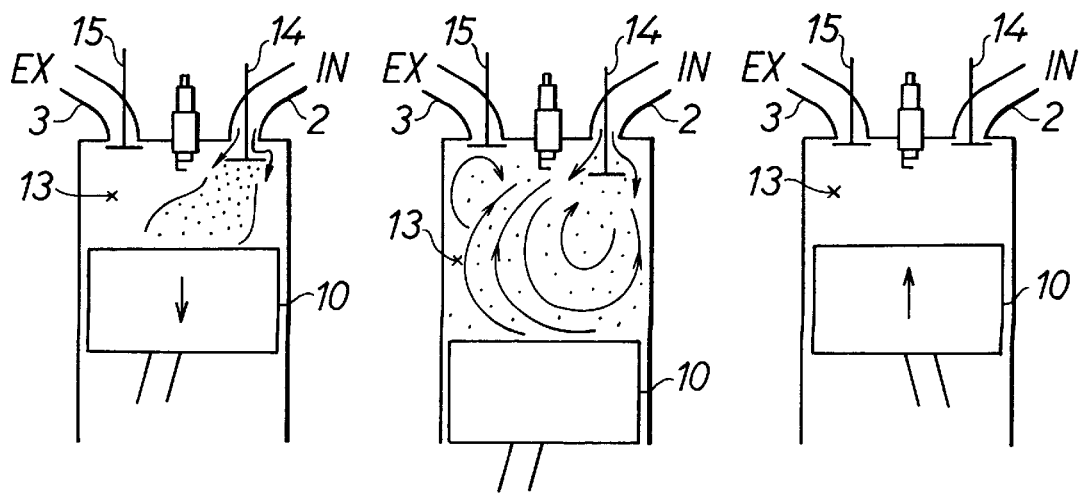
FIGS. 4A through 4C are schematic views showing fuel inflow into a cylinder according to the present embodiment.

FIG. 4A shows a state when atomized fuel inflows into the combustion chamber 13 as the intake valve 14 is opened in the initial period of the intake stroke (the period of T/3 in FIG. 3). In this state, a large amount of atomized fuel inflows into the combustion chamber 13 together with air and is started to be vaporized in the early stage as the piston 10 moves down. Then, because heat is consumed when the fuel is vaporized, temperature of the ambient suctioned air drops.

FIG. 4B shows a state at or just before the bottom dead center (BDC) of the piston 10. At this time, only air is suctioned when the intake valve 14 is opened. The low temperature air within the combustion chamber 13 is agitated by the suctioned air, dropping the temperature of the air further. It is noted that at this point of time, vaporization of the atomized fuel inflown during the initial period of the intake stroke is almost completed. Then, as the density of the air increases due to the drop of the air temperature, the volume of air per unit weight decreases. Accordingly, the amount of air suctioned within the period during which the intake valve 14 is opened increases. That is, efficiency for charging the suctioned air is improved and output torque of the engine 1 is increased.

FIG. 4C shows a state within the cylinder in a compression stroke. Because the fuel is fully vaporized, there remains the least atomized fuel.

There is a possibility that non-vaporized fuel remains even when the intake valve 14 is closed and is exhausted as unburnt HC (wetness of fuel also increases) in the existing system in which fuel is continuously flown in until the later stage of the intake stroke. Further, because the heat of vaporization is not used effectively when the vaporization of fuel is insufficient, the efficiency for charging suctioned air is low. Contrary to this, the efficiency for charging suction air is improved by using the heat of vaporization effectively in the system of the present embodiment.

Figure 5:
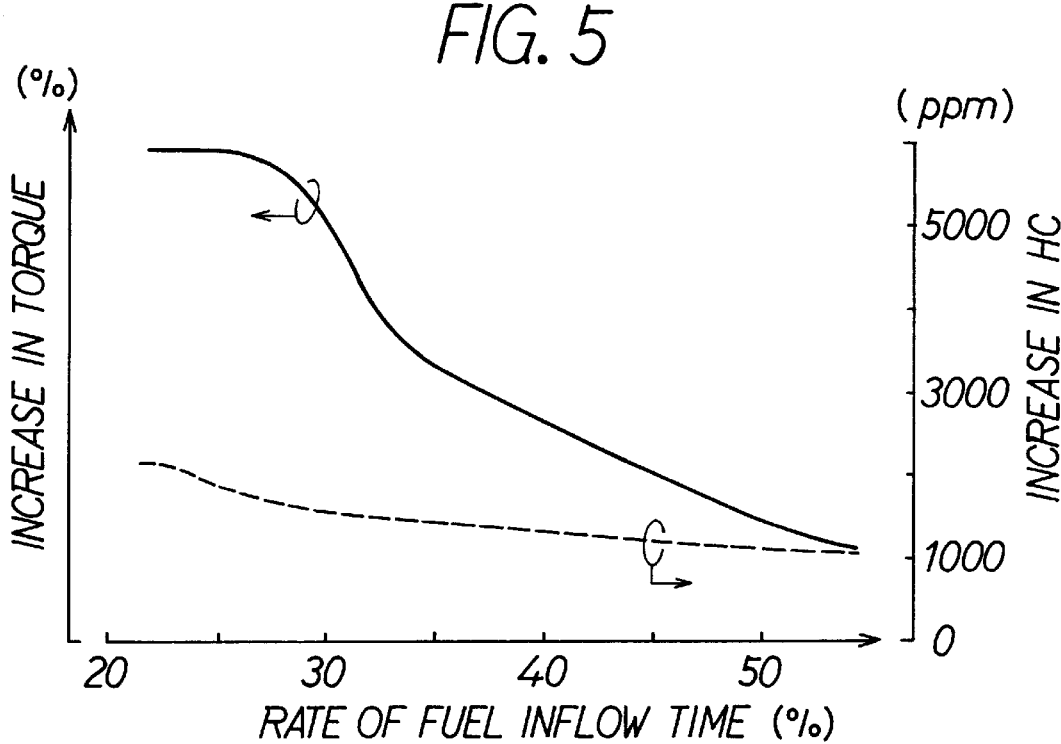
FIG. 5 is a graph showing a relationship between a rate of fuel inflow time and an increase of torque.

FIG. 5 is a graph showing experimental data supporting the phenomenon explained with reference to FIG. 4, wherein the horizontal axis represents a rate of time during which fuel is supplied into the cylinder in the initial period of the intake stroke (actual fuel inflow time/total time during which the lift of the intake valve is 20% or more) and the vertical axes represent the increase of torque and the increase of HC. It is apparent from FIG. 5 that the maximum increase of torque can be provided when the rate of fuel inflow time is reduced to about 30% or less. However, there is a case when the wetness of the cylinder increases and the unburnt HC turns to increase when the rate of fuel inflow time is reduced too much, i.e., the fuel inflow in the initial period of the intake stroke is concentrated in a short time too much. Accordingly, it is desirable to set the rate of fuel inflow time at around 25 to 30% in order to obtain the maximum increase of torque while suppressing the increase of unburnt HC. Then, fuel is supplied into the cylinder within $1/3$ at the initial period of the period T during which the intake flow speed exceeds the predetermined threshold value in the present embodiment due to such reasons.

Next, the operation (b) of "divided injection of fuel" will be explained with reference to FIGS. 6 through 8.

Figure 6A:
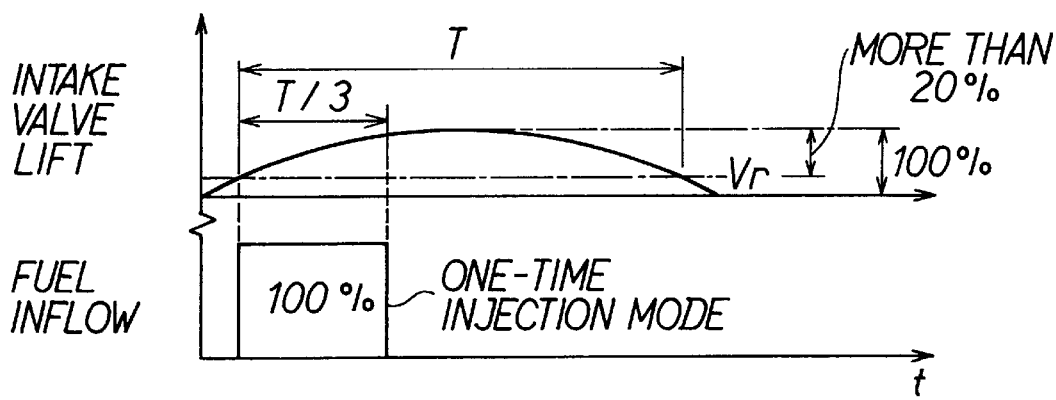
FIGS. 6A and 6B are time charts showing a one-time injection mode and a divided injection mode.
Figure 6B:
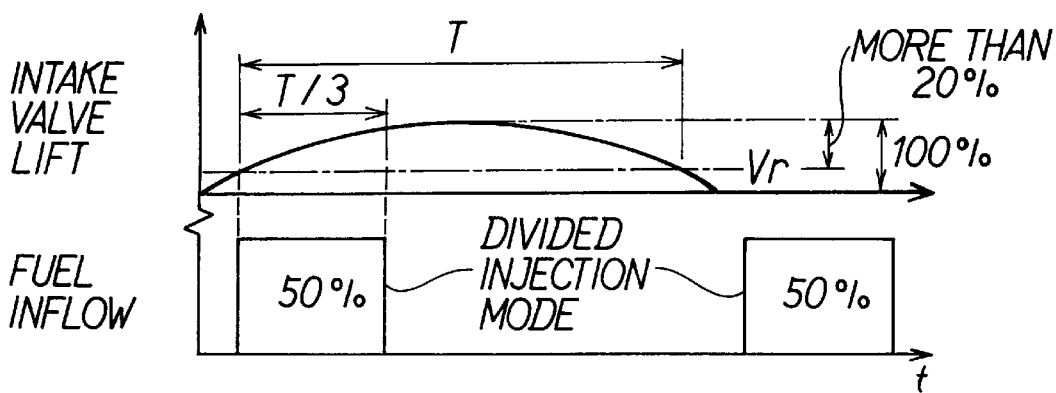

The time indicated by "T/3" in FIG. 3 is shortened when the engine speed increases. Similarly, the fuel injection amount during the time "T/3" also increases when the engine load increases. In such a case, there is a possibility that the discharge of unburnt HC increases when all of the fuel injection amount (100%) is supplied into the cylinder at one time within the period "T/3". Therefore, according to the present embodiment, a mode of injecting all of the fuel (100%) at one time within the period "T/3" as shown in FIG. 6A (one-time injection mode) and a mode of injecting about 50% of all of the fuel within the period "T/3" and of injecting the remaining 50% of fuel aside from the intake stroke as shown in FIG. 6B (divided injection mode) are set.

Figure 7:
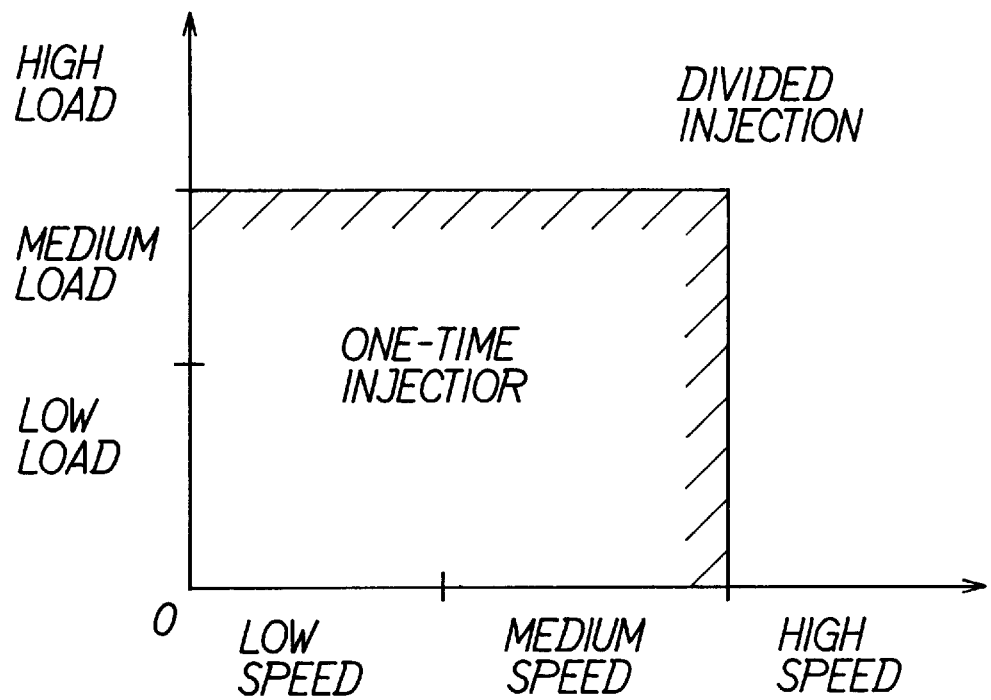
FIG. 7 is a map showing the one-time injection domain and the divided injection domain corresponding to engine operating states.

FIG. 7 is a map showing speed ranges and load ranges of the engine 1 for selecting either the "one-time injection mode" or "divided injection mode". In the figure, a low-to-medium speed range and a low-to-medium load range (slant-lined range in the figure) corresponds to a domain (one-time injection domain) in which fuel is injected by the injector 18 in the one-time injection mode and a high speed range or a high load range corresponds to a domain (divided injection domain) in which fuel is injected by the injector 18 in the divided injection mode.

Further, it is necessary to change a fuel inflow amount injected by the injector 18 per unit time in correspondence with operating states in order to realize the fuel inflow within the period T/3 as described in the whole range of the operation of the engine. That is, in case of the one-time injection mode, although the injection flow amount of the injector 18 per unit time may be less during when the engine speed or load is low, the injection flow amount of the injector 18 per unit time must be increased when the engine speed or load increases. Then, according to the present embodiment, the injection flow amount per unit time is controlled by varying pressure of fuel (fuel pressure Pf) fed to the injector 18 by controlling a command current (pump current) for the fuel pump 26.

Figure 8:
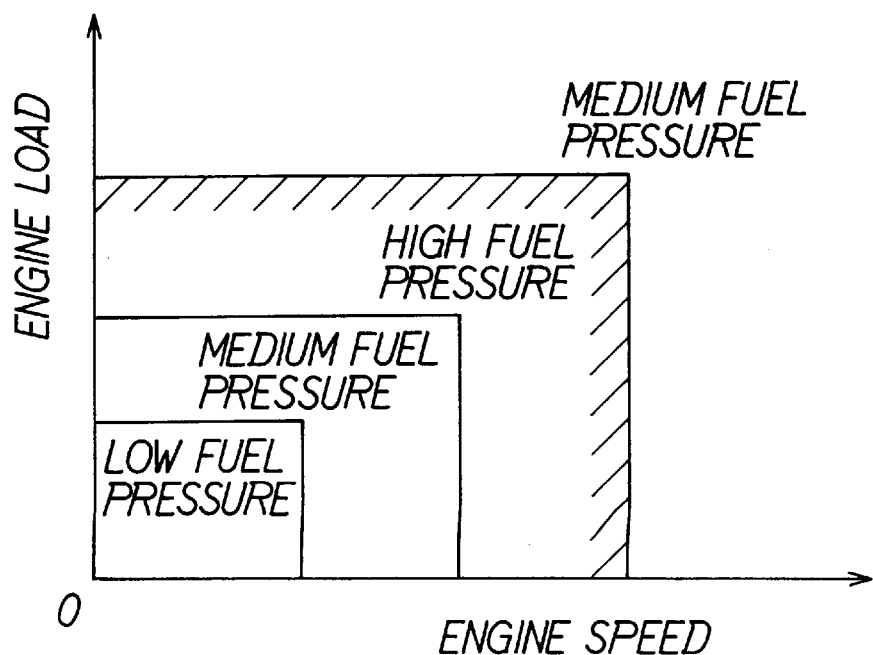
FIG. 8 is a map showing fuel pressure domains corresponding to the engine operating states.

FIG. 8 is a map for setting the fuel pressure Pf in correspondence with the engine speed and the engine load. A slant-lined range in FIG. 8 is the same domain with the one-time injection domain in the map in FIG. 7. Within the domain, a low fuel pressure domain, a medium fuel pressure domain and a high fuel pressure domain are set corresponding to the engine speed and the engine load. It is noted that the medium fuel pressure domain is set in the domain (high speed and high load domain) corresponding to the divided injection domain in FIG. 7.

Next, the operation (c) of "atomization of injected fuel" will be explained below with reference to FIGS. 9 through 12.

Figure 9:
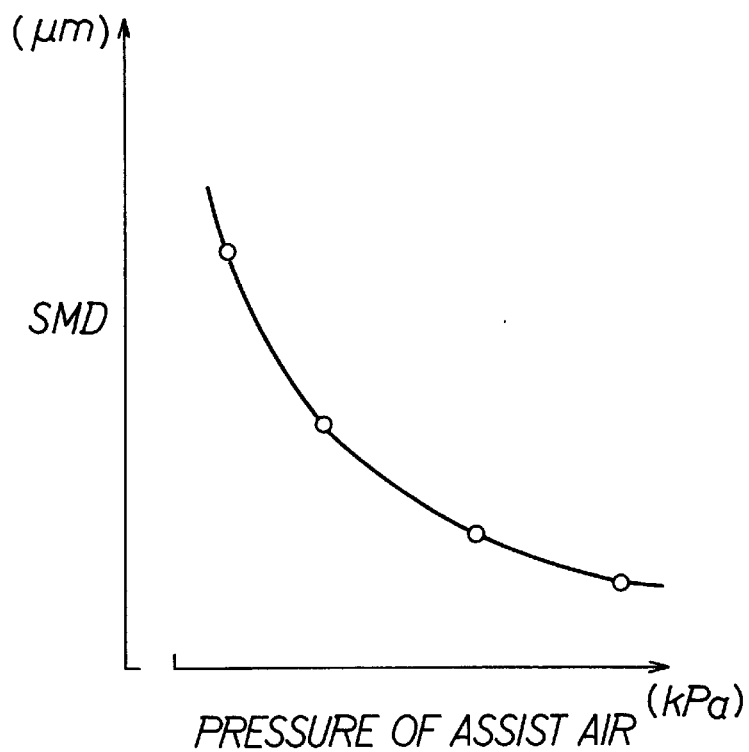
FIG. 9 is a graph showing a relationship between pressure of pressurized air of the injector and a fuel particle size SMD.

That is, according to the present embodiment, the air-assisted injector 18 is used and the fuel is atomized such that the particle size of the fuel (SMD: Sauter's Mean Diameter) falls within a predetermined range by controlling pressurized air fed to the injector 18. It is noted here that the particle size SMD has a relationship as shown in FIG. 9 with respect to pressure of the pressurized air of the injector 18. That is, the larger the pressure of the pressurized air, the smaller the fuel particle size SMD becomes. The fuel is thus atomized.

Figure 10:
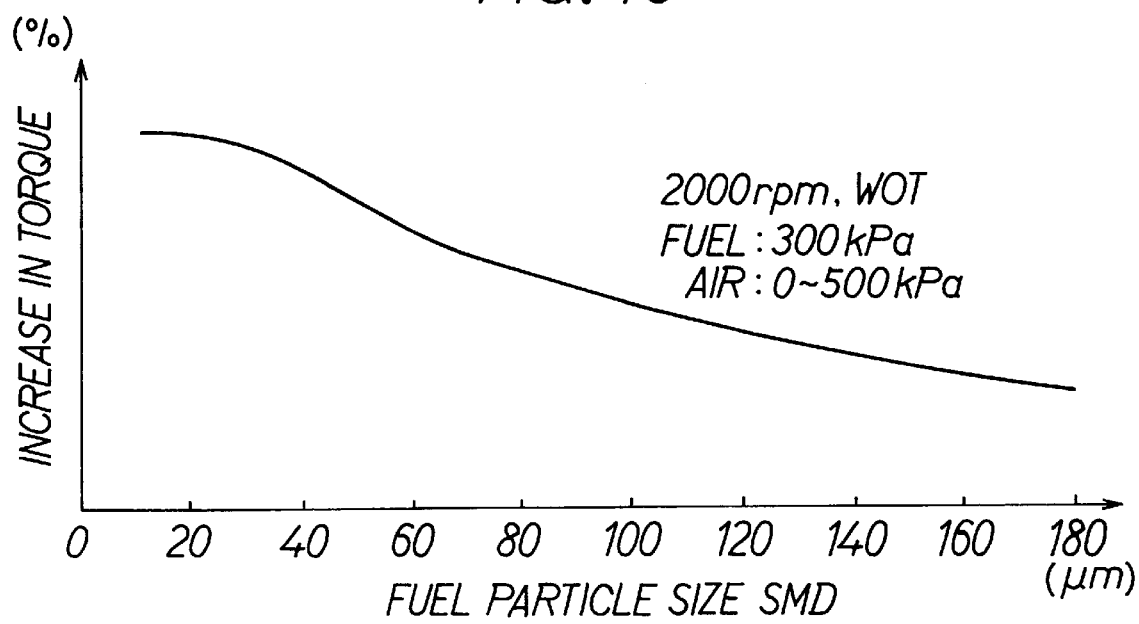
FIG. 10 is a graph showing a relationship between the fuel particle size SMD and the increase of torque.

FIG. 10 shows a result of the effect of the fuel particle size SMD on the increase of torque studied and confirmed by an actual engine. In the graph, the vertical axis represents the increase of torque when the fuel particle size SMD is changed by controlling the pressure of air fed to the injector 18 (0 to 500 kPa) under the condition of Ne=2000 rpm and WOT (wide-open throttle indicative of full load). It is noted that at this time, the—operation (a) of the "control of fuel inflow timing" is implemented to flow the fuel into the cylinder within the period of T/3 at the beginning of the period T during which the intake flow speed exceeds the predetermined value.

As shown in FIG. 10, the smaller the fuel particle size SMD, the greater the increase of torque is (by about several %). It is also considered that there is an optimum value of the fuel particle size SMD for bringing out the effect of heat of vaporization in maximum and estimating from the result of the graph and others, the optimum value of the SMD is found to be around 10 to 30 $\mu$m.

When the fuel is supplied to each cylinder by the method described in the operation (a), the fuel is liable to be carried on the flow of air when the intake valve 14 opens, thus reducing the adhesion of fuel on the intake port 17 (port wet) and considerably reducing a spike of air-fuel ratio during transition periods of the engine. This effect of reducing the spike of air-fuel ratio may be enhanced further by controlling the fuel particle size SMD at a predetermined value. A result provided by confirming this effect by an actual engine will be explained below with reference to FIG. 11.

Figure 11:
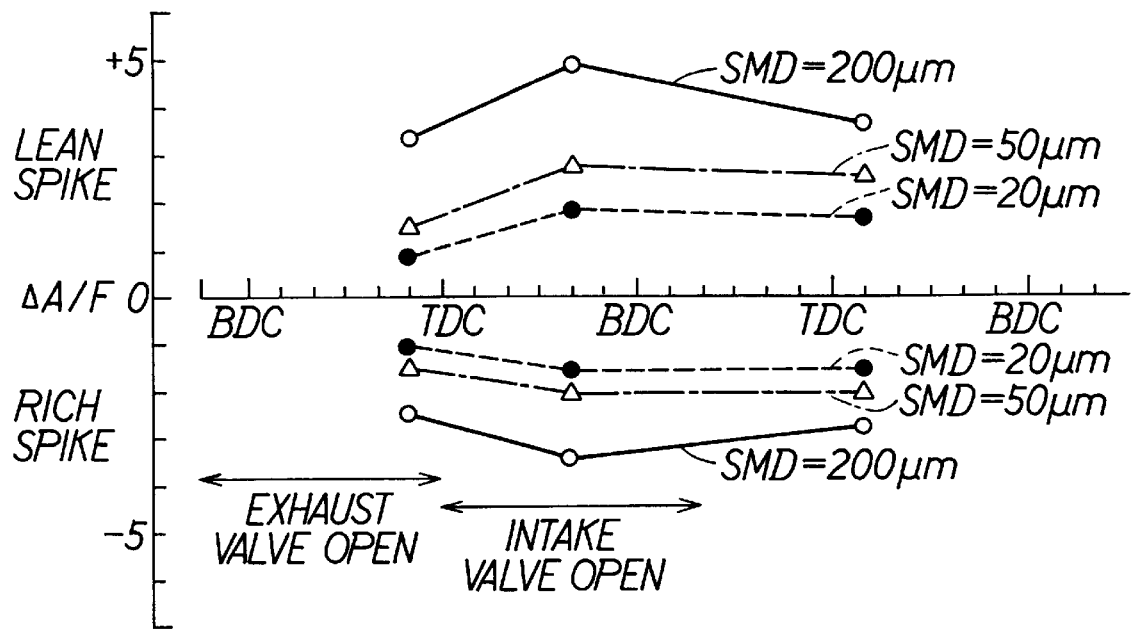
FIG. 11 is a graph showing a relationship between injection ending timing and a difference $\Delta$A/F of air-fuel ratio per fuel particle size.

The experimental result shown in FIG. 11 is what lean spike or rich spike of the air-fuel ratio is generated by increasing/decreasing pressure in the intake pipe under the condition of no low temperature correction from Ne=2000 rpm, co Tw=20° C. and the air-fuel ratio=stoichiometric ratio (14.7).

Figure 12A:
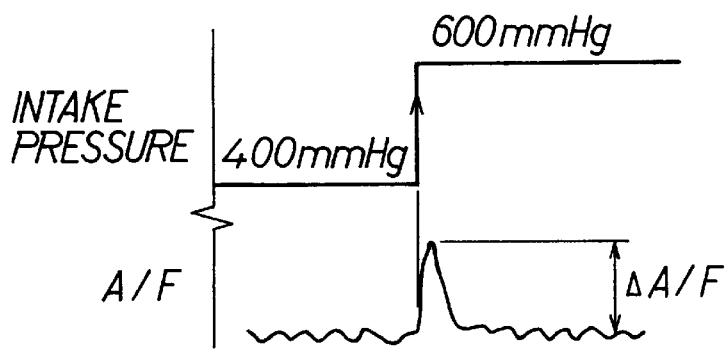
FIGS. 12A and 12B are charts showing lean spike and rich spike of the air-fuel ratio during transient operations.
Figure 12B:
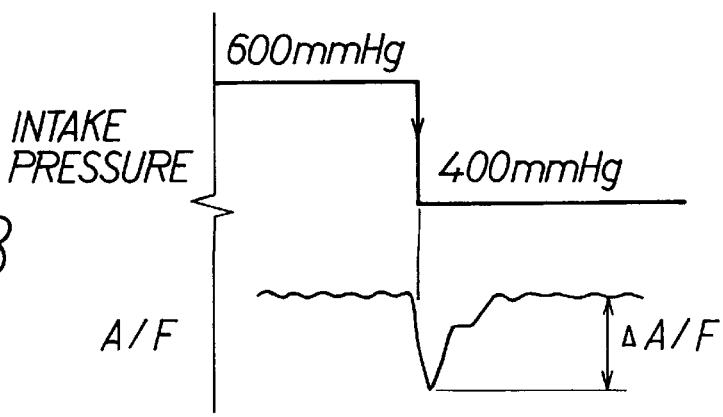

In such experiment, the pressure in the intake pipe is changed stepwise from 400 mmHg to 600 mmHg as shown in FIG. 12A during the lean spike of the air-fuel ratio. On the contrary, the pressure in the intake pipe is changed stepwise from 600 mmHg to 400 mmHg as shown in FIG. 12B during the rich spike of the air-fuel ratio.

A difference $\Delta$A/F of the air-fuel ratio to the lean side or to the rich side during the lean or rich spike is plotted on the vertical axis of FIG. 11 for each whose fuel particle size SMD is 20 $\mu$m, 50 $\mu$m and 200 $\mu$m. The horizontal axis of the graph in FIG. 11 represents a crank angle of the engine 1. Supposing that the injection ending timings in which the time until when the fuel is supplied into the cylinder is considered are 30° CA before the intake TDC, 120° CA after the intake TDC (center of opening of intake valve) and 30° CA after the compression TDC, respectively, the graph shows respective $\Delta$A/F with those crank angles.

It is apparent from FIG. 11 that the smaller the fuel particle size SMD, the smaller the difference $\Delta$A/F of the air-fuel ratio is at either cases of the lean and rich spikes. Further, it is found that the difference $\Delta$A/F of the air-fuel ratio is minimized when the injection ending timing is set before the opening of the intake valve so that fuel inflows into the cylinder in the initial period of the intake stroke. It is considered to have happened because the fuel inflows into the cylinder without adhering on the intake port 17 by being carried on the flow of the suctioned air by ending the injection before opening the intake valve. It can be understood from this result that the worsening of emission caused by the difference of air-fuel ratio in transition periods may be suppressed considerably as compared with the prior art systems. It is confirmed that this phenomenon is provided in the same manner even when the temperature of coolant water is as high as 80° C.

It is also observed from experimental results provided by visualizing the spray of fuel into the intake port 17 that favorite spray is attained and the mixture flows into the cylinder ideally when the atomized fuel is injected at the timing just before opening the intake valve 14 (30° CA before the intake TDC).

Figure 14:
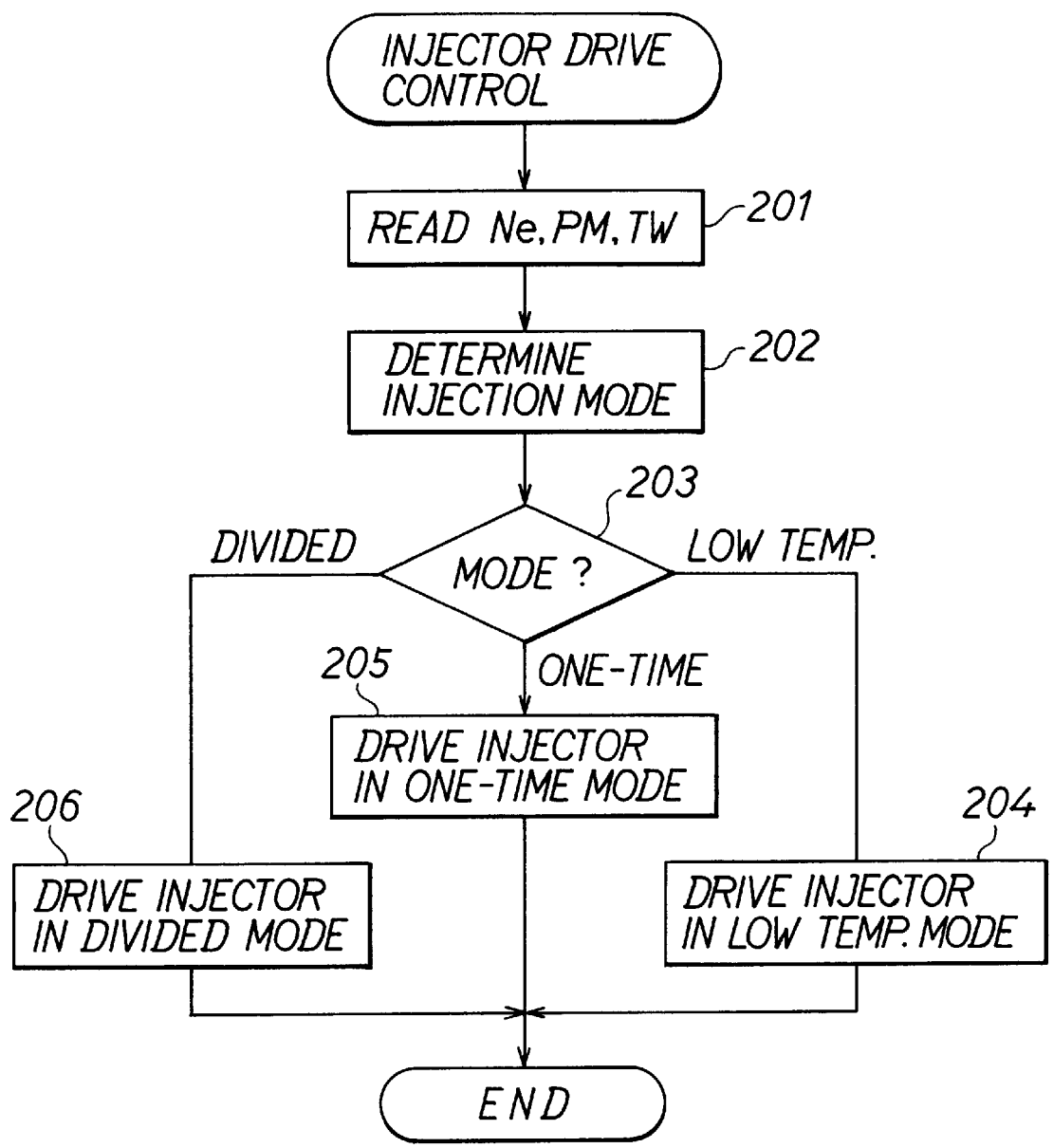
FIG. 14 is a flow chart showing a routine for controlling drive of the injector.
Figure 15:
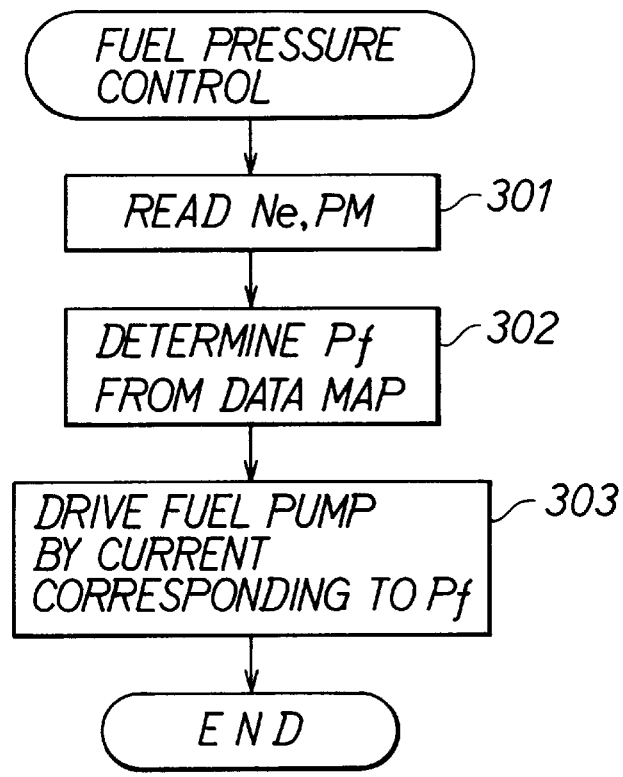
FIG. 15 is a flow chart showing a routine for controlling fuel pressure.

Next, various operational processes implemented by the CPU 33 within the ECU 30 to control the fuel supplying operation will be explained with reference to flow charts in FIGS. 13 through 15. The TAU calculating routine in FIG. 13 is executed in synchronism with the injection of fuel into each cylinder (per 180° CA in the present embodiment) and the other routines in FIGS. 14 and 15 are executed by timer interruption at a predetermined cycle.

Figure 13:
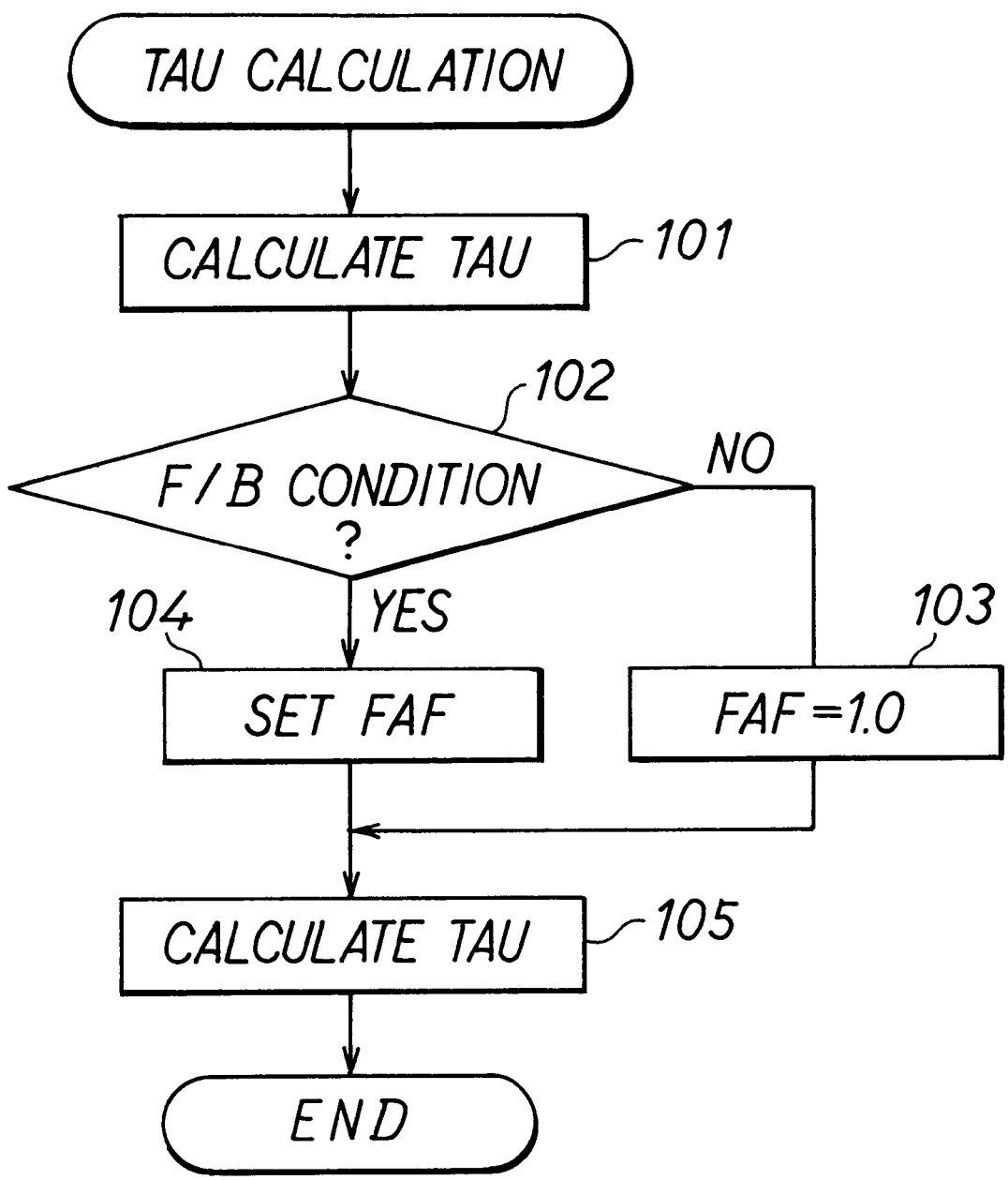
FIG. 13 is a flow chart showing a routine for calculating TAU.

When the TAU calculating routine in FIG. 13 is started, the CPU 33 calculates at first a fuel basic injection time Tp corresponding to an engine speed Ne and an intake pressure PM at that time by using a basic injection map stored in advance in the ROM 34 in Step 101. Further, the CPU 33 discriminates whether a known condition of air-fuel ratio F/B holds or not in Step 102. Here, the condition of air-fuel ratio F/B includes that the coolant water temperature Tw is more than a predetermined temperature, the engine is not in high speed and high load states, the A/F sensor 16 is in the active state and others.

When it is discriminated to be NO in Step 102, the CPU 33 advances to Step 103 to set F/B correction factor FAF to "1.0". That is, FAF=1.0 means that the air-fuel ratio is open-loop controlled. When it is discriminated to be YES in Step 102, the CPU 33 advances to Step 104 to set the F/B correction factor FAF.

The air-fuel ratio feedback (F/B) based on the advanced control theory is implemented in the present embodiment. In controlling F/B, the F/B correction factor FAF for making a result detected by the A/F sensor 16 to agree with a target air-fuel ratio is calculated by using the following expressions (1) and (2). It is noted that a procedure for setting the F/B correction factor FAF is disclosed in Japanese Patent Application Laid-Open No. 1-110853.

$$FAF = K1 \cdot \lambda + K2 \cdot FAF1 + \cdots + Kn+1 \cdot FAFn + ZI \quad (1)$$

$$ZI = ZII + Ka \cdot (\lambda TG - \lambda) \quad (2)$$

In the expressions (1) and (2), $\lambda$ denotes a converted value of air-fuel ratio of the current produced by the A/F sensor 16, $\lambda$TG denotes the target air-fuel ratio, K1 through Kn+1 denotes F/B constants, ZI denotes an integral term and Ka denotes an integral constant, respectively. The subscripts 1 through n+1 are variables indicative of a number of times of control from the start of sampling.

After setting the FAF value, the CPU 33 calculates the basic injection time Tp, the F/B correction factor FAF, other correction factor FALL corresponding to various correction factors such as water temperature, load of air-conditioner and the like, and the final fuel injection time TAU from an invalid injection time Tv by using the following expression (3) in Step 105.

$$TAU = Tp \cdot FAF \cdot FALL + Tv \qquad (3)$$

After calculating the fuel injection time TAU, the CPU 33 ends this routine once.

When the routine for controlling drive of the injector shown in FIG. 14 is activated by the timer interruption of the predetermined cycle, e.g., 4 msec., the CPU 33 reads the engine operating states such as the engine speed Ne, the intake pressure PM, the coolant water temperature Tw and the like in Step 201. Then, it determines a fuel injection mode based on the operating states read as described in Step 202. In determining the fuel injection mode, the CPU 33 selects either the "one-time injection mode" or the "divided injection mode" corresponding to which speed range of low, medium or high the engine speed Ne is located or to which load range of low, medium and high the engine load (intake pressure PM) is located by using basically the map shown in FIG. 7. However, fuel is injected in a "low temperature mode" in starting the engine 1 at low temperature for example without injecting fuel in the two modes in the present embodiment. Accordingly, one fuel injection mode is selected among the above three modes including the low temperature mode in determining the mode in Step 202.

After that, the CPU 33 discriminates the fuel injection mode determined as described in Step 203. At this time, when the CPU 33 discriminates it to be the "low temperature mode" in starting the engine 1 in low temperature for example, it advances to Step 204 to drive the injector 18 in the low temperature mode to inject fuel. The injector is driven in the low temperature mode by injecting the fuel before the intake stroke and by flowing the fuel to be injected into the cylinder across the whole range of the intake stroke. It corresponds to the fuel injection operation of the conventional system.

When the CPU 33 discriminates it to be the "one-time injection mode", it advances to Step 205 to drive the injector 18 in the one-time injection mode to inject fuel. In the one-time injection mode, the fuel injection timing is set at the timing of ⅓ of the initial period of the intake stroke as shown in FIG. 6A (actually, at timing earlier by a flying time of the injected fuel).

When the CPU 33 discriminates it to be the "divided injection model", it advances to Step 206 to drive the injector 18 in the divided injection mode to inject fuel. In the divided injection mode, the fuel injection timing is set at the timing of ⅓ of the initial period of the intake stroke and at the predetermined timing after the intake stroke as shown in FIG. 6B (actually, at timing earlier by the flying time of the injected fuel).

The CPU 33 outputs a driving signal corresponding to each injection mode to an injector driving circuit not shown in Steps 204, 205 and 206 and ends the routine in FIG. 14 once after processing each of those steps.

When the routine for controlling the fuel pressure in FIG. 15 is activated by timer interruption of a predetermined cycle, e.g., 32 msec., the CPU 33 reads the operating states of the engine such as the engine speed Ne and the intake pressure PM in Step 301 at first. Then, it determines the fuel pressure Pf based on the operating states in Step 302. In determining the fuel pressure Pf, the CPU 33 selects either low, medium or high fuel pressure Pf corresponding to the engine speed Ne and the engine load (intake pressure PM) by using the mapped data shown in FIG. 8.

After that, the CPU 33 drives the fuel pump 26 by a pump current corresponding to the fuel pressure Pf determined in Step 303. Thereby, an injection flow amount per unit time of the injector 18 is determined. As a result, the—one-time injection or the divided injection can be realized regardless whether or not the engine speed or the engine load fluctuates.

The following results may be provided by the present embodiment described in detail:

(A) The drive of the injector 18 is controlled such that fuel injected by the injector 18 flows into the cylinder (within the combustion chamber 13) within the time of about ⅓ at the beginning of the valve opening period of the intake valve 14 in the present embodiment (FIG. 3). According to this arrangement, the large amount of fuel supplied into the cylinder is vaporized in the early stage and the vaporization of the fuel supplied into the cylinder is completed before the intake valve 14 is closed and the intake is finished. At this time, weight (density) of the air suctioned within the cylinder per unit volume increases because the temperature of air drops due to the heat of vaporization of the fuel. As a result, the efficiency for charging the suctioned air may be enhanced and the combustion state of the engine 1 may be stabilized. Further, much air may be suctioned and the output torque may be improved.

(B) The timing for flowing the fuel injected by the injector 18 into the cylinder is limited within the period during which the intake flow speed exceeds the predetermined threshold value Vr when the intake valve 14 is opened. This arrangement allows the problem that the injected fuel adheres on the wall surface of the intake port to be avoided (port wetness decreases) because the fuel injected by the injector 18 is liable to be carried on the flow of the suction air when the intake valve is opened by flowing the fuel within the period during which the intake flow speed is fast.

(C) The decrease of the fuel port wetness also allows to provide an effect that spikes of air-fuel ratio decreases considerably during the transient operation of the engine 1.

(D) As the method for driving and controlling the injector 18, the "one-time injection mode" and the "divided injection mode" is selected corresponding to the rotational and load states of the engine 1 in the present embodiment (FIGS. 6A, 6B, 7 and 14). Thereby, the atomization of the fuel supplied into the cylinder is accelerated, improving the efficiency for charging air and increasing the torque. In addition to that, unburnt fuel (HC) is suppressed from being emitted during when the engine 1 is operated at high speed or at high load.

(E) The pressure of fuel (Pf) supplied from the fuel tank 19 to the injector 18 is controlled by driving the fuel pump 26 in the present embodiment. This arrangement allows the injection flow amount per unit time to be modified by changing the fuel pressure Pf, allowing also to deal with a case when the engine speed is increased. That is, it is possible to realize it at any engine speed range when fuel to be injected by the injector 18 is supplied into the cylinder within the specific time of the intake stroke.

(F) The fuel to be injected by the injector 18 is atomized by controlling the pressure of air fed to the injector 18 by using the air-assisted injector 18 and by injecting the fuel to the bevel portion of the intake valve 14 at high temperature in the present embodiment. In such a case, the vaporization of the fuel within the cylinder is accelerated further by atomizing the injected fuel. Accordingly, temperature of air drops due to the heat of vaporization of the fuel when the air is suctioned into the cylinder, thus steadily improving the efficiency for charging the suctioned air. Then, the output torque of the engine 1 increases. This is confirmed also from the results of experiments carried out by the inventors (FIG. 10). It is noted that it is also confirmed by the inventors that the optimum range of the fuel particle size SMD is 10 to 30 μm.

Figure 16:
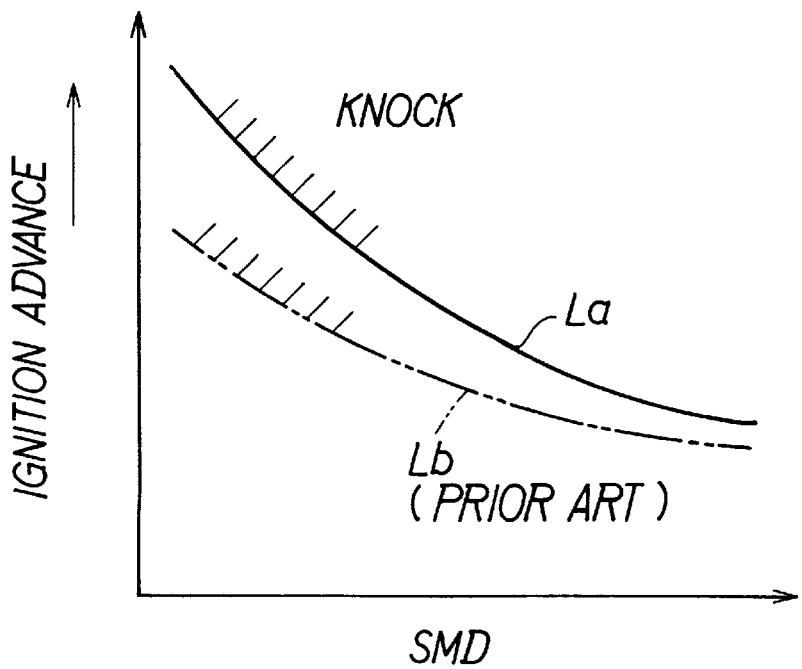
FIG. 16 is a graph showing a relationship between a fuel particle size and a knock limit.

(G) The present embodiment brings about also an effect of improving a knock limit by flowing in fuel in the early stage in the intake stroke and due to the drop of temperature of the suctioned air caused by the atomization of the fuel. FIG. 16 is a graph showing the knock limit corresponding to the fuel particle size SMD, wherein the horizontal axis represents the fuel particle size SMD and the vertical axis represents igniting timing. In the figure, a knock limit characteristic curve La shown by a solid line represents the experimental result of the system of the present embodiment in which fuel is supplied into the cylinder in the initial period of the intake stroke and a knock limit characteristic curve Lb shown by an alternate dotted line represents an experimental result of the prior art system in which fuel is supplied into the cylinder in the whole range of the intake stroke. It is then apparent from FIG. 16 that the knock limit of the characteristic curve La is shifted to the advanced side more than that of the characteristic curve Lb and that the knock limit is shifted to the advanced side by atomizing the fuel to be injected. Shifting the knock limit to the advanced side means that a compression ratio of the engine 1 may be set high. In such a case, thermal efficiency is increased theoretically as it is apparent also from the following expression (4) and as a result, the output torque increases.

$$\eta th = 1 - (1/\epsilon)^{(K-1)} \quad (4)$$

In this expression, nth denotes the thermal efficiency (%) of the engine 1, ε denotes the compression ratio, and k denotes ratio of specific heat.

First Modification of the First Embodiment

Figure 17:
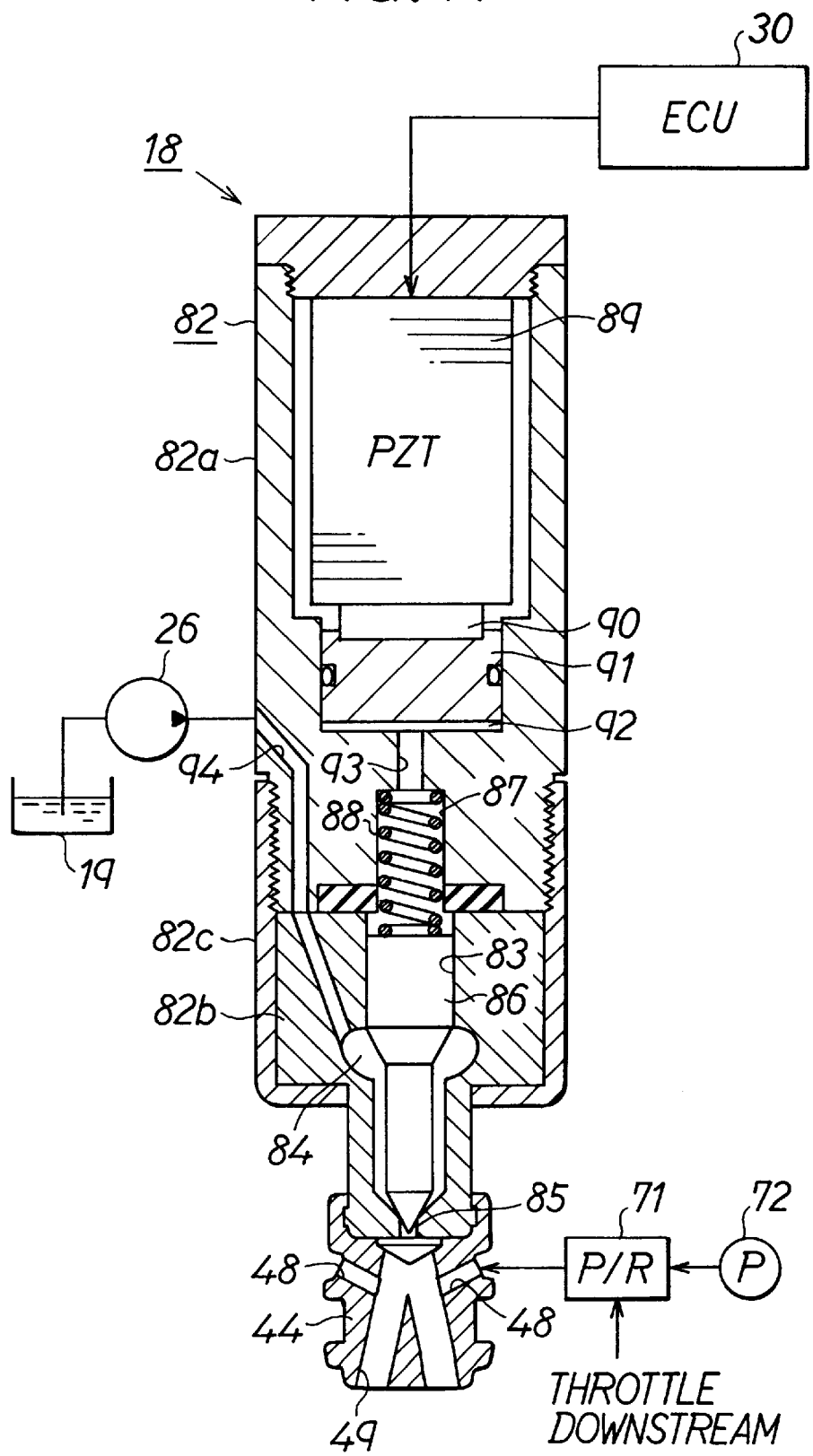
FIG. 17 is a section view showing a piezo-driven injector according to a first modification of the first embodiment.

Although the injection flow amount of the injector 18 per unit time is changed by variably controlling the fuel pressure Pf in the first embodiment, the injection flow amount is changed by holding the fuel pressure Pf at a fixed value and by variably controlling a lift of the valve of the injector. FIG. 17 shows a structure of a piezo-driven injector 81.

In the injector 18 shown in FIG. 17, a valve body 82 has a case section 82a and a nozzle section 82b which are connected in a body by a retaining ring 82c. A sliding hole 83, a fuel chamber 84 and an injection port 85 are provided within the nozzle section 82b. A needle-like valve 86 is slidably fitted through the sliding hole 83 in the axial direction thereof. A back-pressure chamber 87 which communicates with the sliding hole 83 and which stores a coil spring 88 is provided within the case section 82a. Accordingly, the valve 86 is always urged to the edge side (lower side in the figure) of the nozzle section 82b by elastic force of the coil spring 88. Thereby, the valve 86 normally (when not-driven) contacts with the edge of the nozzle section 82b and closes the injection port 85 by the elastic force of the coil spring 88. It is noted the air-assisting adapter 44 explained before with reference to FIG. 2 is attached at the edge of the nozzle section 82b. The air-assisting adapter 44 plays the roles of accelerating the atomization of the fuel injected from the injection port 85 and of guiding the injected fuel into the intake pipe 2.

Further, a piezo-stack 89 which expands/contracts when voltage is applied is disposed within the case section 82a. The piezoelectric stack 89 is constructed by laminating a number of piezoelectric elements of PZTs (lead-titanate-zirconate). The ECU 30 applies a predetermined voltage to that. It is noted that it is also possible to use PLZT (lead-titanate-zirconate-lanthanate) which is one of piezoelectric ceramic as the piezoelectric element. A mover 90 and a piston 91 are fixed and connected at the lower end face of the piezoelectric stack 89. The piston 91 moves pursuant to strain deformation of the piezoelectric stack 89. A pressure control chamber 92 is provided below the piston 91 in the figure and is communicated with the back-pressure chamber 87 via a communication path 93.

A fuel supplying path 94 is provided through the valve body 82 and one end thereof (open end of the case section 82a) is connected to the fuel pump 26 for pumping up fuel within the fuel tank 19. The other end of the fuel supplying path 94 communicates with the fuel chamber 84 of the nozzle section 82b.

When the fuel is injected by the injector 18, the piezoelectric stack 89 deforms in the contracting direction by the voltage signal from the ECU 30, thus permitting the piston 91 to retreat (upward move in FIG. 17). Thereby, a negative pressure is generated within the pressure control chamber 92 and the valve 96 moves upward going against the elastic force of the coil spring 88. As a result, the contact of the valve 86 with the edge of the nozzle section 82b is released and fuel is injected from the injection port 85. Further, when the piezoelectric stack 89 deforms in the opposite direction (in the extending direction) and the piston 91 moves ahead, the valve 86 advances and the injection port 85 is closed.

Figure 18:
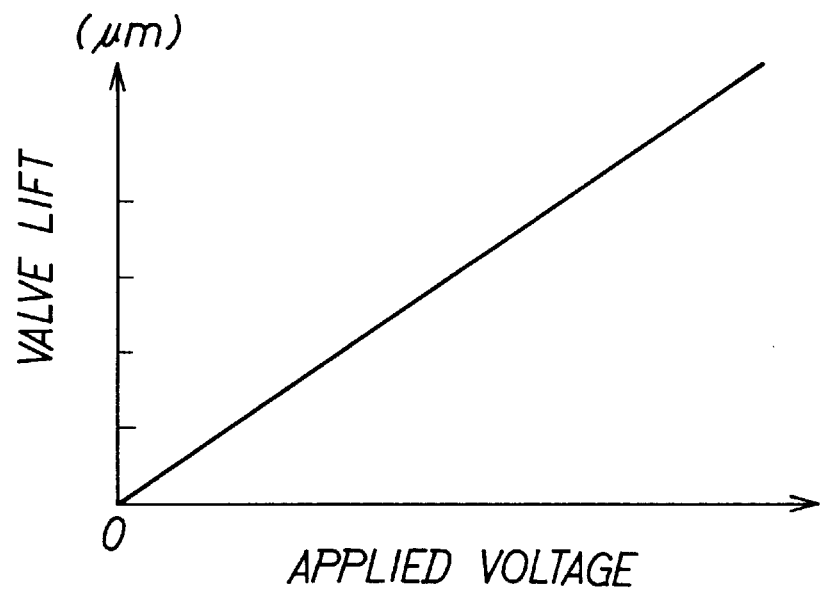
FIG. 18 is a graph showing a relationship between voltage applied to a piezoelectric stack and a lift of a valve.
Figure 19:
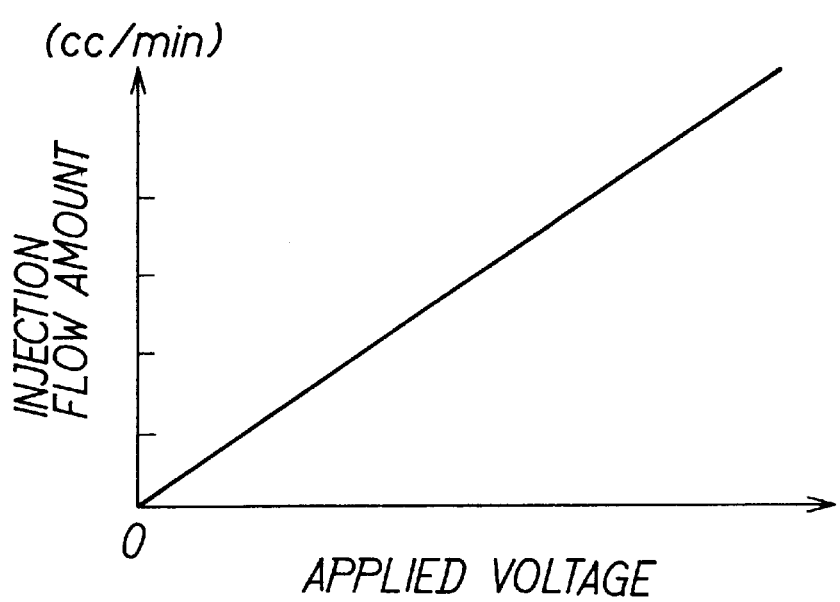
FIG. 19 is a graph showing a relationship between voltage applied to the piezoelectric stack and an injection flow amount.

The arrangement allows the lift of the valve 86 to be set at an arbitrary value by changing the voltage applied to the piezoelectric stack 89. That is, it allows a fuel passing area to be varied and the fuel injection flow amount to be changed without changing the fuel pressure Pf as a result. Specifically, the lift is controlled by applying a DC voltage of 0 to 500 volts to the piezoelectric stack 89. FIG. 18 shows a relationship between the voltage applied to the piezoelectric stack 89 and the lift of the valve of the injector 18 and FIG. 19 shows a relationship between the voltage applied to the piezoelectric stack 89 and the injection flow amount per unit time of the injector 81.

The control of the injection flow amount made by the piezoelectric stack 89 as described is executed corresponding to the engine speed and the engine load (intake pressure PM) as shown in the map in FIG. 8 for example.

The injection flow amount per unit time injected from the injector 18 is controlled by controlling the expansion and contraction of the piezoelectric stack 89 in the first modification. Therefore, it is possible to realize it at any engine speed range when fuel to be injected by the injector 18 is supplied into the cylinder within the specific timing in the intake stroke, in the period of ⅓ of the initial stage of the intake stroke.

Second Modification of the First Embodiment

In the second modification, a phase-driven variable valve timing mechanism (VVT mechanism) is provided for the engine 1 to control the timing for injecting fuel by the injector 18 in correspondence with a control of the VVT mechanism while controlling timing for opening/closing the intake and exhaust valves by the VVT mechanism.

Figure 20:
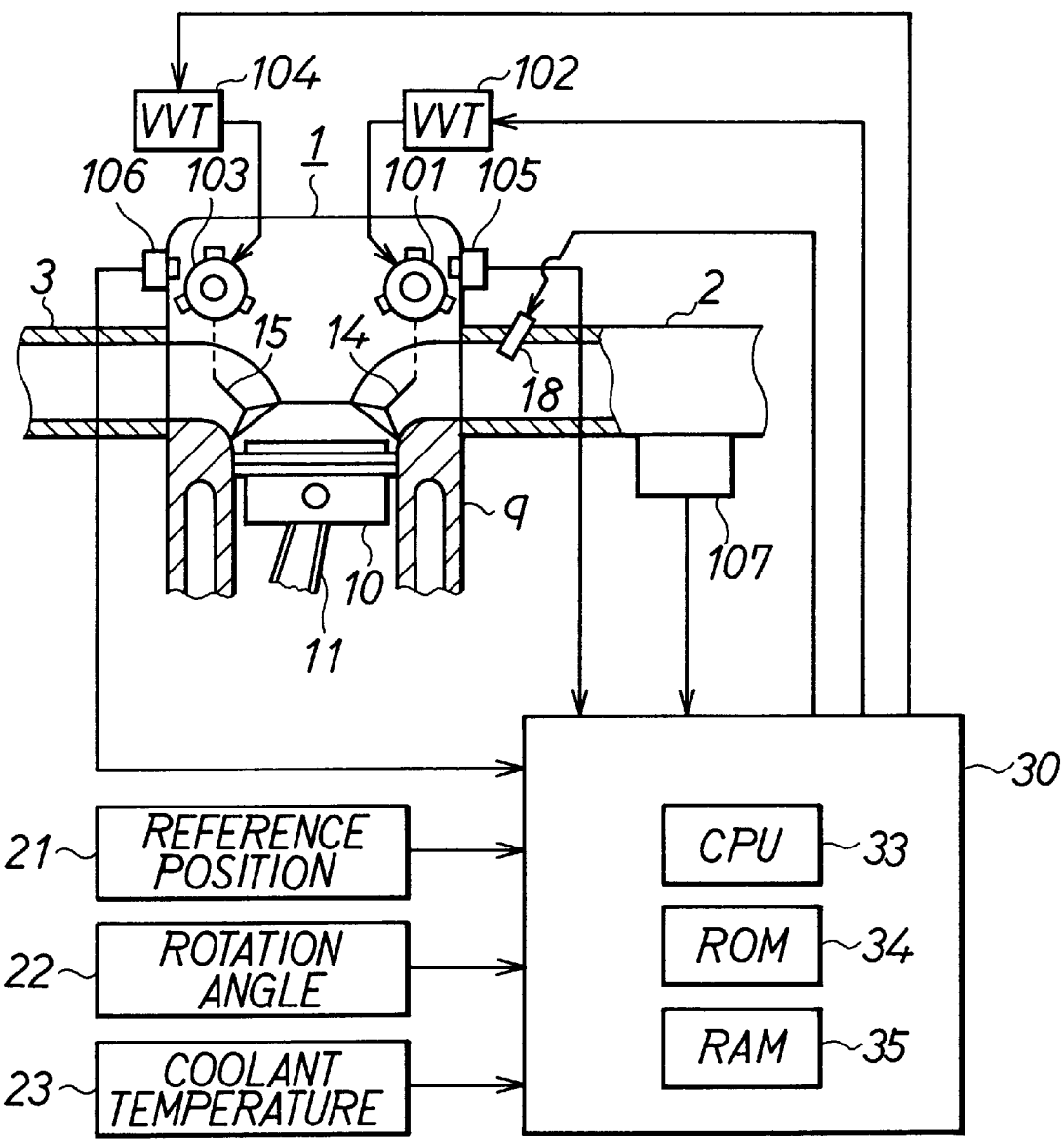
FIG. 20 is a schematic view showing a fuel injection control system of an engine according to a second modification of the first embodiment.

In this modification shown in FIG. 20, an intake side camshaft 101 is drivably connected with the crankshaft via a timing belt not shown to open the intake valve 14 at predetermined timing and the intake side VVT mechanism 102 is provided to the intake side camshaft 101. An exhaust side camshaft 103 is also drivably connected to the crankshaft via a timing belt not shown and an exhaust side VVT mechanism 104 is provided to the exhaust side camshaft 103.

The intake side and the exhaust side VVT mechanisms 102 and 104 control relative rotational phases between the intake side and exhaust side camshafts 101 and 103 and the crankshaft, respectively, and their operation is controlled under hydraulic control attained by a solenoid valve. That is, the intake side and exhaust side camshafts 101 and 103 turn to the retarding side or the advancing side with respect to the crankshaft corresponding to the controls of the intake side and the exhaust side VVT mechanisms 102 and 104 and corresponding to that operation, the opening/closing timing of the intake and exhaust valves 14 and 15 are shifted to the retarding side or the advancing side.

The intake side camshaft 101 is provided with an intake side cam position sensor 105 for detecting rotational position of the camshaft 101 and the camshaft 103 is provided with an exhaust side cam position sensor 106 for detecting rotational position of the camshaft 103. Detected values of the cam position sensors 105 and 106 are taken into the ECU 30 at any time. Beside them, the engine intake pipe 2 is provided with an air flow meter 107 for detecting an amount of suctioned air Qa. Its detected value is taken into the ECU 30 at any time.

Figure 21:
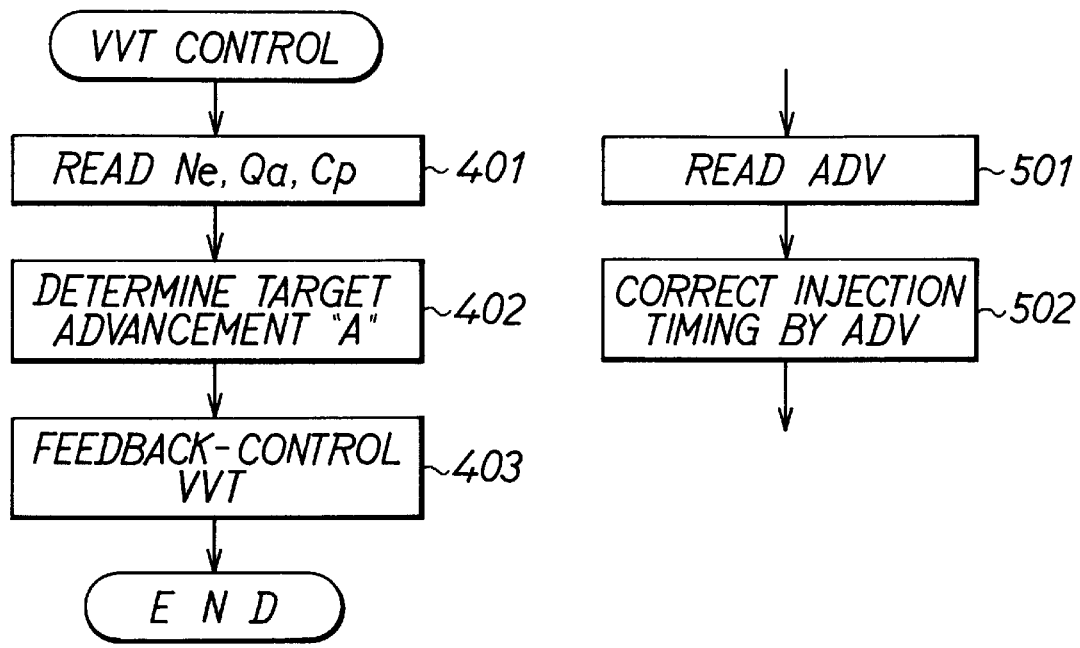
FIG. 21 is a flow chart showing a routine for controlling VVT.

FIG. 21 is a flow chart showing a routine for controlling the VVT. This routine is executed by the CPU 33 within the ECU 30 with a cycle of 64 msec. for example. It is noted that a case of controlling the valve timing of the intake side will be only described here.

Figure 22:
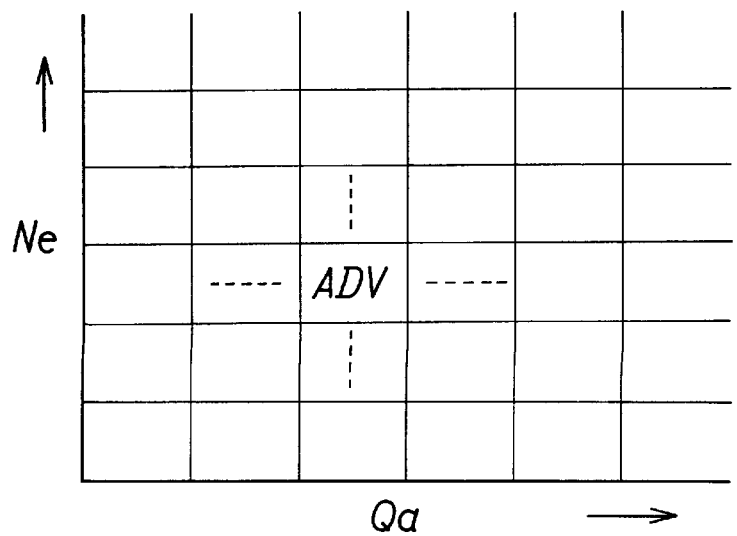
FIG. 22 is a graph showing an advancement map.

In FIG. 21, the CPU 33 reads the operating states of the engine such as the engine speed Ne, the suctioned air amount Qa, the cam position Cp and others at first in Step 401. It then determines a target advancement of the intake valve 14 in Step 402. Specifically, it retrieves the target advancement "ADV" corresponding to the engine speed Ne and the suctioned air amount Qa at each time by using an advancement map (FIG. 22) stored within the ROM 34 in advance.

Then, corresponding to the target advancement "ADV", the CPU 33 feedback-controls the intake side VVT mechanism 102 in Step 403. Specifically, the VVT control value is found such that a phase of the intake side camshaft 101 detected by the cam position sensor 105 agrees with the target advancement and the intake side VVT mechanism 102 is driven and controlled corresponding to that control value.

Figure 23:
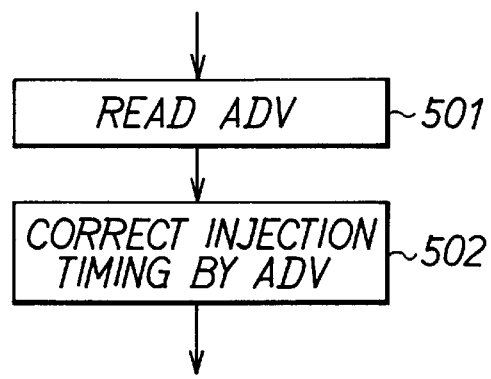
FIG. 23 is a flow chart showing a part of the routine for controlling drive of the injector.

FIG. 23 shows a flow chart showing a part of the routine for controlling drive of the injector. In FIG. 23, the CPU 33 reads the target advancement of the intake valve 14 calculated as described in Step 501. It then corrects the injection ending timing of the injector 18 in accordance with the target advancement "ADV" in Step 502. Then, according to this modification, the injection ending timing of the injector 18 may be corrected such that the inflow of fuel into the cylinder is completed at the moment when the crankshaft has turned by a predetermined crank angle, e.g., 30° CA, always after opening of the intake valve 14 even when the valve opening timing thereof is changed.

It is noted that at this time, the timing for flowing fuel into the cylinder is adjusted to the specific timing at the initial period of the intake stroke, the fuel injection timing of the injector 18 is set by partially injecting the fuel in correspondence with the operating states of the engine (routine in FIG. 14) as described and the correction in Step 502 is implemented to the fuel injection timing thus set.

The operations shown in FIGS. 21 and 23 will be explained more concretely with reference to a time chart shown in FIGS. 24 and 25.

Figure 24:
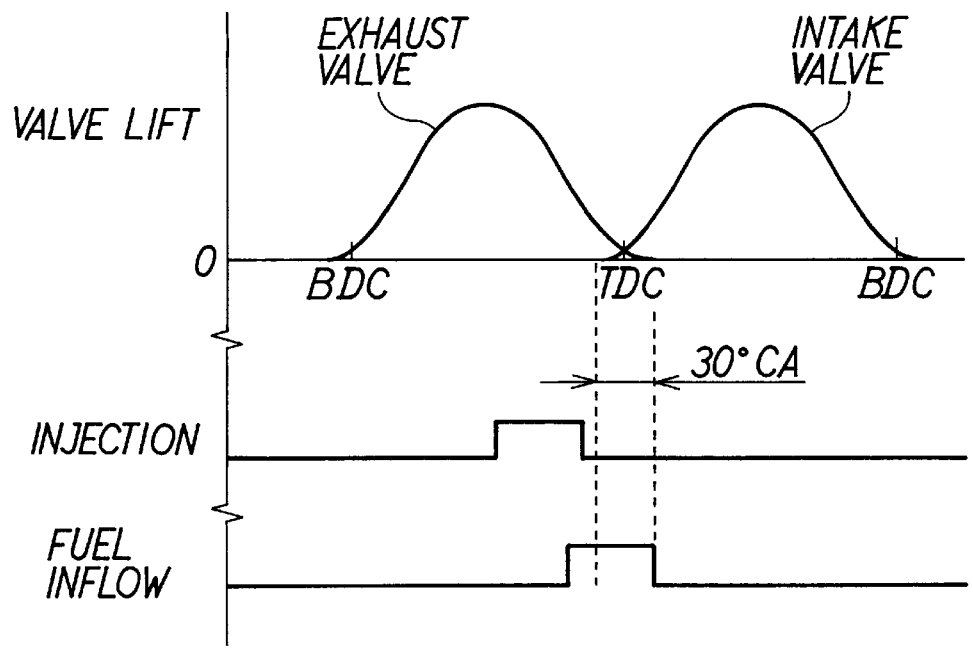
FIG. 24 is a time chart showing an operation of the second modification.
Figure 25:
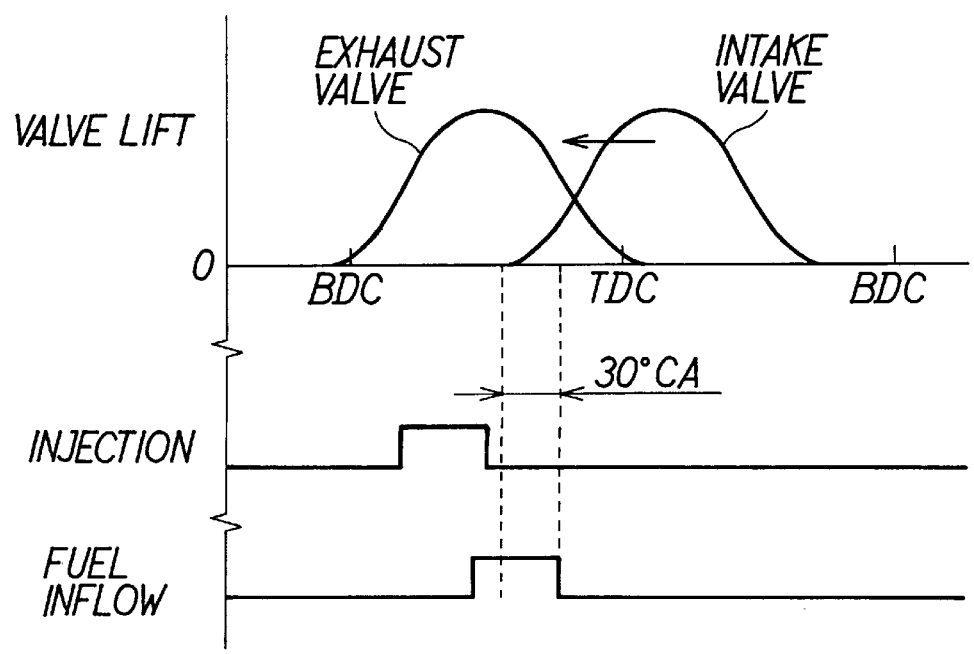
FIG. 25 is a time chart showing the operation of the second modification.

As shown in FIGS. 24 and 25, the valve opening/closing timing of the intake valve 14 is changed adequately along the VVT control. After when the injection signal turns ON, the fuel injected by the injector 18 flies within the intake port and flows into the cylinder. While the opening/closing timing of the intake valve 14 is shifted to the advancing side in FIG. 25, the fuel injection timing (injection signal) of the injector 18 also follows that and is shifted to the advancing side. Thereby, the inflow of fuel into the cylinder is completed always at the moment of time when the crankshaft has turned by 30° CA after the opening of the intake valve 14.

The timing for driving the injector is controlled in correspondence with the control value of the intake side VVT mechanism 102 in this modification. At this time, the injected fuel is supplied into the cylinder in the initial period of the intake stroke and the intake charging efficiency is improved even when the opening/closing timing of the intake valve 14 is changed by controlling the injector 18 corresponding to the advancement or the retardation of the intake valve 14. As a result, the combustion state of the engine 1 is stabilized, allowing the reduction of emission and the improvement of derivability to be realized.

Figure 26:
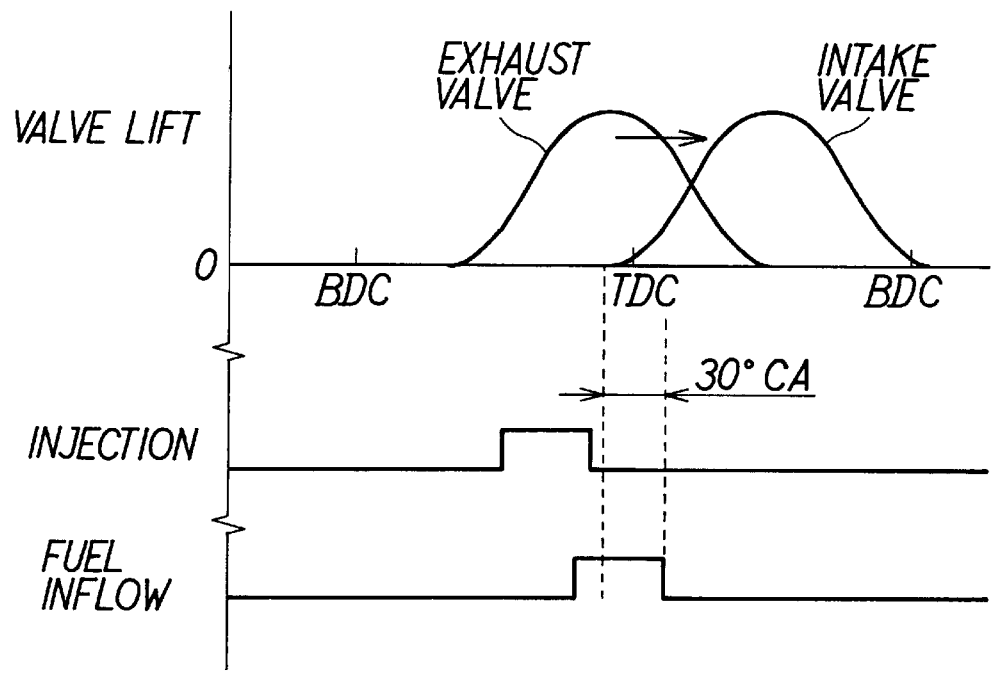
FIG. 26 is a time chart showing the operation of the second modification.
Figure 27:
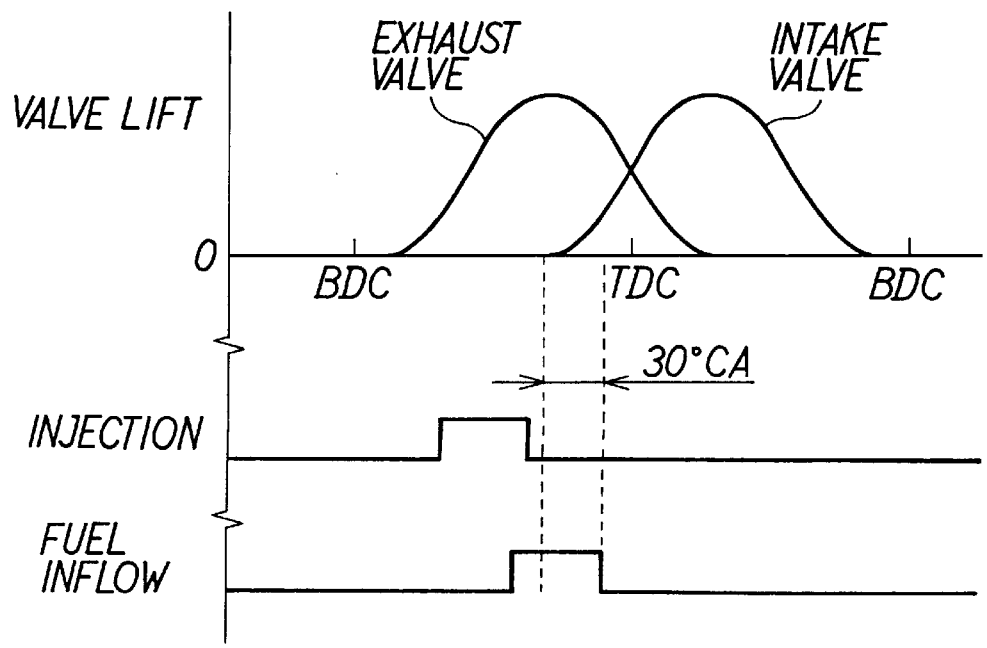
FIG. 27 is a time chart showing the operation of the second modification.

Although only the opening/closing timing of the intake valve 14 is changed by driving the intake side VVT mechanism 102 in the VVT control of the case, it is possible to embody it by means other than that. That is, the opening/closing timing of the exhaust valve 15 may be changed by driving the exhaust side VVT mechanism 104 for example as shown in FIG. 26. In the figure, the opening/closing timing of the exhaust valve 15 is shifted to the retarding side. Further, the opening/closing timings of the both intake and exhaust valves 14 and 15 may be changed by driving the intake side and exhaust side VVT mechanisms 102 and 104 as shown in FIG. 27. In the figure, the opening/closing timing of the exhaust valve 15 is shifted to the retarding side and the opening/closing timing of the intake valve 14 is shifted to the advancing side.

The inflow of fuel into the cylinder is completed at the moment when the crankshaft has turned by 30° CA after the opening of the intake valve 14 in either cases of FIGS. 26 and 27. Thereby, the excellent effects such that the intake charging efficiency is improved and the combustion state is stabilized are provided. A valve opening overlapping period of the intake and exhaust valves 14 and 15 is extended when the exhaust valve 15 is controlled to the retarding side. It allows the EGR effect to be provided without lowering the temperature within the cylinder, thus improving the thermal efficiency.

According to the second modification of the first embodiment applied to the fuel injection control system using the VVT mechanism, the fuel injection timing of the injector 18 is set by adjusting the timing for flowing fuel into the cylinder to the specific timing in the initial period of the intake stroke and by injecting the fuel partially corresponding to the operating states of the engine, and the correction is implemented to the set fuel injection timing corresponding to the target advancement of the intake or exhaust valve 14 or 15 (Step 502 in FIG. 23). The above structure is modified so as to control the drive (fuel injection timing) of the injector 18 simply in correspondence with the advancement or retardation of the intake valve 14. Such a case also allows the control of fuel injection always synchronized with the intake stroke to be continued. As a result, the combustion state of the engine is stabilized and in its turn, the reduction of emission and the improvement of derivability may be realized.

It is noted that although the drive of the injector 18 is controlled so that the fuel injected by the injector 18 flows into the cylinder within about ⅓ of time of the initial period of the valve opening period of the intake valve 14 in each embodiment, the arrangement may be modified further. For instance, the drive of the injector 18 may be controlled so that the fuel injected by the injector 18 flows into the cylinder within a first half time of the valve opening period (intake stroke) of the intake valve 14. In such a case, although the provided effect drops more or less because the fuel inflow timing is stretched to the medium period of the intake stroke, the effect of improving the charging efficiency of suctioned air may be assured. In short, it will do if the arrangement is what flows the fuel injected by the injector 18 into the cylinder in the initial period (at the specific timing) of the intake stroke such that the vaporization of the fuel within the cylinder is completed before the intake valve 14 is closed.

Atomizing the injected fuel may be embodied also as follows beside the methods described above. That is, a multi-hole type (e.g., 12-hole type) injector is used by reducing the diameter of the injection port more than that of the four-hole type injector and by increasing a number of holes to 12 or more. Because it allows the effect of atomization of fuel to be provided even if air pressure is relatively low, it allows to avoid problems that the fuel inflow speed is excessively increased due to the pressurization of air and the wetness of the cylinder increases.

Further, the present invention may be embodied without atomizing the injected fuel. Although the effect of the invention drops more or less, it allows the objects of the present invention of enhancing the efficiency for charging suctioned air to the cylinder and of stabilizing the combustion state of the engine to be attained.

Figure 28:
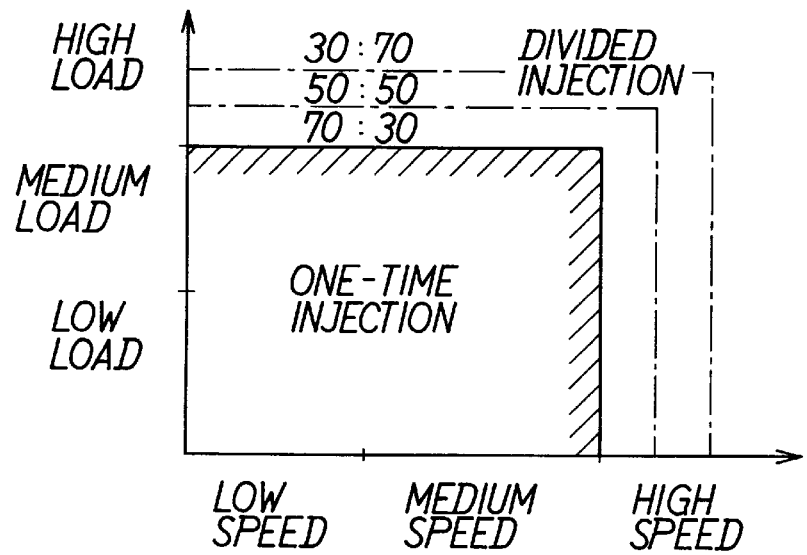
FIG. 28 is a map showing a one-time injection domain and a divided injection domain corresponding to the engine operating state according to another modification of the first embodiment.

Although the injection amount of the first time is "about 50%" of the total amount and the injection amount of the second time is "about 50%" of the total amount in executing the "divided injection mode" by the injector 18 in each embodiment, this arrangement may be also changed. For instance, in the divided injection mode, the rate of injection of the first and second times may be set into three stages like "70%:30%", "50%:50%" and "30%:70%". Specifically, when the operating state of the engine is located in the divided injection domain as shown in a map in FIG. 28, the rate of injection of the second time is increased as the engine speed or the engine load becomes high. It is of course possible to set the rate of injection more finely. Such arrangement allows to avoid the problems that a time is short in flowing fuel into the cylinder, a required fuel amount per unit time increases and emission of unburnt HC increases in operating the engine at high speed or high load. Such fuel injection control operation is executed by the CPU 33 and fuel injection command means in Claims is composed of the CPU 33.

Although the fuel injection mode is set and the fuel pressure Pf is set corresponding to the operating states of the engine by using the maps shown in FIGS. 7 and 8 in each embodiment, it may be modified further as described below. That is, FIG. 29 may be used as a map for setting the fuel injection mode and FIG. 30 may be used as a map for setting the fuel pressure Pf.

Figure 29:
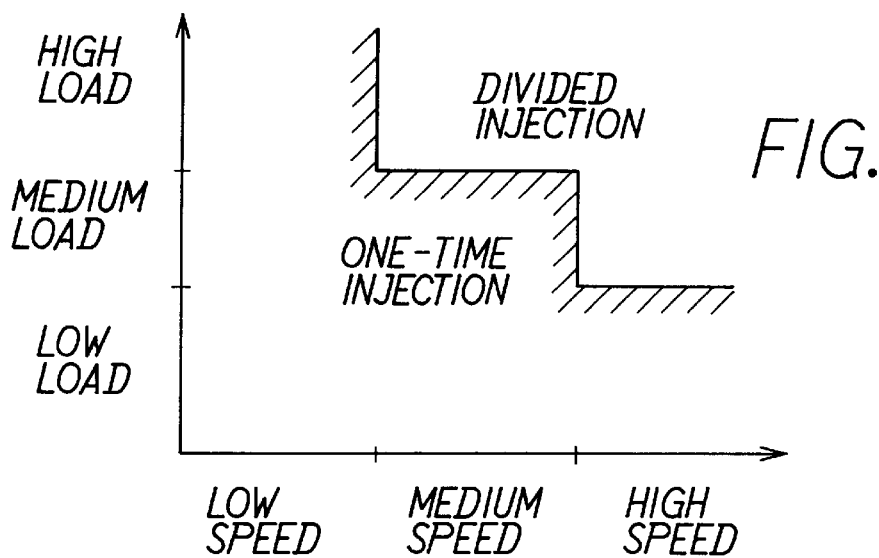
FIG. 29 is a map showing a one-time injection domain and a divided injection domain corresponding to the engine operating states according to a still other modification of the first embodiment.

In FIG. 29, the "one-time injection domain" (slant-lined range in the figure) is set in the low speed and high load range and in the high speed and low load range in addition to that in the low-to-medium speed and low-to-medium load range. Then, the domain other that is set as the "divided injection domain". In this case, the time during which fuel is supplied into the cylinder in the one-time injection mode is prolonged more than the case of using the map shown in FIG. 7. Therefore, the charging efficiency of suctioned air is improved under the wide operating state of the engine. However, whether the map in FIG. or that in FIG. 29 should be adopted is determined corresponding to the specification of the engine.

Figure 30:
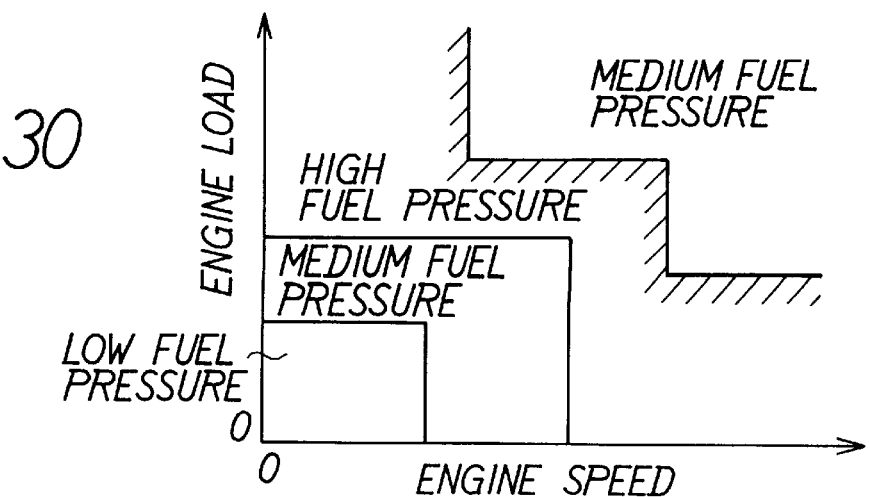
FIG. 30 is a map showing a one-time injection domain and a divided injection domain corresponding to the engine operating states according to a different modification of the first embodiment.

The slant-lined range of FIG. 30 is the same with the one-time injection domain of the map in FIG. 29. In the range, a high fuel pressure domain, a medium fuel pressure domain and a high fuel pressure domain are set corresponding to the engine speed and the engine load. It is noted that in FIG. 30, a medium fuel pressure domain (domain other than the slant-lined range) is set at the domain corresponding to the divided injection domain in FIG. 29.

Further, although the timing for flowing fuel injected by the injector into the cylinder is limited within the period during which the intake flow speed, when the intake valve is opened, exceeds the predetermined threshold value (the period "T" in FIG. 3) in each embodiment, this arrangement may be modified further. For instance, not only in the period during which the intake flow speed exceeds the predetermined threshold value, the fuel inflow timing may be set at specific time within the whole period during which the intake valve is opened. Specifically, fuel is supplied into the cylinder within a period of ⅓ (or a specific period close to that) of the beginning of the whole period during which the intake valve is opened.

Still more, although the engine speed Ne and the intake pressure PM is used as parameters representing the operating state of the engine in setting the domain of the fuel injection mode and the fuel pressure domain in each embodiment, a throttle opening angle and a suctioned air amount may be used as parameters representing the engine load for example, beside Ne and PM.

Second Embodiment

A system of the present embodiment is what controls a fuel injection amount by an ECU in the same manner as in the first embodiment.

Specifically, the CPU 33 discriminates a cylinder to which fuel is to be injected in controlling the fuel injection based on the reference position signal. The CPU 33 also controls the amount of fuel injected by the injector 18 based on various detection signals indicative of the operating state of the engine. Under the control of fuel injection of the CPU 33, the fuel is injected within a predetermined period in which the engine 1 is shifted to the exhaust stroke to the intake stroke and the injected fuel is supplied into the cylinder (combustion chamber 13) when the intake valve 14 is opened in the intake stroke.

The system of the present embodiment is arranged such that pressurized air of around 3 kg/cm$^2$ is continuously fed to the air introducing port 48 by the pressure regulator 71 and an air supply pump 72. It is noted that the pressurized air may be supplied by pressurizing air by the air supply pump 72 in synchronism with the fuel injection timing. In such a case, the pressurization of air is started just before the start of the injection and is finished when the injection is finished. This effectuates the atomization of fuel.

The operations of the fuel injection control system of the present embodiment may be summarized as:

(a) homogenizing the mixture by flowing fuel into the cylinder with a fuel inflow speed which is proportional to the intake flow speed (proportioning the fuel inflow speed);

(b) homogenizing the mixture by flowing fuel into the cylinder at a fixed fuel inflow speed corresponding to a temporal mean value of the intake flow speed into the cylinder (averaging the fuel inflow speed);

(c) partially injecting fuel corresponding to operating states of the engine (divided injection of fuel); and (d) atomizing fuel supplied into the cylinder (atomization of injected fuel).

At first, the operation (a) of "proportioning the fuel inflow speed" will be explained with reference to FIG. 31.

Figure 31:
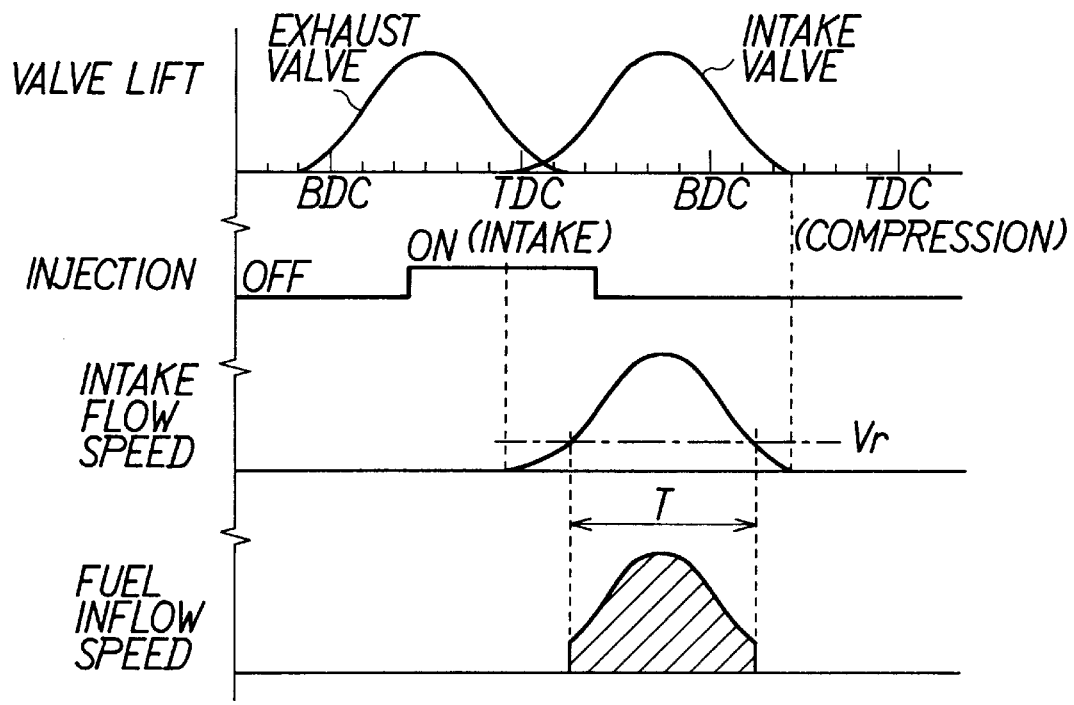
FIG. 31 is a time chart showing valve lifts of intake and exhaust valves when opened, fuel injection timing of the injector, a change of the intake flow speed when the intake valve is opened and a fuel inflow speed of the fuel supplied into the cylinder in a process of proportioning the fuel inflow speed according to a second embodiment.

FIG. 31 is a time chart showing valve lifts of the intake and exhaust valves 14 and 15 when opened, the fuel injection timing of the injector 18, changes in the intake flow speed when the intake valve 14 is opened and the flow speed of the fuel supplied into the cylinder, wherein TDC (top dead center) and BDC (bottom dead center) within one cycle of the piston 10 are indicated on the horizontal axis. It is noted that although the intake flow speed actually starts to increase slightly behind the opening timing of the intake valve 14, those both timings are shown in synchronism in the figure for brevity.

In FIG. 31, the exhaust valve 15 opens just before the BDC and closes right after the TDC (intake TDC). Further, the intake valve 14 opens just before the intake TDC and closes after the BDC. At this time, a period during which the intake flow speed exceeds a predetermined threshold value Vr as the intake valve 14 is opened is denoted by "T" in the figure. This period "T" corresponds to a period during which the valve lift of the intake valve 14 is more than about 20% as compared with the full-open time (at the time of 100%).

Then, according to the present embodiment, the fuel is supplied into the cylinder with the fuel inflow speed which is proportional to the intake flow speed pursuant to the intake flow speed within the period T. At this time, the air suctioned from the upstream side of the intake pipe 2 and the fuel injected by the injector 18 is mixed homogeneously in the period in which the fuel is supplied into the cylinder shown in the figure (slant-lined section in the figure). That is, the homogenization of the mixture may be realized within the combustion chamber 13.

Here, the amount of the fuel injected by the injector 18 per unit time must be changed in each time in order to variably control the fuel inflow speed. Then, according to the present embodiment, the injection flow amount per unit time is controlled by varying pressure of the fuel (fuel pressure Pf) fed to the injector 18 by controlling a command current (pump current) sent to the fuel pump 26.

Next, the operation (b) of "averaging the fuel inflow speed" will be explained with reference to FIG. 32.

Figure 32:
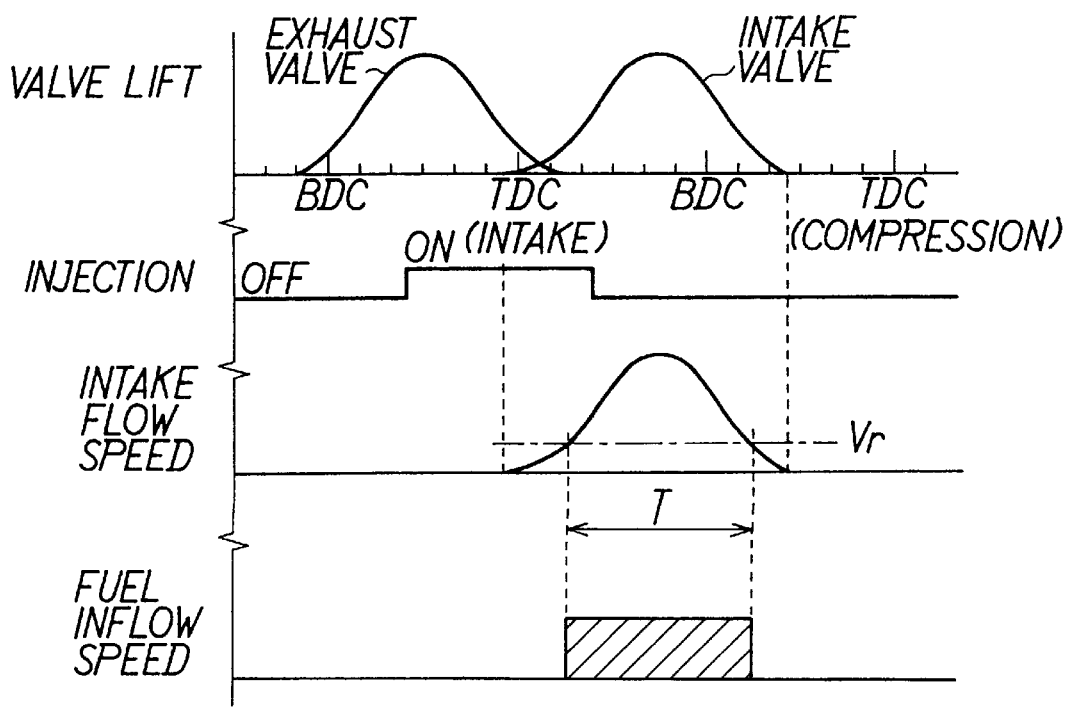
FIG. 32 is a time chart showing valve lifts of intake and exhaust valves when they are opened, fuel injection timing of the injector, a change of the intake flow speed when the intake valve is opened and a fuel inflow speed of the fuel supplied into the cylinder in a process of averaging the fuel inflow speed according to the second embodiment.

Similarly to FIG. 31, FIG. 32 is a time chart showing valve lifts of the intake and exhaust valves 14 and 15 when opened, the fuel injection timing of the injector 18, changes in the intake flow speed when the intake valve 14 is opened and the flow speed of the fuel supplied into the cylinder, wherein the period during which the intake flow speed exceeds the predetermined threshold value Vr, as the intake valve 14 is opened, is represented by "T" in the figure.

Then, in such a case, the fuel is supplied into the cylinder with a fixed fuel inflow speed corresponding to the temporal mean value of the intake flow speed within the period T. Similarly to the "proportioning the fuel inflow speed" described in the operation (a), the air suctioned from the upstream side of the intake pipe 2 is mixed homogeneously with the fuel injected by the injector 18 in the period during which the fuel inflows into the cylinder (slant-lined section in the figure) also in this case as shown in the figure. That is, the homogenization of the mixture may be realized within the combustion chamber 13. It is noted that this is advantageous over the case of the operation (a) described in that the control of the fuel pressure Pf may be simplified and the operational load of the ECU 30 may be reduced. In this case, the predetermined fuel inflow speed is provided by controlling the fuel pressure Pf with respect to the flow speed of air around the intake valve which is measured and known in advance.

Next, the operation (c) of the "divided injection of fuel" will be explained with reference to FIGS. 33A and 33B. It is desirable to flow the fuel injected by the injector 18 into the cylinder in the initial period of the intake stroke in order to enhance the efficiency for charging the suctioned air into the engine cylinder due to the following reason. That is, when fuel is suctioned in the initial period of the intake stroke, the vaporization of the fuel is promoted, air temperature drops due to the heat of vaporization at this time and weight (density) of the air suctioned into the cylinder per unit volume increases. As a result, the charging efficiency of the suctioned air is enhanced, the fuel injection state may be stabilized and the engine output torque is improved.

This will be explained below more specifically. As shown in FIG. 33B, the system of the present embodiment is arranged so as to flow the fuel into the cylinder within an initial period of "T/3" of the period T during which the intake flow speed within the intake stroke exceeds the predetermined threshold value Vr. Further, about 50% of the total fuel is injected within the period of "T/3" and the remaining 50% of fuel is injected aside from the intake stroke when the engine 1 is operated at the high speed or high load state in particular in order to suppress emission of unburnt HC. A mode of injecting all of the fuel (100%) at one time within the period "T" as shown in FIG. 33A will be referred to as a "one-time injection mode" and a mode of injecting about 50% of all the fuel within the period of "T/3" and of injecting the remaining 50% of fuel aside from the intake stroke as shown in FIG. 33B will be referred to as a "divided injection mode" hereinbelow.

The operation (d) of the "atomization of the injected fuel" is the same with that described in the first embodiment.

Figure 34:
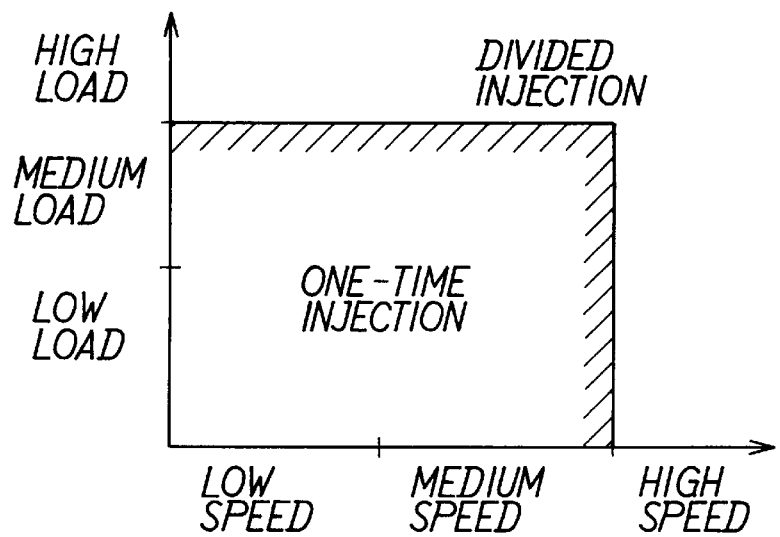
FIG. 34 is a map showing a one-time injection domain and a divided injection domain corresponding to engine operating states.

According to the present embodiment, a map shown in FIG. 34 is used basically in determining the fuel injection mode (Step 202 in FIG. 14) to select either the "one-time injection mode" or the "divided injection mode" corresponding to which range of the low speed range, medium speed range and high speed range the engine speed Ne is located or to which range of the low load range, medium load range and high load range the engine load (intake pressure PM) is located.

Figure 33A:
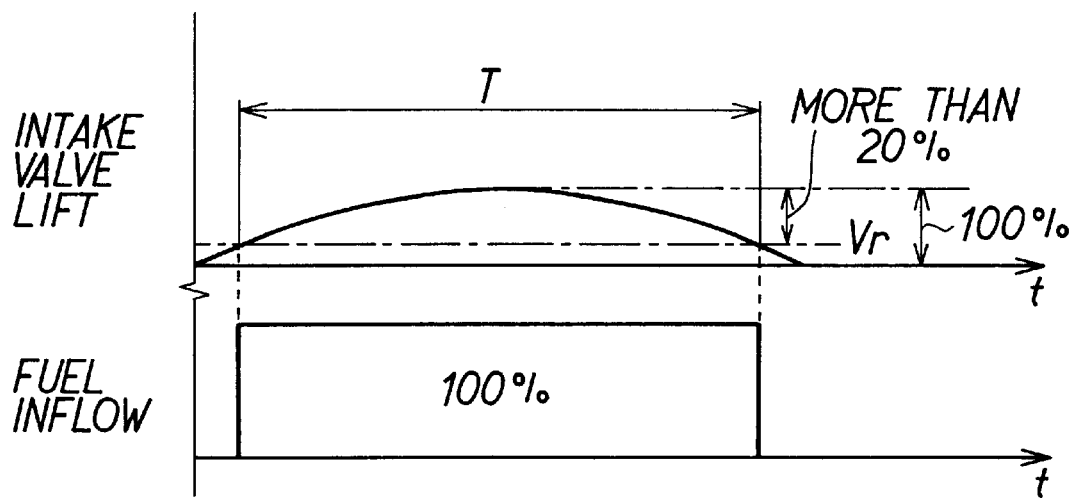
FIGS. 33A and 33B are time charts showing the one-time injection mode and the divided injection mode.
Figure 33B:
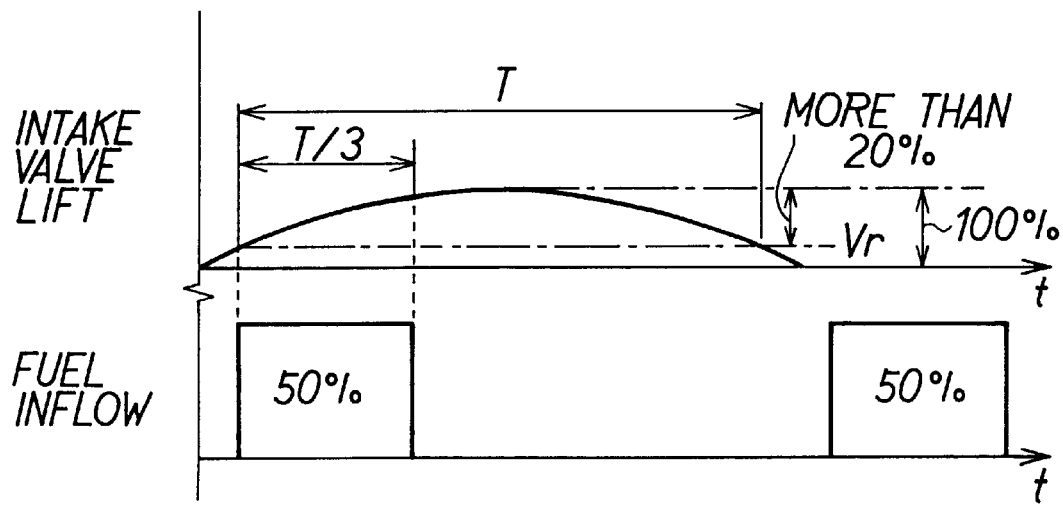

FIG. 34 is a map showing the speed range and the load range of the engine 1 to select the "one-time injection mode" shown in FIG. 33A and the "divided injection mode" shown in FIG. 33B. In the figure, the low-to-medium speed range and the low-to-medium load range (slant lined range in the figure) represents a domain in which the fuel is injected by the injector 18 in the one-time injection mode (one-time injection domain) and the high speed range or the high load range represents a domain in which the fuel is injected by the injector 18 in the divided injection mode (divided injection domain). However, fuel is injected in a "low temperature mode", not injecting fuel in the—two modes, when the engine 1 is started at low temperature for example in the present embodiment. Then, one fuel injection mode is selected among the three modes including the low temperature mode in determining the mode.

Figure 35:
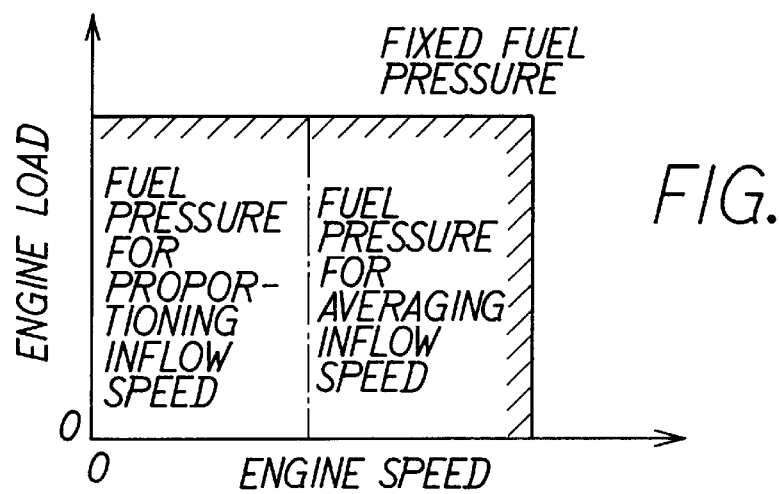
FIG. 35 is a map showing fuel pressure domains corresponding to engine operating states.

Further, according to the present embodiment, a map shown in FIG. 35 is used in determining the fuel pressure Pf (Step 302 in FIG. 15) to select the fuel pressure Pf corresponding to the engine speed Ne and the engine load (intake pressure PM).

A slant lined domain in FIG. 35 is the same domain with the one-time injection domain in the map in FIG. 34, wherein a fuel pressure domain for "proportioning of the fuel inflow speed" of the operation (a) described and a fuel pressure domain for "averaging the fuel inflow speed" of the operation (b) described are set in correspondence with the engine speed. Here, the fuel pressure domain for proportioning the flow speed is set at relatively low speed range and the fuel pressure domain for averaging the flow speed is set at relatively high speed range. It is noted that a fixed fuel pressure domain is set in the domain corresponding to the divided injection domain in FIG. 34 (the high speed and high load domain).

Figure 36:
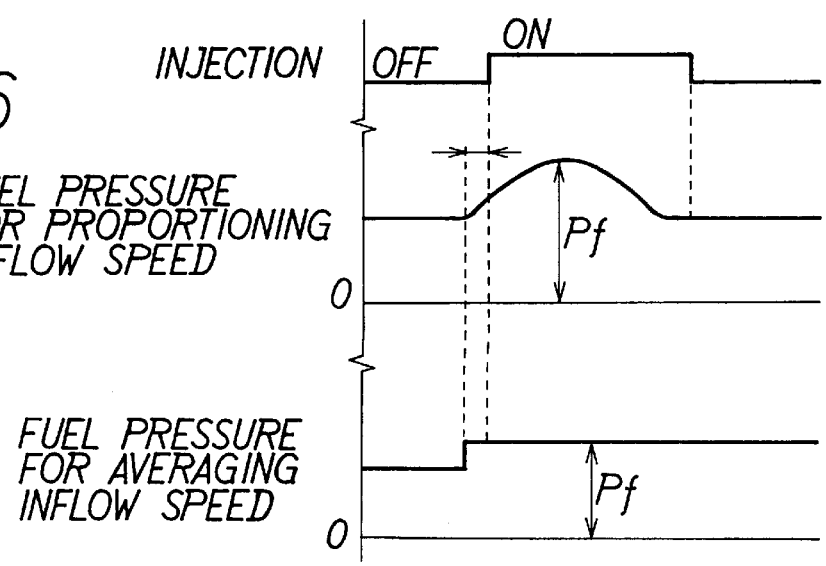
FIG. 36 is a time chart showing fuel injection timing of the injector and fuel pressure control.

FIG. 36 is a time chart showing a change of the fuel pressure Pf in the "fuel pressure domain for proportioning the flow speed" and a change of the fuel pressure Pf in the "fuel pressure domain for averaging the flow speed" within the slant-lined area in the map in FIG. 35 in correspondence with the fuel injection timing of the injector 18. The fuel pressure Pf changes as shown in the figures with respect to the injection of fuel of the injector 18. The change of the fuel pressure Pf is started at timing earlier than the starting timing of the fuel injection. Specifically, the fuel pressure Pf is controlled so as to be proportional to the intake flow speed and the fuel pressure Pf is controlled so as to correspond to the temporal mean value of the intake flow speed.

According to the second embodiment described in detail, the following effects may be provided:

(A) The amount of fuel supplied into the cylinder per unit time is controlled by following (by proportioning or by averaging) the flow speed of the air suctioned to the cylinder (the combustion chamber 13) and the drive of the injector 18 is controlled such that the fuel inflows into the cylinder within the period of the intake stroke during which the intake flow speed exceeds the predetermined threshold value Vr in the present embodiment. In such a case, the fuel is introduced to the cylinder by being carried on the relatively fast intake flow speed and the mixture composed of the fuel and the air is mixed homogeneously within the cylinder. As a result, the homogenization of the mixture suctioned into the cylinder may be realized and the fuel is burned stably, thus expanding the control range of the fuel consumption and air-fuel ratio.

Further, the homogenization of the mixture allows the control of fuel injection in the air-fuel ratio lean domain, i.e., the lean burn control, to be stably realized and NOx within the emission during the lean burn control to be reduced.

(B) Specifically, the process of "proportioning of the fuel inflow speed" by which the fuel is supplied into the cylinder with the fuel inflow speed which is proportional to the intake flow speed and the process of "averaging of the fuel inflow speed" by which the fuel is supplied into the cylinder with the fixed fuel inflow speed corresponding to the temporal mean value of the intake flow speed are implemented selectively corresponding to the engine speed in the present embodiment. In such a case, the operational load of the ECU 30 (CPU 33) may be reduced by flowing in the fuel into the cylinder by a fixed control signal (fixed fuel pressure) by the process of "averaging of the fuel inflow speed" when the engine speed is relatively high.

(C) Pressure of the fuel (fuel pressure Pf) supplied from the fuel tank 19 to the injector 18 is controlled by driving the fuel pump 26 in the present embodiment. This arrangement allows the injection flow amount per unit time to be changed by changing the fuel pressure Pf and to cause the amount of fuel supplied into the cylinder to readily follow the intake flow speed.

(D) further, according to the present embodiment, the drive of the injector 18 is controlled such that the fuel injected by the injector 18 flows into the cylinder within about ⅓ of time at the beginning of the valve opening period of the intake valve 14 under the operating state of the engine in which the engine speed or load is high (FIG. 5*b*). This arrangement allows much of the fuel supplied into the cylinder to be vaporized quickly and the vaporization of the fuel supplied into the cylinder to be completed before the intake valve 14 is closed and the intake is finished. Because the air temperature drops due to the heat of vaporization of the fuel, weight (density) of the air suctioned to the cylinder per unit volume increases. As a result, the charging efficiency of the suctioned air is enhanced and the combustion state of the fuel is stabilized. Further, it allows more air to be suctioned and an output torque to be improved as compared to the prior art systems when compared under the same engine operating conditions.

(E) Further, the fuel injected by the injector 18 is atomized by controlling the pressure of the air fed to the injector 18 by using the air-assisted injector 18 and by injecting the fuel toward the bevel portion of the high temperature intake valve 14 in the present embodiment. In such a case, the vaporization of the fuel is accelerated within the cylinder by atomizing the injected fuel. Accordingly, the air temperature drops due to the heat of vaporization of the fuel and the charging efficiency of the suctioned air is steadily improved when the air is suctioned into the cylinder. Then, the output torque of the engine 1 is increased. It is noted that the optimum range of the particle size (SMD) of the injected fuel is confirmed to be 10 to 30 $\mu$m by the inventors.

Figure 37A:
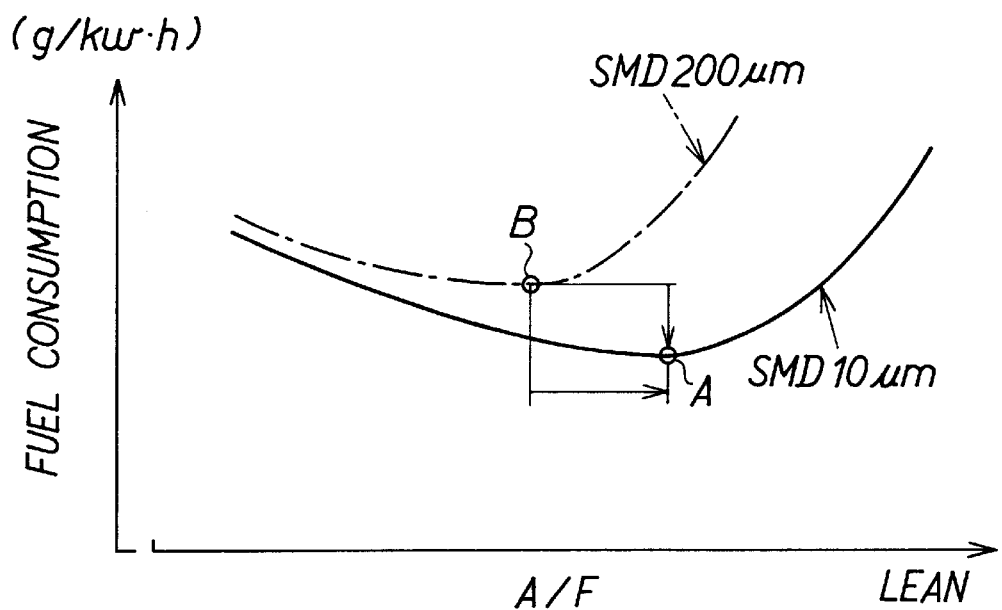
FIGS. 37A and 37B are graphs showing a difference of effects caused by the difference of fuel particle sizes SMD.
Figure 37B:
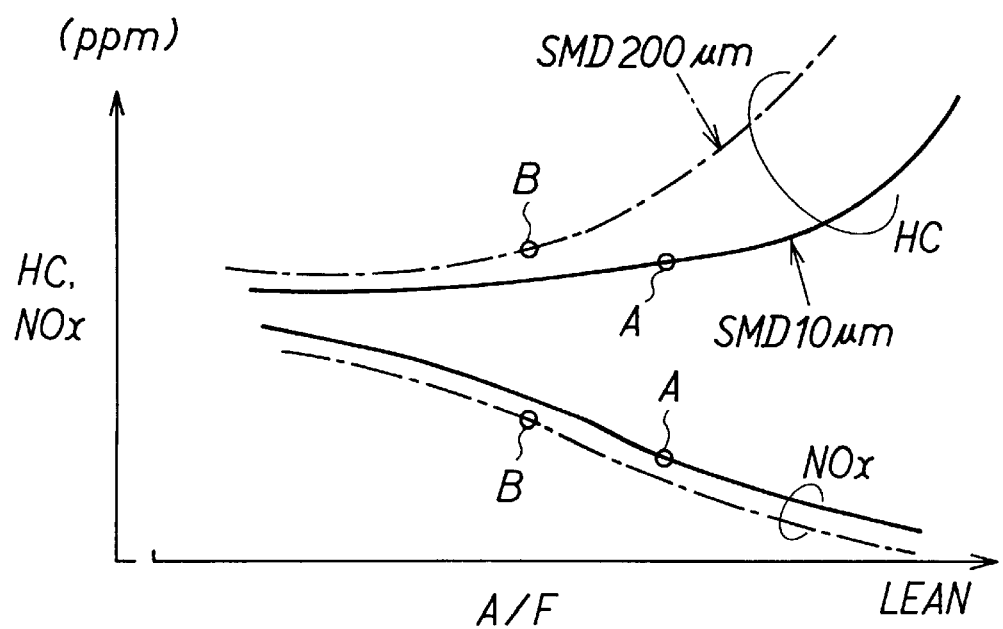

FIG. 37A shows a result of experiment carried out on the optimum (minimum) fuel consumption points A and B corresponding to the fuel particle size SMD and on changes of the air-fuel ratio corresponding to the points A and B when the process of "averaging of the fuel inflow speed" is implemented. In the figure, the point A is the point where the fuel consumption is the lowest on a characteristic curve of SMD=10 $\mu$m shown by a solid line and the point B is the point where the fuel consumption is the lowest on a characteristic curve of SMD=200 $\mu$m shown by an alternate dotted line. It is apparent from the comparison of those points A and B that the curve of the point A can realize the low fuel consumption and that the air-fuel ratio is shifted to the lean side. FIG. 37B is a graph showing emissions of HC and NOx when the fuel particle size SMD is 10 $\mu$m and 200 $\mu$m, wherein points A and B correspond to the respective points in FIG. 37A. It is apparent from FIG. 37B that the finer the fuel particle size SMD (points A), the lower the emissions of HC and NOx can be.

First Modification of the Second Embodiment

In a first modification of the second embodiment, the injector 18 is driven to inject fuel to the intake port 17 until a predetermined timing before the intake valve 14 is opened (early injection) and to inject a deficiency of fuel supplementally corresponding to the engine operating state at each time (supplemental injection) after the early injection.

Figure 38:
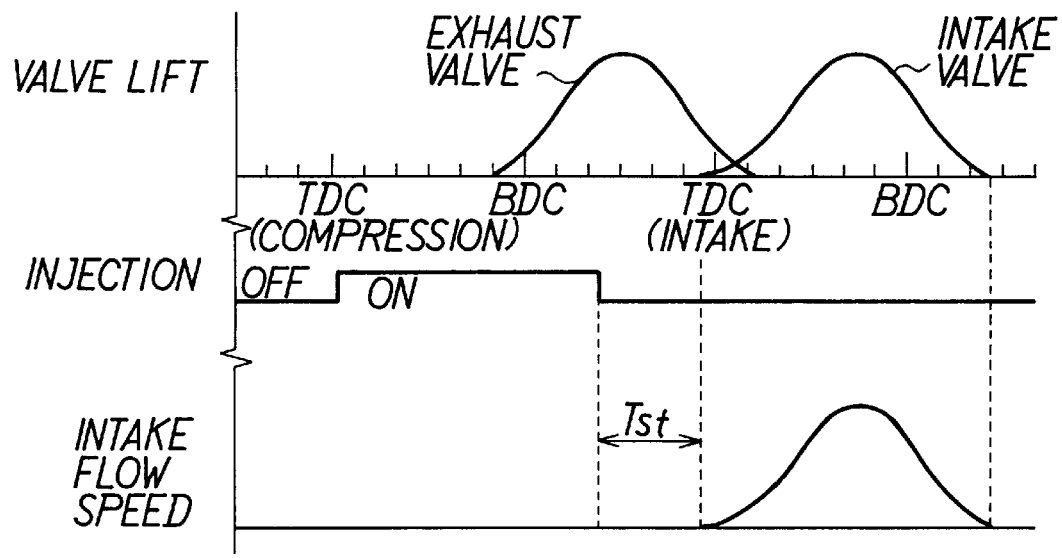
FIG. 38 is a time chart showing an early injection according to a first modification of the second embodiment.

FIG. 38 is a time chart showing the early injection. In the figure, a fuel injection amount (TAU) corresponding to the engine operating state is computed around the compression TDC for example and the injector 18 is driven (turned ON) corresponding to a value of the TAU. At this time, the fuel injection is finished at least before time Tst before the intake valve 14 is opened. Thereby, the fuel injected by the injector 18 resides within the intake port 17 within a period in which the time Ts elapses. At that time, the sprayed fuel is vaporized and the vaporized fuel is mixed with the suctioned air homogeneously. As a result, the homogenized mixture flows into the cylinder (the combustion chamber 13) when the intake valve 14 is opened.

Here, the residing time indicated by Tst in FIG. 38 is a time necessary for vaporizing the fuel and for realizing the homogeneous mixture of the fuel and the suctioned air. While it depends on the fuel particle size SMD and the like, it is confirmed experimentally that the residing time Tst may be set within a range of 12 to 15 msec. when the fuel particle size SMD is around 10 to 30 µm. This may be analyzed as follows.

That is, when fuel is injected within an atmosphere (in the cylinder) of around 200° C., a time required to completely vaporize the fuel is known to be about 2 to 2.5 msec. Meanwhile, because temperature of a normal intake port is around 50° C., a time required to almost completely vaporize the fuel injected to the intake port is estimated to be as follows. When temperature of fuel particle is 20° C. and when it is injected to a cylinder having an atmosphere of 200° C., a difference of temperature is 180° C. (200−20= 180° C.). Meanwhile, when the fuel particle having 20° C. of temperature is injected to the intake port having an atmosphere of 50° C., a difference of temperature is 50° C. (50−20=30° C.). Accordingly, when those two cases are compared, the ratio of moving times of the quantity of heat turns out to be 1:6. Then, the time required to vaporize the fuel in injecting to the intake port may be found by multiplying the time (about 2 to 2.5 msec.) required to vaporize the fuel in injecting to the cylinder by six times. That is, it can be understood that the time required to vaporize the fuel in injecting to the intake port is about 12 to 15 msec. (2 to 2.5×6=12 to 15 msec.).

Meanwhile, when the early injection of fuel is carried out, a difference of about 360 crank angle (a difference between the compression TDC and the intake TDC) occurs in maximum in FIG. 38 for example until when the injected fuel (mixture) is suctioned into the cylinder when the intake valve 14 is opened. At this time, there is a possibility that an actual amount of fuel supplied into the cylinder is not enough from the fuel amount for ideal combustion depending on the engine operating state which changes at every moment. Then, the supplemental injection is implemented after the early injection of fuel to a predetermined cylinder in the present embodiment. That is, a difference between the previous value and the current value of TAU is determined and the injector 18 is driven corresponding to that difference.

Figure 39:
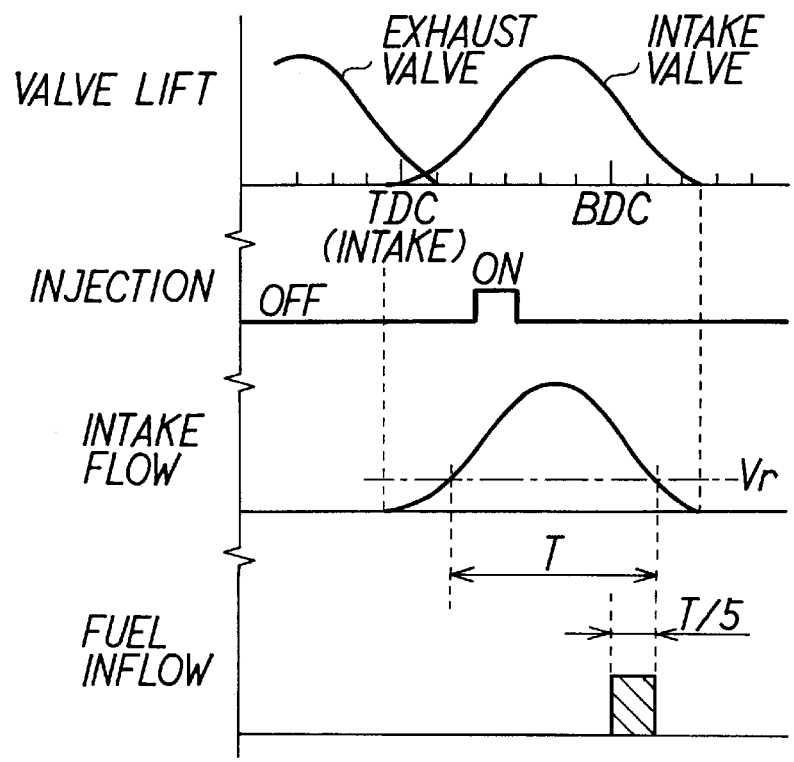
FIG. 39 is a time chart showing a supplemental injection according to the first modification of the second embodiment.

Specifically, when the newest TAU value is calculated around the intake TDC in a time chart in FIG. 39, a difference ΔTAU between that TAU value (TAUnew) and a value of TAU injected early with respect to the period of the intake stroke shown in FIG. 39 (TAU value calculated around the compression TDC in FIG. 38: TAUold) is determined (ΔTAU=TAUnew−TAUold). Then if the ΔTAU is a positive value, the injector 18 is driven by ΔTAU. It is noted that as shown in FIG. 39, the injection fuel of ΔTAU is supplied into the cylinder in a later period of ⅓ of the period T during which the intake flow speed exceeds the predetermined threshold value Vr.

The injector 18 is driven so that two fuel injections of the early injection and the supplemental injection are not overlapped in implementing those by controlling the fuel pressure Pf for example.

The present embodiment provides the following effects. That is, while the injector 18 is driven corresponding to the TAU value at the timing earlier by the time required for vaporizing the fuel at the intake port 17 (the time Tst in FIG. 38) before the intake valve 14 is opened to inject the fuel within the intake port 17 (early injection), this arrangement allows the injected fuel to be vaporized and the homogeneous mixture of the vaporized fuel and the suctioned air to be accelerated while the fuel injected by the injector 18 resides within the intake port 17. As a result, the homogeneous mixture flows into the cylinder, thus allowing the fuel to be burned stably and the control range of the fuel consumption and air-fuel ratio may be expanded. Further, the homogenization of the mixture allows the control of fuel injection in the air-fuel ratio lean domain (lean burn control) to be stably realized and NOx within emission to be reduced during the lean burn control.

Figure 40A:
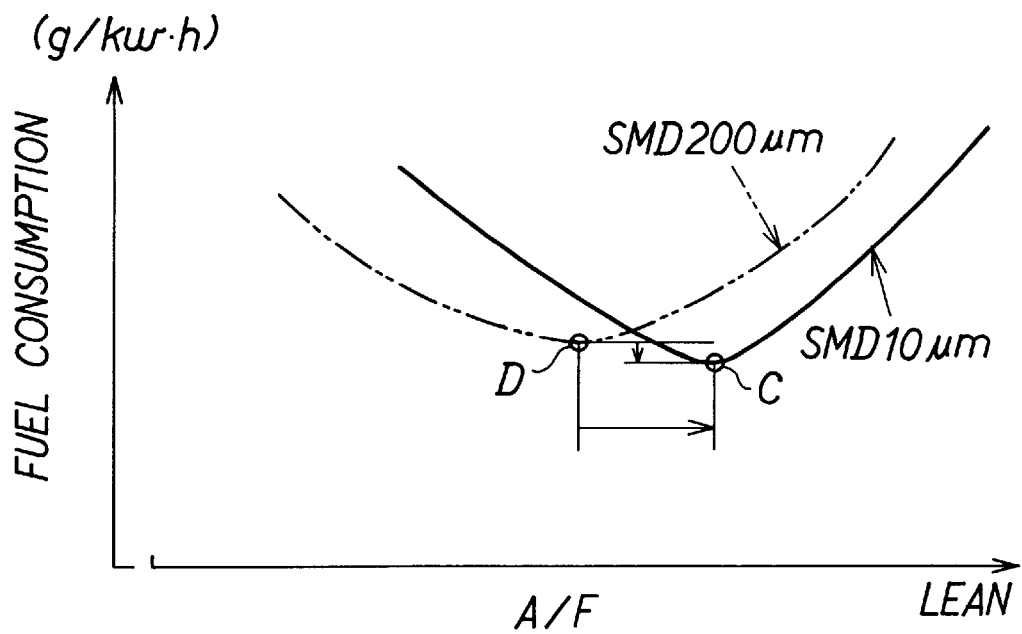
FIGS. 40A and 40B are graphs showing a difference of effects caused by the difference of fuel particle sizes SMD according to the first modification of the second embodiment.
Figure 40B:
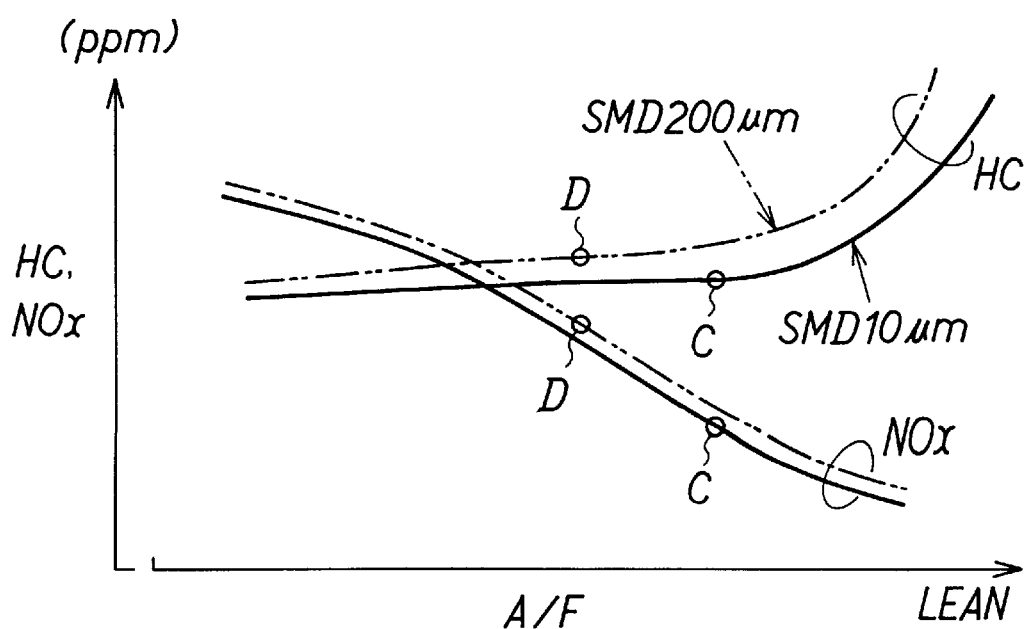

Further, the supplemental injection allows the deficiency of fuel during burning to be avoided and the ideal burning with the optimum fuel amount to be realized. It is noted that because the fuel amount of the supplemental injection is very small, it will not hamper the homogenization of the mixture, The system of the present embodiment also allows the fuel consumption to be lowered and the lean air-fuel ratio to be realized by atomizing the fuel particle size SMD. FIG. 40A shows a result of experiments carried out on the optimum (minimum) fuel consumption points C and D corresponding to the fuel particle size SMD and on changes of the air-fuel ratio corresponding to the points C and D when the "early injection" is implemented. In the figure, the point C is the point where the fuel consumption is the lowest on a characteristic curve of SMD=10 µm shown by a solid line and the point D is the point where the fuel consumption is the lowest on a characteristic curve of SMD=200 µm shown by an alternate dotted line. It is apparent when those points C and D are compared that the curve of the point C can realize the low fuel consumption and that the air-fuel ratio is shifted to the lean side. FIG. 40B is a graph showing emissions of HC and NOx when the fuel particle size SMD is 10 µm and 200 µm, wherein points C and D correspond to the respective points in FIG. 40A. It is apparent from FIG. 40B that the finer the fuel particle size SMD (points C), the lower the emissions of HC and NOx can be.

Second Modification of the Second Embodiment

Similarly to the second modification of the first embodiment, the second embodiment may be modified and embodied by the piezoelectric type injector shown in FIG. 17. That is, the control of the injection fuel amount by the piezoelectric stack 89 is implemented corresponding to the engine speed and the engine load (intake pressure PM) as shown in the map in FIG. 35. Then, the processes of proportioning and averaging the fuel inflow speed are appropriately implemented. That is, this arrangement allows the injection flow amount per unit time to be changed by increasing/decreasing the opened valve lift of the injector 18 by extending/contracting the piezoelectric stack 89 and the amount of fuel supplied into the cylinder (the combustion chamber 13) to follow the intake flow speed also in this case.

It is noted that beside the modifications, the present embodiment may be realized by modifying as follows.

That is, although the control of "proportioning the fuel inflow speed" for flowing the fuel into the cylinder with the fuel inflow speed which is proportional to the intake flow speed and the control of "averaging the fuel inflow speed" for flowing the fuel into the cylinder with the fixed fuel inflow speed corresponding to the temporal mean value of the intake flow speed are implemented selectively corresponding to the engine speed (FIG. 35) in the embodiments, this arrangement may be modified. For instance, it is possible to embody a system in which only either one of the control of "proportioning the fuel inflow speed" or the control of "averaging the fuel inflow speed" is adopted. The effect of homogenizing the mixture may be provided also in such a case.

Further, although the fuel injection in the "divided injection mode" is implemented so that the fuel injected by the injector 18 flows into the cylinder within about ⅓ of time at the beginning of the valve opening period of the intake valve 14 under the engine operating condition in which the engine speed or load is high in the embodiment, it is possible to embody the system by omitting this process.

It is also possible to set the residing time Tst (FIG. 38) in implementing the early injection by the injector 18 in the first modification variably in correspondence with an intake temperature for example.

Means for atomizing the injected fuel may be embodied also as follows beside the methods, That is, a porous type (e.g., 12 hole type) injector is used by reducing the diameter of the injection port more than those of the four-hole type injector and by increasing the number of holes to 12 or more. Because it allows the effect of atomization of fuel to be provided even if air pressure is relatively low, it allows to avoid problems that the fuel inflow speed is excessively increased due to the pressurization of air and the wetness of the cylinder increases. In this case, it is also possible to omit the pressurization of air by means of the air supply pump shown in FIG. 2.

Third Embodiment

In the present embodiment, the piezo-driven injector 18 shown in FIG. 17 is used. Operations of the system of the present embodiment may be summarized as:

(a) increasing the amount of fuel supplied into the cylinder more in the later period of the intake stroke (process of variable fuel amount);

(b) controlling timing for flowing the fuel into the cylinder at specific timing in the initial period of the intake stroke (control of fuel inflow timing); and (c) atomizing the fuel supplied into the cylinder (atomization of injected fuel).

At first, the operation (a) of the "process of variable fuel amount" will be explained with reference to FIG. 41.

Figure 41:
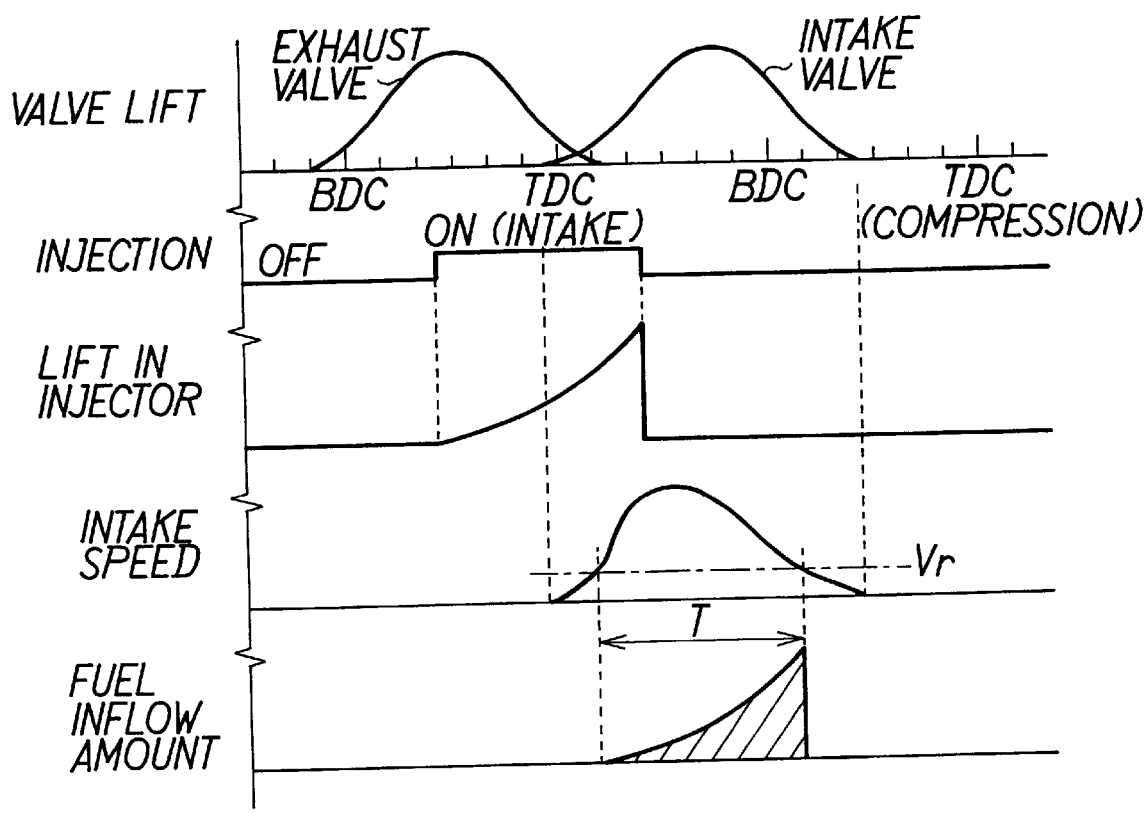
FIG. 41 is a time chart showing valve lifts of intake and exhaust valves when opened, fuel injection timing of the injector, a valve lift of the injector, a change of the intake flow speed when the intake valve is opened and an amount of fuel supplied into the cylinder in a process of varying a fuel amount according to a third embodiment.

FIG. 41 is a time chart showing valve lifts of the intake and exhaust valves 14 and 15 when opened, the fuel injection timing of the injector 18, a valve lift of the injector 18, changes in the intake flow speed when the intake valve 14 is opened and an amount of the fuel supplied into the cylinder, wherein TDC (top dead center) and BDC (bottom dead center) within one cycle of the piston 10 are indicated on the horizontal axis. It is noted that although the intake flow speed actually starts to increase slightly behind the opening timing of the intake valve 14, those both timings are shown in synchronism in the figure.

In FIG. 41, the exhaust valve 15 opens just before the BDC and closes right after the TDC (intake TDC). Further, the intake valve 14 opens just before the intake TDC and closes right after the BDC. At this time, a period during which the intake flow speed exceeds a predetermined threshold value Vr as the intake valve 14 is opened is denoted by "T" in the figure. This period "T" corresponds to a period during which the valve lift of the intake valve 14 is about 20% or more as compared to the full-open time (at the time of 100%). It is noted that the intake flow speed rises sharply at the beginning when the intake valve 14 is opened and tends to fall gradually after reaching the peak value.

Further, the valve lift changes as shown in the figure during the period when the fuel is injected by the injector 18 and corresponding to the waveform of this valve lift, the amount of fuel supplied into the cylinder per unit time changes. Specifically, the fuel inflow amount increases gradually in the period T and the more the intake stroke advances, the more the increase increases gradually. That is, the later the intake stroke, the more the fuel inflow amount to the cylinder per unit time increases. At this time, the timing of flowing the fuel into the cylinder is engaged almost across the whole period of T and the valve lift is controlled variably by the voltage applied to the piezoelectric stack 89 shown in FIGS. 17 through 19.

According to the method for supplying fuel, the mixture suctioned into the cylinder 9 is stratified and a rich atmosphere is provided around the ignition plug 27 positioned in the injecting direction of the injector 18. Thereby, even if the air-fuel ratio of the mixture is set in the lean domain, the mixture may be adequately burned and the air-fuel ratio domain of the fuel injection control may be extended to the lean side.

Next, the operation (b) of the "control of fuel inflow timing" will be explained. It is desirable to flow the fuel injected by the injector 18 into the cylinder in the initial period of the intake stroke in order to enhance the efficiency for charging the suctioned air into the engine cylinder due to the following reason. That is, when the fuel is suctioned in the initial period of the intake stroke, the vaporization of the fuel is hastened, air temperature drops due to the heat of vaporization at this time and weight (density) of the air suctioned into the cylinder per unit volume increases. As a result, the charging efficiency of the suctioned air is enhanced, the fuel injection state may be stabilized and the engine output torque is improved.

Figure 42A:
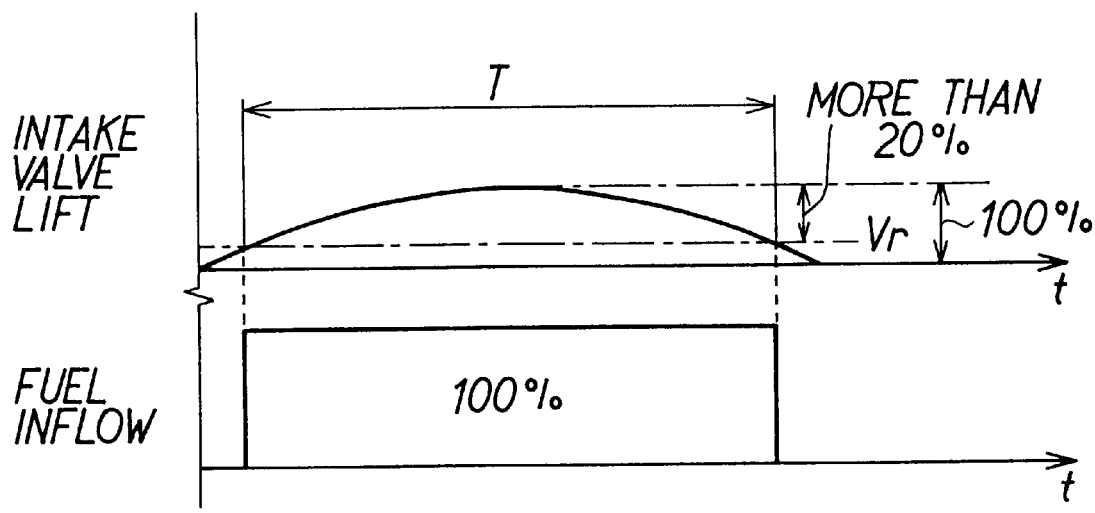
FIGS. 42A and 42B are graphs showing a variable fuel amount mode and a fixed fuel amount mode.
Figure 42B:
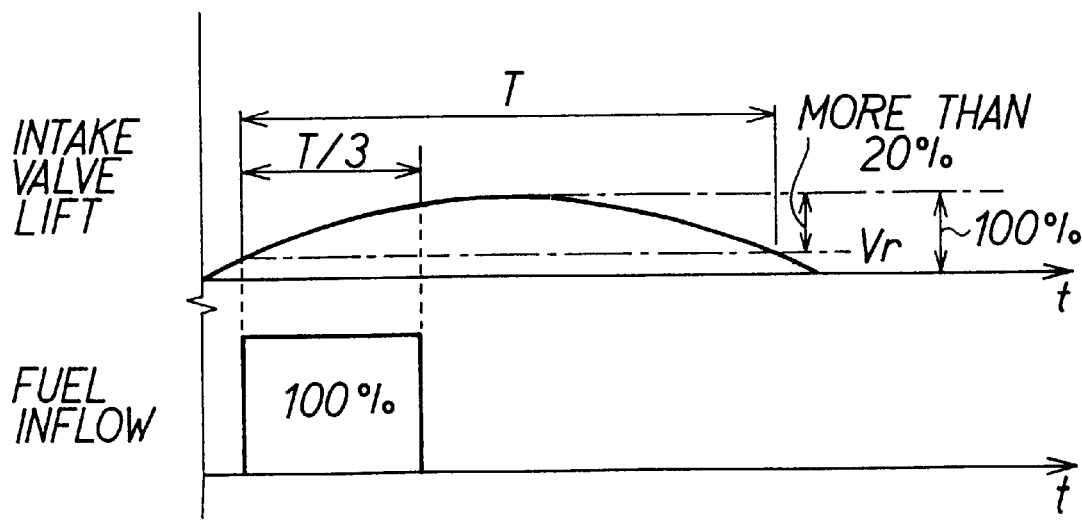

Then, as shown in FIG. 42B, the system of the present embodiment is arranged so as to flow the fuel into the cylinder within the initial period of "T/3" of the period T. At this time, the sprayed fuel injected by the injector 18 flows into the cylinder by being carried on the flow of the suctioned air in the initial period of the time when the intake valve is opened. In such a case, the valve lift of the injector 18 is set as a fixed value and the fuel inflow amount per unit time is held constant.

The mode of varying the fuel inflow amount into the cylinder per unit time as described in the operation (a) will be referred to as a "variable fuel amount mode" and the mode of fixing the fuel inflow amount into the cylinder per unit time as described in the operation (b) will be referred to as a "fixed fuel amount mode" hereinafter for convenience in the present embodiment. When the fuel inflow timing of each mode is compared, all of the fuel (100%) flows into the cylinder within the period of "T" in the variable fuel amount mode as shown in FIG. 42A and all of the fuel inflows into the cylinder within the period of "T/3", in the fixed fuel amount mode as shown in FIG. 42B.

The operation (c) of the "atomization of the injected fuel" is the same with that described in the first embodiment.

Various operational processes implemented by the CPU 33 within the ECU 30 to control the fuel supplying operations as described in the third embodiment are similar to those of the first embodiment, except of the routine for controlling the drive of the injector.

Figure 43:
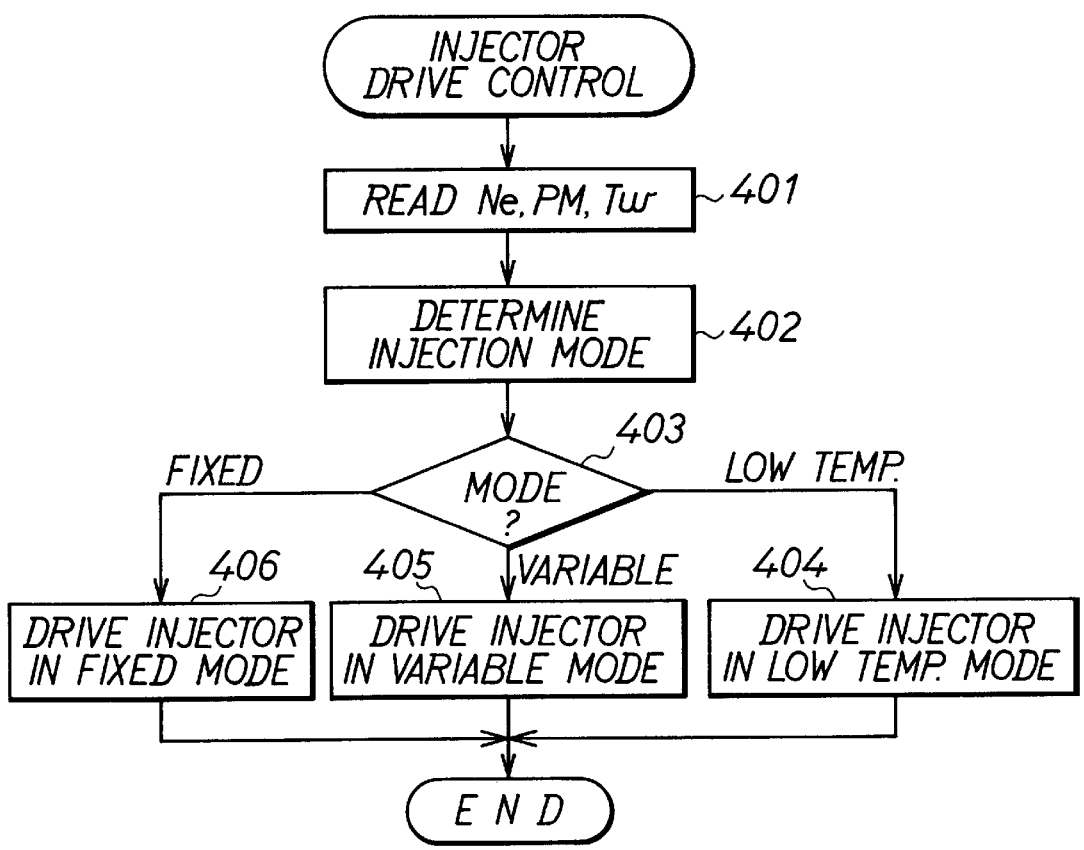
FIG. 43 is a flow chart showing a routine for controlling drive of the injector according to the third embodiment.

When the routine for controlling the drive of the injector is activated by the timer interruption of the predetermined cycle, e.g., 4 msec., as shown in FIG. 43, the CPU 33 reads the engine operating states such as the engine speed Ne, the intake pressure PM, the coolant water temperature Tw and the like in Step 401. Then, it determines a mode for injecting the fuel by the injector 18 based on the operating states read as described in Step 402. In determining the fuel injection mode, the CPU 33 selects either the "variable fuel amount model" or the "fixed fuel amount mode" corresponding to which speed range of low, medium or high the engine speed Ne is located or to which load range of low, medium and high the engine load (intake pressure PM) is located by using basically a map shown in FIG. 44.

Figure 44:
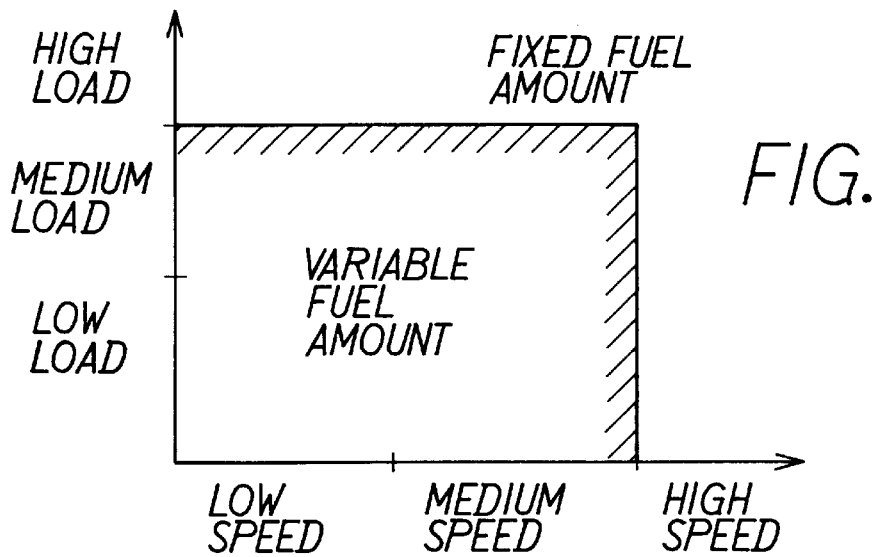
FIG. 44 is a map showing fuel injection modes corresponding to engine operating states.

FIG. 44 is the map showing the engine speed and load ranges for selecting either the "variable fuel amount mode" shown in FIG. 42A or the "fixed fuel amount mode" shown in FIG. 42B. In the figure, the fuel is injected by the injector 18 in the variable fuel amount mode in the range (slant-lined domain in the figure) where the engine speed and load are low to medium and the fuel is injected by the injector 18 in the fixed fuel amount mode in the range where the engine speed and load is high. However, the fuel is injected in a "low temperature mode" in starting the engine 1 in low temperature for example without injecting fuel in the two modes in the present embodiment. Accordingly, one fuel injection mode is selected among the three modes including the low temperature mode in determining the mode in Step 402.

After that, the CPU 33 discriminates the fuel injection mode determined as described in Step 403. At this time, when the CPU 33 discriminates it to be the "low temperature mode" in starting the engine 1 in low temperature for example, it advances to Step 404 to drive the injector 18 in the low temperature mode to inject fuel. The injector is driven in the low temperature mode by injecting the fuel before the intake stroke and by flowing the fuel to be injected into the cylinder across the whole range of the intake stroke. It corresponds to the fuel injection operation of the conventional system (in which a fuel amount per unit time is fixed).

When the CPU 33 discriminates it to be the "variable fuel amount mode", it advances to Step 405 to drive the injector 18 in the variable fuel amount mode to inject fuel (FIG. 42A). When the CPU 33 discriminates it to be the "fixed fuel amount mode", it advances to Step 406 to drive the injector 18 in the fixed fuel amount mode to inject fuel (FIG. 42B).

The present embodiment described in detail brings about the following effects.

(A) While the particle size of the fuel injected by the injector 18 is atomized to 70 $\mu$m or less and the drive of the injector 18 is controlled such that the later the intake stroke, the more the amount of fuel supplied into the cylinder per unit time is increased, this arrangement allows the stratified mixture to be formed within the cylinder because the large amount of injected fuel is suctioned just before the intake valve 14 is closed. That is, the atmosphere of air-fuel ratio enough for combustion is provided around the ignition plug and the stable combustion may be realized even if it is a lean atmosphere as a whole. Further, because the fuel injected by the injector 18 is atomized, vaporization of the fuel within the cylinder is accelerated, thus suppressing incomplete burning due to the cylinder wet. Thereby, the stratification of the mixture supplied into the cylinder may be favorably realized. As a result, the lean limit of the mixture may be extended and the engine 1 may be operated in the low fuel consumption range.

(B) Because the present embodiment is arranged specifically such that the increase of the amount of fuel supplied into the cylinder gradually increases as time elapses from the opening of the intake valve 14 (FIG. 41), a greater effect can be provided in stratifying the mixture. At this time, the fuel may be supplied into the cylinder adequately even when the intake flow speed becomes slow in the later period of the intake stroke as shown in FIG. 41.

(C) The flow amount of the fuel injected from the injector 18 per unit time is controlled by controlling the expansion/contraction of the piezoelectric stack 89 in the present embodiment. This arrangement allows the injection flow amount per unit time to be readily changed by increasing/decreasing the valve lift of the injector 18 by extending/contracting the piezoelectric stack 89.

(D) Further, according to the present embodiment, the drive of the injector 18 is controlled such that the fuel injected by the injector 18 flows into the cylinder within about ⅓ of time T at the beginning of the valve opening period of the intake valve 14 under the operating state of the engine in which the speed or load is high (FIG. 42B). This arrangement allows much of the fuel supplied into the cylinder to be vaporized quickly and the vaporization of the fuel supplied into the cylinder to be completed before the intake valve 14 is closed and the intake is finished. Because the air temperature drops due to the heat of vaporization of the fuel, weight (density) of the air suctioned to the cylinder per unit volume increases. As a result, the charging efficiency of the suctioned air is enhanced and the combustion state of the fuel is stabilized. Further, it allows more air to be suctioned and an output torque to be improved. That is, it becomes possible to operate the engine while laying stress on the torque under the high speed or high load state.

Figure 45:
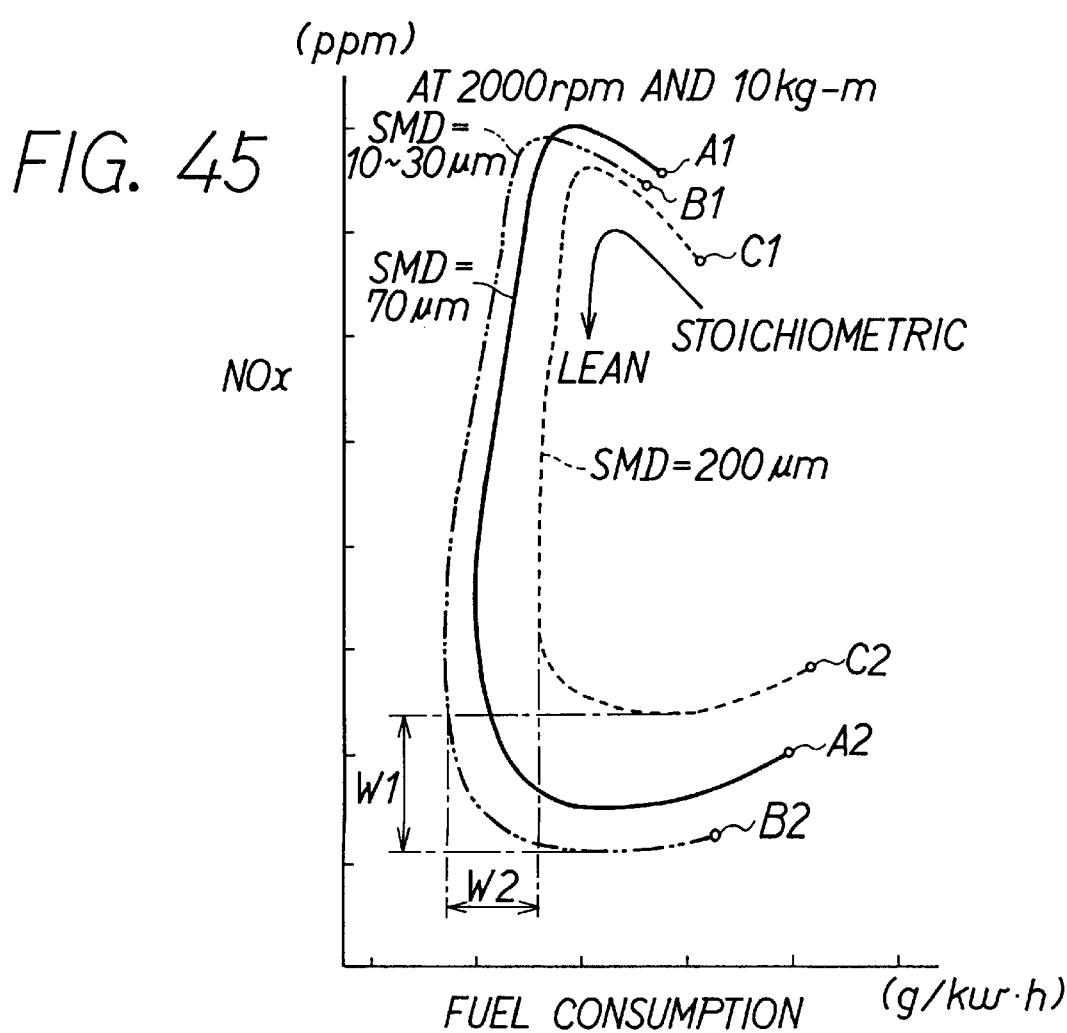
FIG. 45 is a graph showing experimental data for confirming the effect of the third embodiment.

Here, experimental data for confirming the effect of the arrangement of flowing the large amount of fuel into the cylinder in the later period of the intake stroke as described will be explained with reference to FIGS. 45 and 46. FIG. 45 shows changes of emission of NOx and fuel consumption when three injectors which inject fuel having different fuel particle sizes SMD and when a target value of the air-fuel ratio control is shifted gradually from the stoichiometric side (A/F=14.7) to the lean side. In the graph, a solid line represents the experimental data when SMD=around 70 $\mu$m, an alternate chain line represents the experimental data when SMD=10 to 30 $\mu$m and a broken line represents the experimental data when SMD=200 $\mu$m. Points A1, B1 and C1 in the respective SMD curves indicate the amount of NOx and the fuel consumption when the stoichiometric value is set as the target air-fuel ratio and points A2, B2 and C2 indicate the amount of NOx and the fuel consumption when a lean air-fuel ratio (e.g., A/F=23) is set as the target air-fuel ratio.

However, the data of SMD=200 μm is provided by applying the prior art fuel injection method of providing mixture by fuel residing within the intake port by injecting the fuel homogeneously regardless of the period of the intake stroke and of flowing the mixture into the cylinder because it is difficult to stratify the mixture favorably, the combustion is unstabilized and it is very difficult to make the air-fuel ratio control in the lean domain when the stratification of the mixture is to be embodied like the present embodiment when SMD=150 to 200 μm because the fuel particle size is large.

At this time, when each value where the amount of NOx and the fuel consumption turn out to be the best is compared with respect to the control of SMD=10 to 30 μm and the control of SMD=200 μm, it can be seen that the amount of NOx is reduced by "W1" in the figure and the fuel consumption is improved by "W2" in the figure in the former control.

Figure 46:
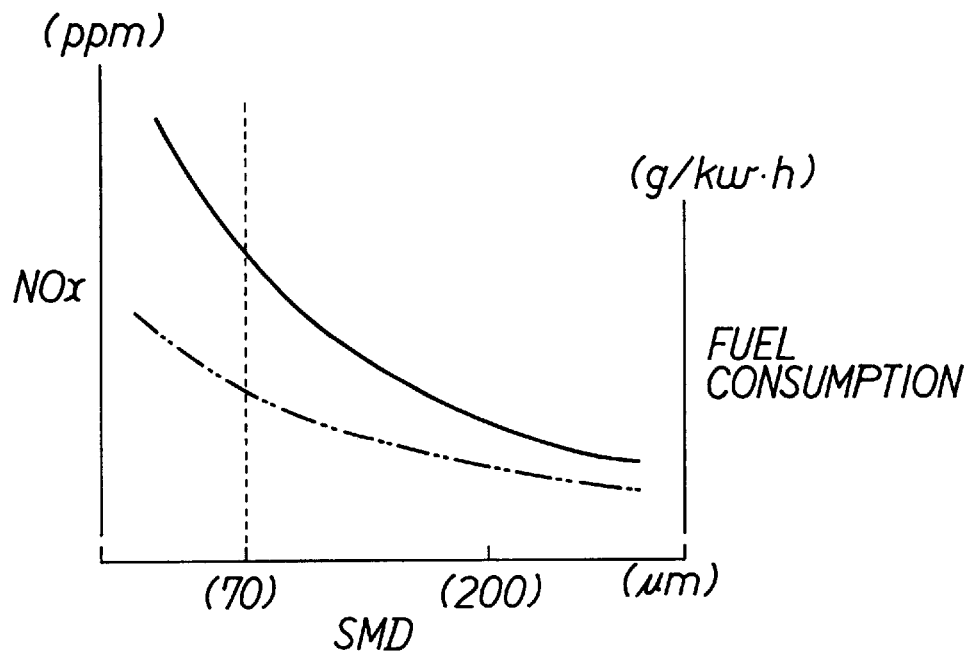
FIG. 46 is a graph showing experimental data for confirming the effect of the third embodiment.

FIG. 46 is a graph showing the degree of the effect corresponding to the fuel particle size SMD by parameterizing the effect by the emission of NOx and the fuel consumption. It can be seen from FIG. 46 that the smaller the fuel particle size SMD, the less the amount of NOx is and more the fuel consumption is improved. It is noted here that the threshold value of "SMD=70 μm" is set based on the permissible level of the amount of NOx and the fuel consumption and the stable combustion state can be maintained even if the fuel injection is controlled so as to flow the large amount of fuel into the cylinder in the later period of the intake stroke as described when SMD≦70 μm.

First Modification of the Third Embodiment

Figure 47:
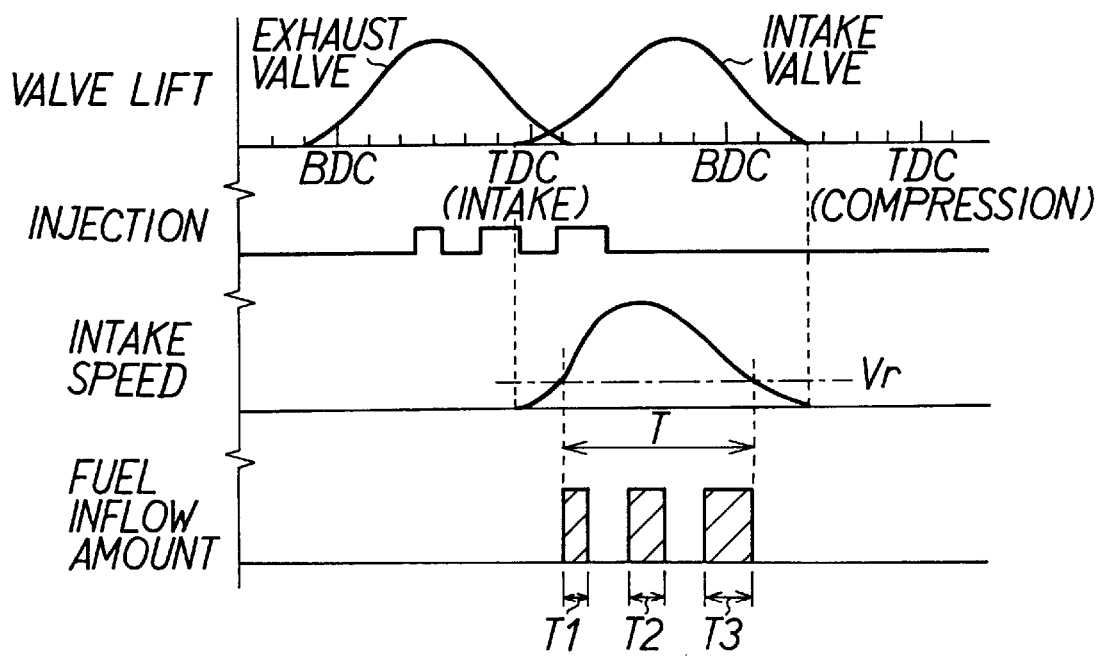
FIG. 47 is a time chart showing valve lifts of intake and exhaust valves when they are opened, fuel injection timing of the injector, a change of the intake flow speed when the intake valve is opened and an amount of fuel supplied into the cylinder according to the third embodiment.

Next, a first modification of the third embodiment will be explained with reference to FIG. 47. While the drive of the injector 18 is controlled such that the later the intake stroke, the more the amount of fuel supplied into the cylinder per unit time is increased in the third embodiment, the drive of the injector 18 is controlled such that the fuel inflow per unit time is equalized and the fuel inflow within the intake stroke is divided into a plurality of times and such that the later the intake stroke, the more the fuel inflow per one time divided as described increases in this modification. At this time, the duration of the valve lift is controlled while fixing (constant) the valve lift of the injector 18. It is noted that the atomization of fuel is implemented in the same manner with the third embodiment, Specifically, the fuel is injected by the injector 18 by dividing into three times for example as shown in the time chart in FIG. 47 and the fuel divided into three parts is suctioned into the cylinder respectively within the period of "T" in the intake stroke. At this time, a time T1 during which the fuel is flown in at the first time, a time T2 during which the fuel is flown in at the second time and a time T3 during which the fuel is flown in at the third time have a relationship of T1<T2<T3, i.e., the later the intake stroke, the more the fuel inflow of one time increases. Accordingly, the large amount of injected fuel is suctioned into the cylinder just before the intake valve 14 is closed and the stratified mixture may be provided within the cylinder.

Similarly to the third embodiment, the stratification of the mixture supplied into the cylinder may be favorably realized and the lean limit of the mixture may be extended, allowing to operate the internal combustion engine in the low fuel consumption range also according to this modification.

The modification may be embodied as follows: by controlling the fuel inflow of one time by equalizing each of the fuel inflow times T1, T2 and T3 and by gradually increasing the valve lift of the injector 18; by variably controlling pressure of fuel (fuel pressure) supplied to the injector 18 while equalizing each of the fuel inflow times T1, T2 and T3. In this case, the later the intake stroke, the more the fuel inflow of one time increases by gradually increasing the fuel pressure by using the fuel pump for example; or the fuel inflow may be divided into two or four or more or an injector other than the piezo-driven injector may be used. In short, an arrangement which allows the drive of the injector to be controlled such that the later the intake stroke, the more the fuel inflow of one time thus divided increases.

It is noted that beside the modification, the present embodiment may be realized by modifying as follows.

Although the fuel particle size SMD is atomized into 10 to 30 μm in the embodiment, the range of SMD may be changed and set as necessary as long as it is about 70 μm or less. Similarly to each embodiment, the stratification of the mixture supplied into the cylinder may be favorably realized and the combustion state may be stabilized even in the air-fuel ratio lean domain also in this case.

Further, although the fuel injection in the "fixed fuel amount mode" is implemented so that the fuel injected by the injector 18 flows into the cylinder within about ⅓ of time at the beginning of the valve opening period of the intake valve 14 under the engine operating condition in which the engine speed or load is high in the embodiment (FIG. 42B), it is possible to embody the system by omitting this process. That is, the control of the variable fuel amount mode shown in FIG. 42A may be implemented in the whole operation range of the engine.

Figure 48A:
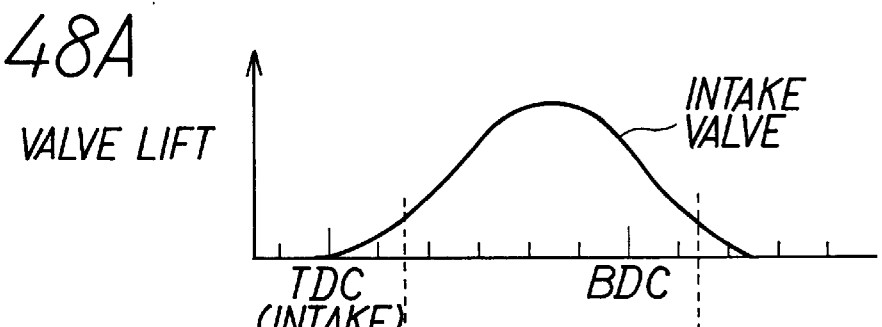
FIGS. 48A and 48B are time charts showing changes of the amount of fuel supplied into the cylinder according to a first modification of the third embodiment.
Figure 48B:
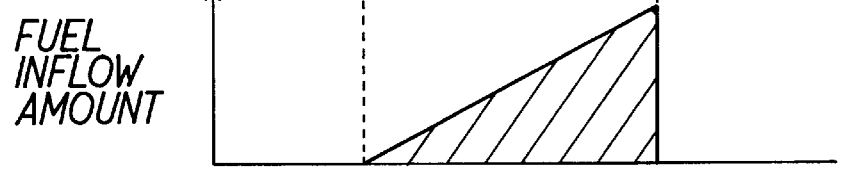
Figure 49A:
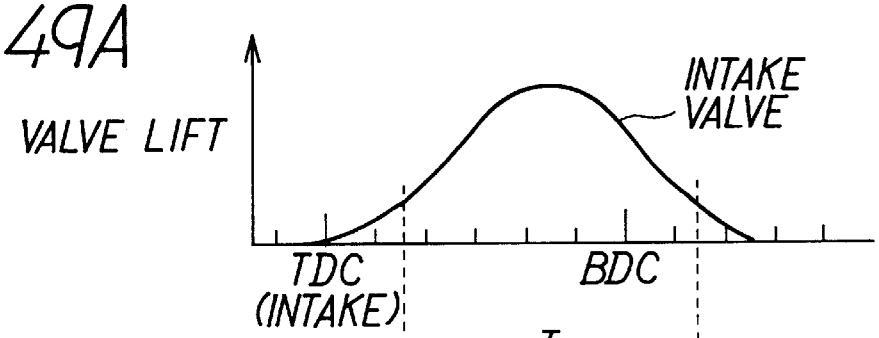
FIGS. 49A and 49B are time charts showing changes of the amount of fuel supplied into the cylinder according to a second modification of the third embodiment.
Figure 49B:
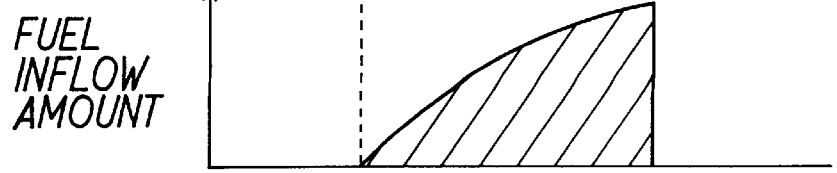

Further, the third embodiment may be embodied by modifying as described below and as shown in FIGS. 48A, 48B, 49A and 49B. That is, a modes of changes of the fuel inflow per unit time may be changed. In FIGS. 48A and 48B, the increase of the fuel inflow (inclination per unit time) is fixed and in FIGS. 49A and 49B, the increase of the fuel inflow is gradually reduced. In addition to that, the fuel inflow into the cylinder per unit time may be increased stepwise.

Atomizing the injected fuel may be embodied also as follows beside the methods, That is, a multi-hole type (e.g., 12-hole type) injector is used by reducing the diameter of the injection port more than those of the four-hole type injector and by increasing a number of holes to 12 or more. Because it allows the effect of atomization of fuel to be provided even if air pressure is relatively low, it allows to avoid problems that the fuel inflow speed is excessively increased due to the pressurization of air and the wetness of the cylinder increases. In this case, it is also possible to omit the pressurization of air by means of the air supply pump 72.

Further, it is also possible to inject about 50% of the total fuel within the period of "T" and to inject the remaining 50% of fuel aside from the intake stroke aiming at suppressing the emission of unburnt HC when the engine 1 is operated at high speed or high load. This process may be implemented in place of the process of flowing all the fuel into the cylinder within the period of "T/3" as shown in FIG. 42A or may be adopted together with the process shown in FIG. 42B.

While the preferred embodiments and various modifications thereof are described, variations thereto will occur to those skilled in the art within the scope of the present inventive concepts which are delineated by the following claims.

What is claimed is:

1. A fuel injection control system for an internal combustion engine having a cylinder and an intake valve, the system comprising:
    an injector for injecting fuel to be supplied into the cylinder during a period of an intake stroke of the engine in which the intake valve is opened; and
    injector drive control means for variably controlling drive of the injector from a time at the beginning of the intake stroke such that all the fuel injected by the injector flows into the cylinder within a predetermined initial limited portion of the intake stroke period in which the intake valve opens.

2. A fuel injection control system as in claim 1,
    engine operating state detecting means for detecting operating states of the engine including at least an engine speed and an engine load,
    wherein the injector drive control means includes:
        first control means for flowing all the fuel injected by the injector into the cylinder within about ⅓ of time from the beginning of the opening of the valve in the period from the opening to closing of the intake valve when the engine is detected to be not in the high load or high speed state by the engine operating state detecting means; and
        second control means for flowing about a half of fuel injected by the injector into the cylinder within about ⅓ of time from the beginning of the opening of the valve in the period from the opening to closing of the intake valve and flowing the remaining fuel into the cylinder within the closed period of the intake valve.

3. A fuel injection control system for an internal combustion engine having a cylinder and an intake valve, the system comprising:
    an injector for injecting fuel to be supplied into the cylinder during the period of an intake stroke of the engine in which the intake valve is opened; and
    injection drive control means for controlling drive of the injector such that the fuel injected by the injector flows into the cylinder within a predetermined portion of said period when the intake valve is opened; and
    wherein the injector drive control means controls the drive of the injector such that the fuel injected by the injector flows into the cylinder within about ⅓ of time at the beginning of the valve opening period of the intake valve.

4. A fuel injection control system for an internal combustion engine having a cylinder and an intake valve, the system comprising:
    an injector for injecting fuel to be supplied into the cylinder during the period of an intake stroke of the engine in which the intake valve is opened; and
    injection drive control means for controlling drive of the injector such that the fuel injected by the injector flows into the cylinder within a predetermined portion of said period when the intake valve is opened; and
    wherein, the injector drive control means limits the timing for flowing the fuel injected by the injector into the cylinder within a period during which an intake flow speed exceeds a predetermined threshold value when the intake valve is opened.

5. A fuel injection control system for an internal combustion engine having a cylinder and an intake valve, the system comprising:
    an injector for injecting fuel to be supplied into the cylinder during the period of an intake stroke of the engine in which the intake valve is opened; and
    injection drive control means for controlling drive of the injector such that the fuel injected by the injector flows into the cylinder within a predetermined portion of said period when the intake valve is opened; and
    engine operating state detecting means for detecting operating states of the engine at least including an engine speed and an engine load,
    wherein the injector drive control means includes:
        first control means for flowing the fuel injected by the injector into the cylinder at one time within about ⅓ of time from the beginning of the opening of the valve in the period from the opening to closing of the intake valve;
        second control means for flowing the fuel injected by the injector into the cylinder partially at two times within about ⅓ of them from the beginning of the opening of the valve in the period from the opening to closing of the intake valve and within the closed period of the intake valve; and
        fuel injection command means for using the first and second means corresponding to the load and speed of the engine detected by the engine operating state detecting means and for determining rates of fuel injected at two times by the second control means.

6. A fuel injection control system as in claim 5, wherein:
    the fuel injection command means increases the rate of injection at the second time more by the control means when the engine speed or the engine load is high.

7. The fuel injection control system according to claim 1, further comprising:
    a variable valve timing mechanism for controlling the opening/closing timing of the intake valve to an advancing side or a retarding side; and
    valve timing control means for controlling the opening/closing timing of the intake valve by means of the variable valve timing mechanism,
    wherein the injector drive control means controls the timing for driving the injector corresponding to a control of the valve timing control means.

8. The fuel injection control system according to claim 1, further comprising:
    injected fuel atomizing means for atomizing the fuel injected by the injector.

9. A fuel injection control system for an internal combustion engine having a cylinder and an intake valve, the system comprising:
    an injector for injecting fuel to be supplied into the cylinder during the period of an intake stroke of the engine in which the intake valve is opened; and
    injection drive control means for controlling drive of the injector such that the fuel injected by the injector flows into the cylinder within a predetermined portion of said period when the intake valve is opened; and
    wherein the injector drive control means controls the drive of the injector so that the fuel is supplied into the cylinder in a period of the intake stroke during which a flow speed of air suctioned into the cylinder exceeds a predetermined value and controls an amount of fuel supplied into the cylinder per unit time pursuant to the flow speed of the air suctioned into the cylinder.

10. A fuel injection control system for an internal combustion engine having a cylinder and an intake valve, the system comprising:

an injector for injecting fuel to be supplied into the cylinder during the period of an intake stroke of the engine in which the intake valve is opened; and injection drive control means for controlling drive of the injector such that the fuel injected by the injector flows into the cylinder within a predetermined portion of said period when the intake valve is opened; and fuel inflow amount control means for flowing the fuel into the cylinder with a fuel inflow speed proportional to an intake flow speed.

11. A fuel injection control system for an internal combustion engine having a cylinder and an intake valve, the system comprising:

an injector for injecting fuel to be supplied into the cylinder during the period of an intake stroke of the engine in which the intake valve is opened; and injection drive control means for controlling drive of the injector such that the fuel injected by the injector flows into the cylinder within a predetermined portion of said period when the intake valve is opened; and fuel inflow amount control means for flowing the fuel into the cylinder with a fixed fuel inflow speed corresponding to a temporal mean value of an intake flow speed.

12. A fuel injection control system for an internal combustion engine having a cylinder and an intake valve, the system comprising:

an injector for injecting fuel to be supplied into the cylinder during the period of an intake stroke of the engine in which the intake valve is opened; and injection drive control means for controlling drive of the injector such that the fuel injected by the injector flows into the cylinder within a predetermined portion of said period when the intake valve is opened; and first control means for flowing the fuel into the cylinder with the fuel inflow speed which is proportional to the intake flow speed; and second control means for flowing the fuel into the cylinder with the fixed fuel inflow speed corresponding to the temporal mean value of the intake flow speed, wherein inflow of the fuel by means of the first control means and inflow of the fuel by means of the second control means is implemented selectively corresponding to an engine speed.

13. A fuel injection control system for an internal combustion engine having a cylinder and an intake valve, the system comprising:

an injector for injecting fuel to be supplied into the cylinder during a period of an intake stroke of the engine in which the intake valve is opened;

a variable valve timing mechanism for controlling timing of opening/closing the intake valve to an advancing side or retarding side;

valve timing control means for controlling the timing of opening/closing the intake valve by the variable valve timing mechanism corresponding to engine operating states; and injector drive control means for variably controlling timing for driving the injector corresponding to control of the valve timing control means such that fuel infected by the injector flows into the cylinder only within an initial portion of the intake stroke and only air flows into the cylinder after said initial portion of the intake stroke.

14. The fuel injection control system according to claim 13, wherein:

the injector drive control means controls the drive of the injector such that an inflow of fuel into the cylinder is completed after a predetermined time after opening the intake valve based on the valve opening timing of the intake valve.

15. A fuel injection control system for an internal combustion engine having a cylinder and an intake valve, the system comprising:

an injector for injecting fuel to be supplied into the cylinder during a period of an intake stroke of the engine in which the intake valve is opened;

fuel injection amount calculating means for calculating a fuel injection amount based on engine operating states of each moment; and early injection means for injecting fuel into an intake port until a predetermined time before the intake valve is opened by driving the injector corresponding to the calculated injection amount.

16. The fuel injection control system according to claim 15, wherein:

the early injection means causes the injector to inject fuel at timing earlier by a time required to vaporize the fuel in the intake port before the intake valve is opened.

17. The fuel injection control system according to claim 15, wherein:

the injector is driven such that after injecting the fuel into the cylinder by the early injection means, a difference of the fuel injection amount between the previous value calculated by the fuel injection amount calculating means and the current value is supplied into the cylinder within the intake stroke of the cylinder.

18. The fuel injection control system according to claim 15, further comprising:

fuel atomizing means for atomizing the fuel injected by the injector.

19. A fuel injection control system for an internal combustion engine having a cylinder and an intake valve, the system comprising:

an injector for injecting fuel to be supplied into the cylinder during a period of an intake stroke of the engine in which the intake valve is opened;

fuel atomizing means for atomizing particle size of the fuel injected by the injector to about 70 $\mu$m or less; and injector drive control means for controlling the drive of the injector such that the later the intake stroke, the more an amount of fuel supplied into the cylinder per unit time is increased.

20. The fuel injection control system according to claim 19, wherein:

the injector drive control means increases an increase of the amount of fuel supplied into the cylinder gradually as time passes since when the intake valve is opened.

21. The fuel injection control system according to claim 19, wherein:

the injector drive control means divides the inflow of fuel within the intake stroke into a plurality of times to drive the injector such that the later the intake stroke, the more an inflow of fuel of one time divided is increased.

22. A method for timing the injection into a cylinder of a calculated variable quantity of fuel for an engine operating condition during an intake valve stroke of an internal combustion piston/cylinder engine, said method comprising:

starting fuel injection at least by the beginning of an intake stroke;

stopping fuel injection after an initial limited portion of the intake stroke; and variably controlling the pressure of the fuel being injected between said starting and stopping steps so as to cause said calculated variable quantity of fuel all to be injected into corresponding cylinders during this limited initial portion of the intake stroke.

23. A method as in claim 22 wherein said initial limited portion is not substantially more than about ⅓ of the intake stroke.

24. A method as in claim 22 wherein fuel injection is started and stopped plural times during said initial limited portion of the intake stroke.

25. A method as in claim 24 wherein said initial limited portion is not substantially more than about ⅓ of the intake stroke.

\* \* \* \* \*